United States Patent [19]

Asami et al.

[11] E Patent Number: Re. 33,626

[45] Reissued Date of Patent: Jul. 2, 1991

[54] REAR SUSPENSION CONTROLLER

[75] Inventors: Ken Asami, Nagoya; Kaoru Ohashi, Okazaki; Toshio Onuma, Susono; Shuuichi Buma, Toyota, all of Japan

[73] Assignee: Toyota Jidosha Kabushiki Kaisha, Japan

[21] Appl. No.: 317,826

[22] Filed: Mar. 1, 1989

Related U.S. Patent Documents

Reissue of:

[64] Patent No.: 4,647,068
Issued: Mar. 3, 1987
Appl. No.: 815,441
Filed: Dec. 31, 1985

[51] Int. Cl.[5] ..... B60G 17/015

[52] U.S. Cl. ..... 280/707; 364/424.05

[58] Field of Search ..... 280/714, 707, 6.12, 280/840, DIG. 1; 364/424.05; 188/299; 267/64.28

[56] References Cited

U.S. PATENT DOCUMENTS

| | | | |
|---|---|---|---|
| 2,978,254 | 4/1961 | Bundorf . | |
| 3,003,783 | 10/1961 | Breuder | 280/840 |
| 3,632,131 | 1/1972 | Engfer | 280/707 |
| 3,884,496 | 5/1975 | Ito et al. | 280/708 |
| 4,162,083 | 7/1979 | Zabler | 280/703 |
| 4,185,845 | 1/1980 | Misch et al. . | |
| 4,350,354 | 9/1982 | Dotti et al. | 280/6.12 |
| 4,364,574 | 12/1982 | Saito | 280/840 |
| 4,368,900 | 1/1983 | Beusse | 280/707 |
| 4,396,202 | 8/1983 | Kami et al. | 280/840 |
| 4,401,310 | 8/1983 | Ishikawa et al. | 280/707 |
| 4,402,375 | 9/1983 | Glaze | 280/707 |
| 4,433,849 | 2/1984 | Ohmori | 280/840 |
| 4,466,625 | 8/1984 | Kondo et al. | 280/840 |
| 4,513,833 | 4/1985 | Sheldon | 188/299 |
| 4,526,401 | 7/1985 | Kakizaki et al. | 280/707 |
| 4,540,188 | 9/1985 | Meloche et al. | 280/840 |
| 4,579,366 | 4/1986 | Doi et al. | 280/707 |
| 4,589,676 | 5/1986 | Meloche et al. | 280/707 |
| 4,593,920 | 6/1986 | Natsume et al. | 280/840 |
| 4,595,072 | 6/1986 | Barnea | 280/707 |
| 4,600,215 | 7/1986 | Kuroki et al. | 280/707 |
| 4,618,156 | 10/1986 | Kato et al. | 280/707 |
| 4,647,068 | 3/1987 | Asami et al. | 280/707 |
| 4,647,069 | 3/1987 | Iijima | 280/707 |
| 4,667,978 | 5/1987 | Asami et al. | 280/707 |
| 4,671,533 | 6/1987 | Asami et al. | 280/707 |
| 4,690,429 | 9/1987 | Asami et al. | 280/707 |
| 4,715,616 | 12/1987 | Asami et al. | 280/707 |
| 4,717,172 | 1/1988 | Asami et al. | 280/707 |
| 4,722,546 | 2/1988 | Asami et al. | 280/707 |
| 4,725,072 | 2/1988 | Asami et al. | 280/707 |
| 4,726,604 | 2/1988 | Asami et al. | 280/707 |

FOREIGN PATENT DOCUMENTS

| | | | |
|---|---|---|---|
| 0091017 | 10/1983 | European Pat. Off. . | |
| 3002765 | 7/1983 | Fed. Rep. of Germany . | |
| 3403649 | 8/1984 | Fed. Rep. of Germany . | |
| 3407260 | 9/1984 | Fed. Rep. of Germany . | |
| 2225303 | 11/1974 | France . | |
| 57-172808 | 10/1982 | Japan . | |
| 58-30542 | 2/1983 | Japan . | |
| 58-149815 | 9/1983 | Japan | 280/707 |
| 59-23712 | 2/1984 | Japan . | |
| 59-23713 | 2/1984 | Japan . | |
| 59-26638 | 2/1984 | Japan . | |
| 59-63218 | 4/1984 | Japan . | |
| 59-129613 | 8/1984 | Japan . | |
| 59-132408 | 9/1984 | Japan . | |
| 59-135213 | 9/1984 | Japan . | |
| 60-47711 | 3/1985 | Japan | 280/707 |

OTHER PUBLICATIONS

European Search Report No. 86 10 1360, dated 07-0-4-86.

European Search Report No. 86-10-0420, dated 03-0-4-86.

Mizuguchi, M. et al., Chassis Electronic Control Systems for the Mitsubishi 1984 Galant, SAE Technical Paper Series 840258, 1984.

Patent Abstracts of Japan, vol. 8, No. 166 (M-134) '1603', 2nd Aug. 1984.

*Primary Examiner*—Richard A. Bertsch
*Assistant Examiner*—Karin Tyson
*Attorney, Agent, or Firm*—Oliff & Berridge

[57] ABSTRACT

When a sporadic shock due to a protrusion or dip of a road surface is detected at front wheels of a vehicle during its cruising on the road surface, the characteristic of the rear wheel suspension of the vehicle is altered immediately or just before the rear wheels pass it to improve the controllability and the stability of the vehicle or the smooth feeling of the ride. For that purpose, a rear suspension controller is invented which includes a height sensor for detecting the distance between the body of the vehicle and each of the right and left front wheels thereof, height data calculator which generates a plurality of height data from the front vehicle height, a judgement section which compares each of the height data with a respective reference value that is predetermined corresponding to each height datum and generates comparisons and a rear suspension characteristic alteration devices which alter the spring constant, damping force, etc. of the rear suspensions. The height data calculator extracts substantial data from the front vehicle height signal which represents the shape of the bump or dip for judging adequately when to alter or return the rear suspension characteristic.

10 Claims, 63 Drawing Sheets

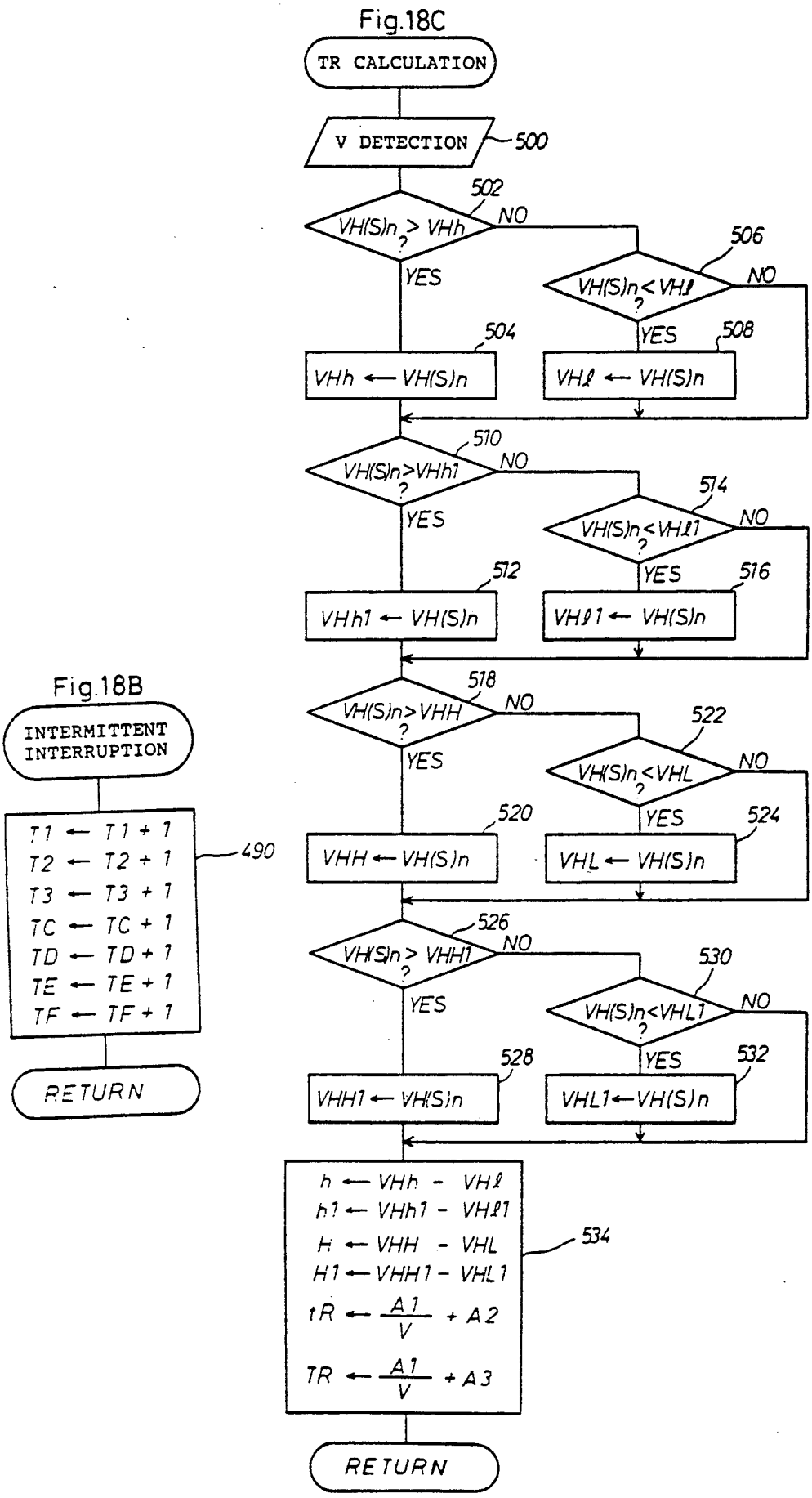
Fig.18C
TR CALCULATION
V DETECTION
500
502
VH(S)n > VHh ?
NO
YES
506
VH(S)n < VHℓ ?
NO
YES
504
VHh ← VH(S)n
508
VHℓ ← VH(S)n
510
VH(S)n > VHh1 ?
NO
YES
514
VH(S)n < VHℓ1 ?
NO
YES
512
VHh1 ← VH(S)n
516
VHℓ1 ← VH(S)n
518
VH(S)n > VHH ?
NO
YES
522
VH(S)n < VHL ?
NO
YES
520
VHH ← VH(S)n
524
VHL ← VH(S)n
526
VH(S)n > VHH1 ?
NO
YES
530
VH(S)n < VHL1 ?
NO
YES
528
VHH1 ← VH(S)n
532
VHL1 ← VH(S)n
h ← VHh - VHℓ
h1 ← VHh1 - VHℓ1
H ← VHH - VHL
H1 ← VHH1 - VHL1
tR ← A1/V + A2
TR ← A1/V + A3
534
RETURN
Fig.18B
INTERMITTENT INTERRUPTION
T1 ← T1 + 1
T2 ← T2 + 1
T3 ← T3 + 1
TC ← TC + 1
TD ← TD + 1
TE ← TE + 1
TF ← TF + 1
490
RETURN START
850
FIRST TIME?
NO
YES
INITIALIZATION
852
854
T1 ≧ t ?
NO
YES
T1 ← 0
856
VH(S)n DETECTION
858
Td, Tr
VHh, VHℓ
h1, h2
CALCULATION
861
V ≧ V0?
862
NO
YES
AUTO MODE ?
864
NO
YES
F1 = 1 ?
866
YES
NO
T2 ≧ ts?
868
NO
YES
T2 ← 0
870
VHh-VHℓ ≧ h1 ?
872
NO
YES
F1 ← 1
874
VHh ← VH(S)n
VHℓ ← VH(S)n
882
REAR SUS. CHARACT. ALTERATION ACTUATOR DRIVE
885
T3 ≧ Tr ?
876
NO
YES
T2 ≧ ts ?
877
NO
YES
T2 ← 0
878
VHh-VHℓ ≦ h2 ?
879
NO
YES
F1 ← 0
880

START
T1 ← T1 + 1
T2 ← T2 + 1
T3 ← T3 + 1
T4 ← T4 - 1
T5 ← T5 - 1
890
RETURN

REAR SUSPENSION CONTROLLER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a rear suspension controller for a vehicle, particularly to a rear suspension controller which is effective against a single shock caused by a bump or a dip of a road surface on which the vehicle is running.

2. Prior Art

Conventionally, the spring constant, damping force, bush characteristic or stabilizer characteristic of each of various suspension components provided between a body of a vehicle and its wheels is altered under control depending on conditions of a road surface [of] *or on* running conditions of the vehicle in order to prevent the vehicle from being shocked or vibrated and maintain the controllability and the stability of the vehicle. For example, altering the spring constant of the air spring of a suspension depending on conditions of the road surface, altering the damping force of a shock absorber, and simply making the characteristic of a bush or a stabilizer variable were proposed in the published unexamined Japanese patent applications Nos. sho 59-23712 and sho 59-26638, in sho 58-30542 and sho 59-23713, and in the published unexamined Japanese utility model application Nos. sho 59-129613, sho 59-132408 and sho 59-135213, respectively. In such control, when it is detected by a vehicle height sensor that the vehicle is running on a rough road or when it is detected by a brake sensor or an accelerator sensor that the front of the vehicle has gone up or down, the characteristic of each suspension of the vehicle is altered to maintain a good controllability and stability of the vehicle running on the rough road, or to prevent the front of the vehicle from going up or down further. However, under the above-mentioned conventional control, the vehicle is not judged to be running on a rough road, until a large turbulence is continuously detected by the vehicle height sensor. When the vehicle is judged to be running on a rough road, the spring constants of the suspensions for all the wheels of the vehicle or the damping forces of the shock absorbers for all the wheels are increased to produce a desired effect. If the vehicle passes over a joint of road patches or a single bump or dip, the vehicle usually receives only one shock and resumes running on a flat part of the road again, so that the characteristic of each suspension is not altered. For that reson, passengers of the vehicle are not protected from an unpleasant shock due to such single bump or dip, which is different from the case that the vehicle is running on a rough road having continuous bumps or dips. In some cases of passing over such single bump or dip, the controllability and the stability of the vehicle deteriorate as well.

SUMMARY OF THE INVENTION

The first object of the present invention is to appropriately control suspensions provided between a body of a vehicle and its rear wheels, to keep the controllability and the stability of the vehicle good and provide passengers of the vehicle with smooth ride.

The second object of the present invention is to alter the characteristic of rear suspensions of a vehicle running over such a single bump or dip of a road surface like a joint of road patches to maintain the controllability and the stability of the vehicle and the smooth feeling of the ride.

The third object of the present invention is to alter the characteristic of rear suspensions depending on the vehicle speed as well as the size of a bump or a dip to adequately deal with the shock caused by the bump or dip.

The fourth object of the present invention is to finely alter the characteristic of rear suspensions depending on the conditions of passing a bump or dip which the front wheels are detected.

The fifth object of the present invention is to control timing for the alteration of the rear suspension characteristic in order to prevent unnecessary alteration unless the rear wheels pass the bump or the dip.

The last purpose of the present invention is to apply the above-mentioned control not only to one type of suspension but also to other various types of suspensions.

According to the present invention, a rear suspension controller for a vehicle having suspensions between the body of the vehicle and its rear wheels includes the following means in order to attain the objects:

- a front vehicle height detector (e) by which a distance between the front wheel and the vehicle body is detected to generate a front vehicle height signal;
- a height data calculation means (f) which generates plurality of height data from the front vehicle height signal;
- a judgement means (g) which compares each of the height data with a reference value that is predetermined corresponding to each height datum and generates a judgement result signal depending on the results of the comparisons;
- a rear suspension characteristic alternation means (h) which alters the characteristic of the rear suspensions in receiving the judgment result signal.

The rear wheel suspension controller may further include a vehicle speed detector (M1) which detects the speed of the vehicle to generate a vehicle speed signal and

- a reference alteration means (M7) which alters the reference values depending on the vehicle speed signal. While the front vehicle height signal indicates the distance between the body and the front wheel, the height data is calculated from the front vehicle height signal as, for example, the displacement of the front vehicle height signal from the average value of it or those consisting of one among a displacement of the vehicle height signal from the average thereof, a speed of the displacement and an acceleration of the displacement and an amplitude of the displacement.

Each reference value corresponding to respective height datum may be a plurality of values and the judgment means then generates a plurality of judgment result signals depending on the results of the comparisons between the height data and the respective reference values and the rear suspension characteristic alteration means alters the characteristic of the rear suspensions in a plurality of states in response to the judgment result signals.

The rear suspension characteristic alteration means alters the rear suspension characteristic either immediately on receiving the judgment result signal or a definite time, or a delay time, after receiving it. The delay time is calculated depending on the vehicle speed so that the timing of the rear suspension characteristic alteration may coincide with that of rear wheels passing the bump or dip which the front wheel has passed and detected.

BRIEF DESCRIPTION OF THE DRAWINGS

FIGS. 18A, 18B, 18C, 18D, 18E and 18F show flowcharts of process step executed by the ECU in the third embodiment.

DETAILED DESCRIPTION OF PREFERRED EMBODIMENTS

Figure 1:
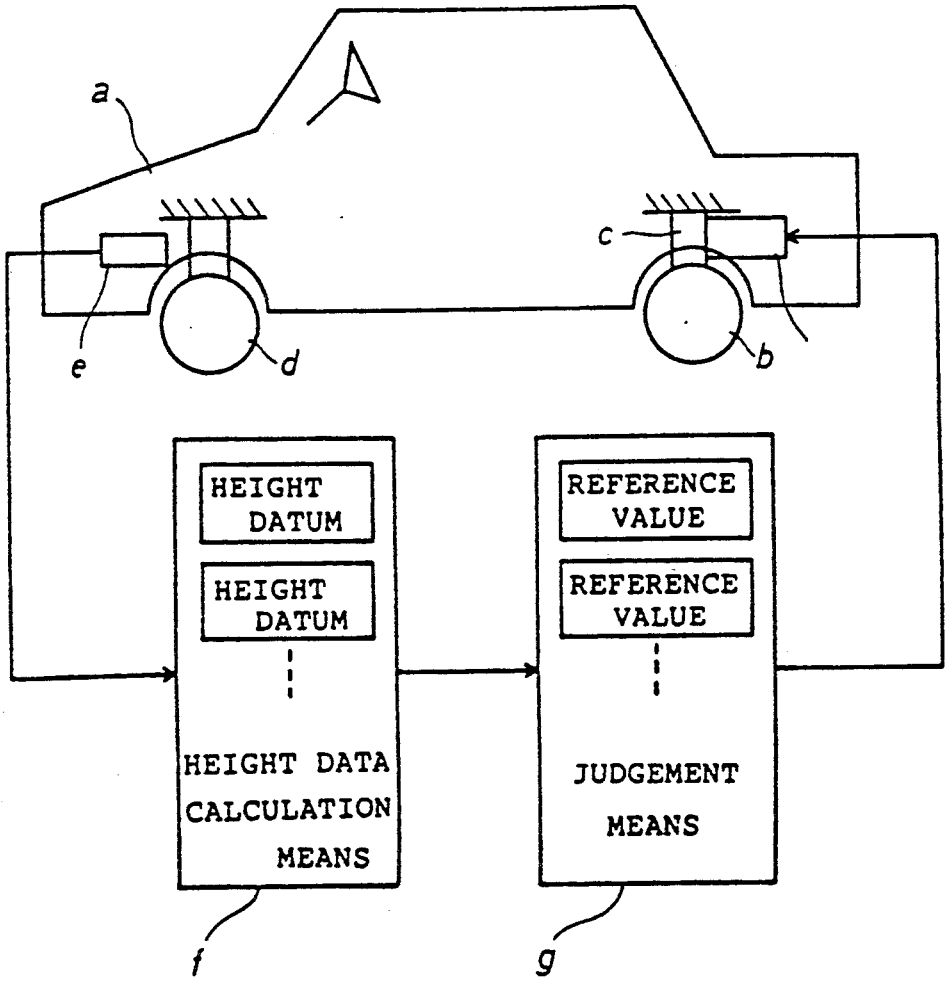
FIG. 1 shows an outline of the first and second embodiments of the present invention.

FIG. 1 shows an outline of the first and second embodiments of the present invention. In these embodiments, the distance between a body a of an automobile and its front wheel d is found out by a front vehicle height detection means e to generate a front vehicle height signal and send it to a height data calculation means f.

The height data calculation means f calculates a plurality of secondary data from the vehicle height signal and sends them to a judgment means g, which sends a judgment result signal to the rear suspension characteristic alteration means h. The rear suspension characteristic alteration means h alters a characteristic of rear suspensions c provided between the body a and rear wheels b.

Figure 2A:
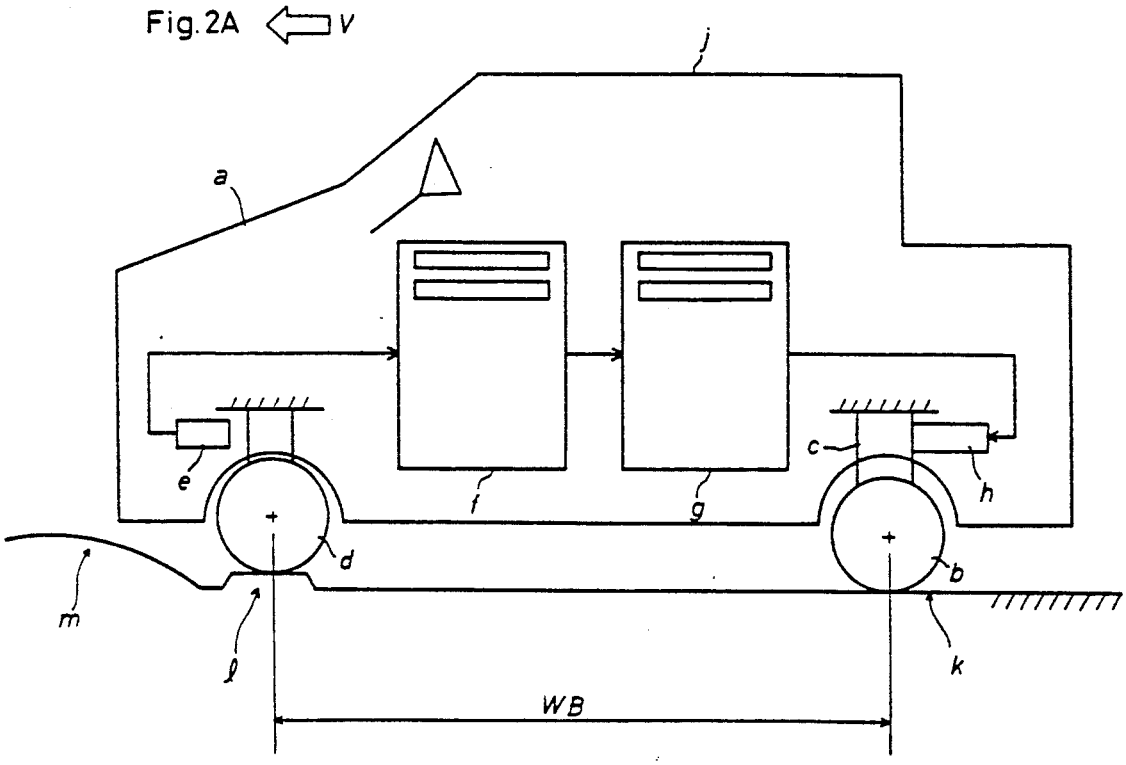
FIG. 2A shows a schematic figure of a vehicle passing a small bump and a large bump of a road surface explaining the first and second embodiments.
Figure 2B:
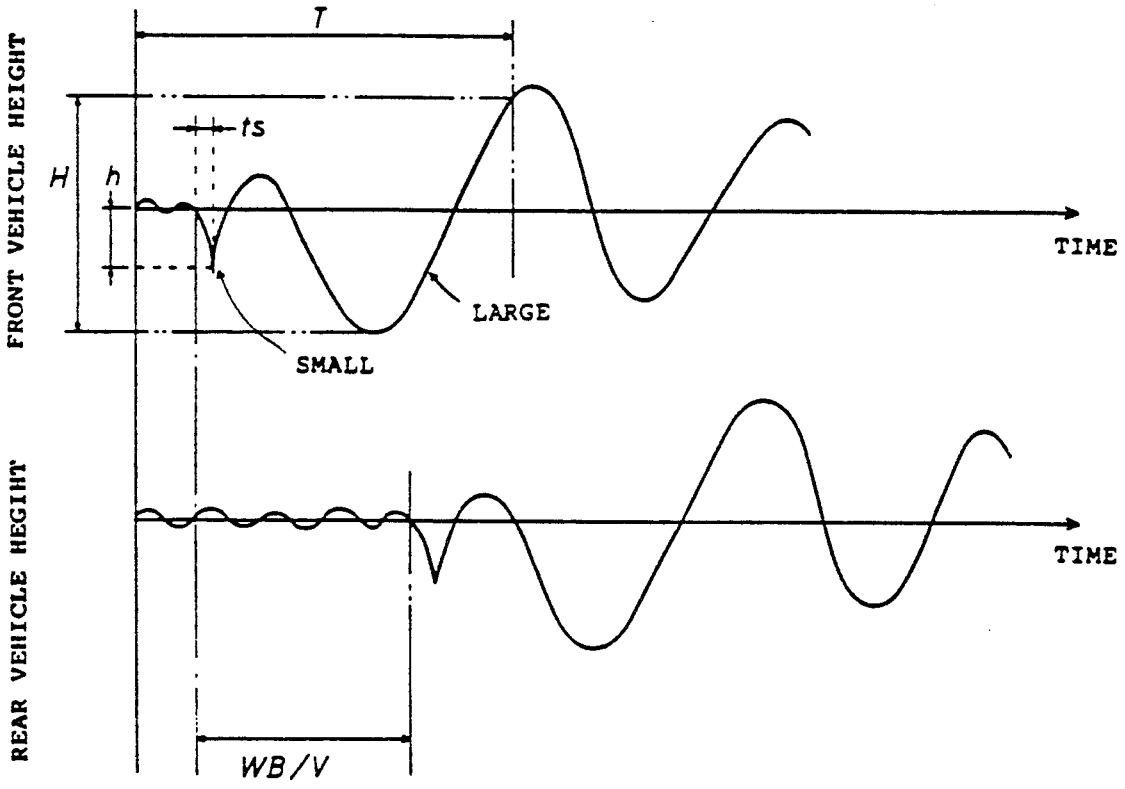
FIG. 2B shows time charts corresponding to the explanation of FIG. 2A.

FIG. 2A shows a schematic figure of a vehicle j passing a small bump 1 and a subsequent large bump m of a road surface k with a vehicle speed V. FIG. 2B shows timing charts of a front vehicle height and a rear vehicle height.

Provided a vehicle j is running on a road surface k and the front wheel d passes the small bump 1 and subsequently the large bump m as in FIG. 2A, a change in front vehicle height is detected by the front vehicle height detector e, which sends a front vehicle height signal as shown in FIG. 2B to the height data calculation means f. The height data calculation means f calculates and generates a plurality of height data as secondary data from the primary data of the front vehicle height signal. For example, a change in the front vehicle height signal h during a short time interval ts is generated and sent to the judgment means g. The judgment means g judges that the data exceeds a corresponding reference value and sends a command to the rear suspension characteristic alteration means h to alter the rear suspension characteristic to a 'SOFT' state. This enables rear suspensions absorb the shock that the rear wheels b receive in passing the small bump 1. At the same time, the height data calculation means f also calculates and generates, for example, a change in the front vehicle height signal H during a long time interval T and sends it to the judgment means g. The judgment means g judges that it exceeds another corresponding reference value and commands the rear suspension characteristic alteration means h to alter the rear suspension characteristic to a 'HARD' state. This time, the alteration prevents large vibrations which may otherwise occur after the rear wheels pass the large bump m.

Figure 3:
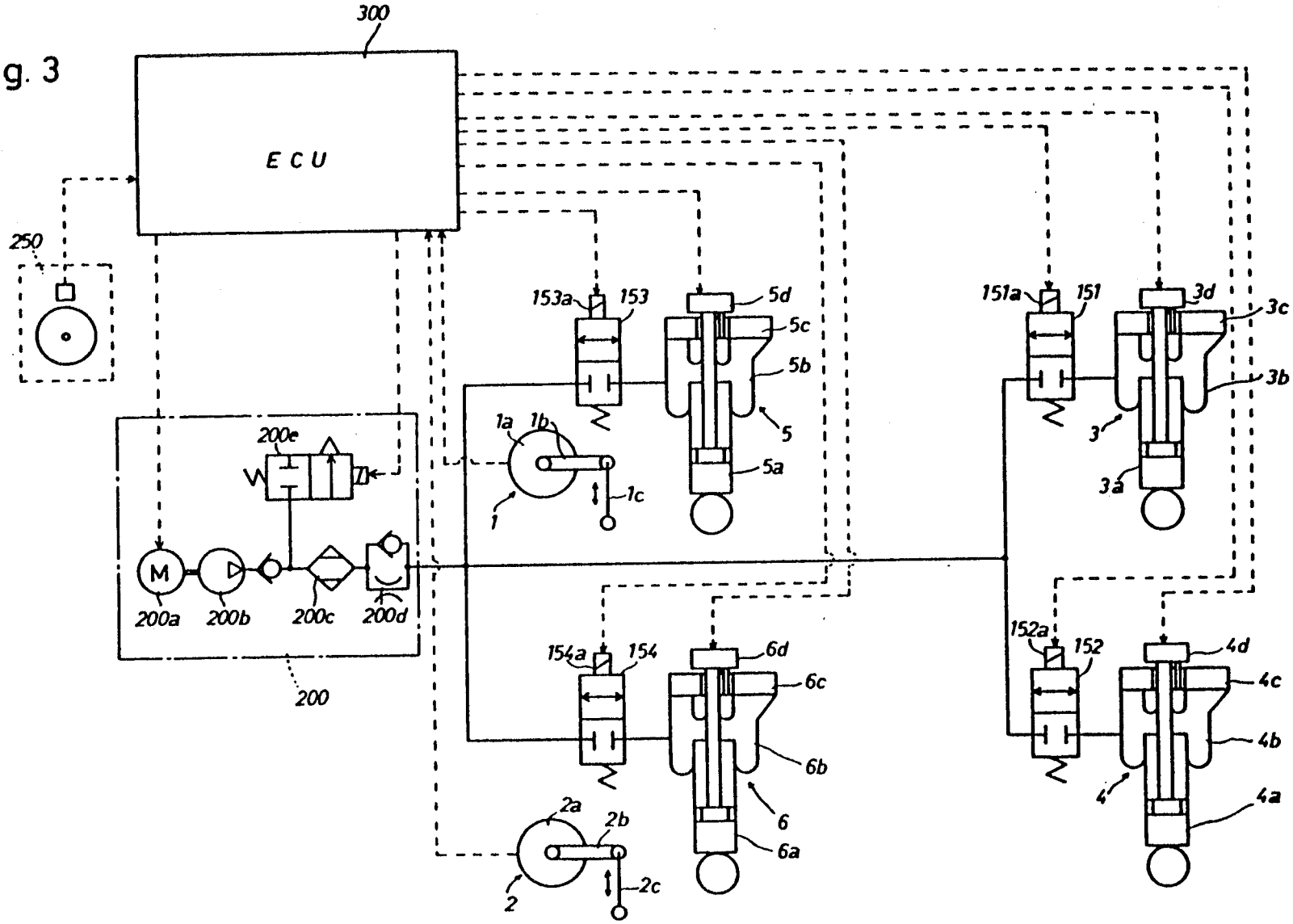
FIG. 3 shows details of the constitution of the embodiments.

FIG. 3 shows detail construction of the first embodiment of an automobile having air suspensions which includes a rear suspension controller according to the present invention.

A right front wheel vehicle height sensor 1 is provided between the body and right front wheel of the automobile to detect the distance between the automobile body and a right suspension arm, which follows the motion of the wheel. A left front wheel vehicle height sensor 2 is provided between the body and left front wheel of the vehicle to detect the distance between the vehicle body and a left suspension arm. The short cylindrical bodies 1a and 2a of the vehicle height sensors 1 and 2 are secured on the vehicle body. Links 1b and 2b extend from the center shafts of the bodies 1a and 2a almost perpendicularly to the center shafts. Turnbuckles 1c and 2c are rotatably coupled to the ends of the links 1b and 2b opposite the bodies 1a and 2a. The ends of the turnbuckles 1c and 2c opposite the links are rotatably coupled to portions of the suspension arms. A potentiometer, whose electric resistance changes depending on the rotation of the center shaft of the body of each vehicle height sensor to take out the change in the vehicle height in the form of a voltage change, is built in each of the bodies of the vehicle height sensors 1 and 2. Although the vehicle height sensors of the above-mentioned type are used in this embodiment, vehicle height sensors of such other type may be used that plural light interrupters are provided in the body of each sensor, and a disk having a slit coaxial with the center shaft of the sensor turns on or off the light interrupters depending on the change in the vehicle height to detect the height. FIG. 3 also shows an air suspension 3 which is provided between the suspension arm (not shown in the drawings) for the right rear wheel of the vehicle and the body thereof and extends in parallel with a suspension spring (not shown in the drawings). The air suspension 3 includes a shock absorber 3a, a main air chamber 3b, an auxiliary air chamber 3c and an actuator 3d in the main, and has a spring function, a vehicle height adjustment function and a shock absorber function. The same air suspensions 4, 5 and 6 are provided for the left rear wheel, right front wheel and left front wheel of the vehicle, respectively.

Figure 4:
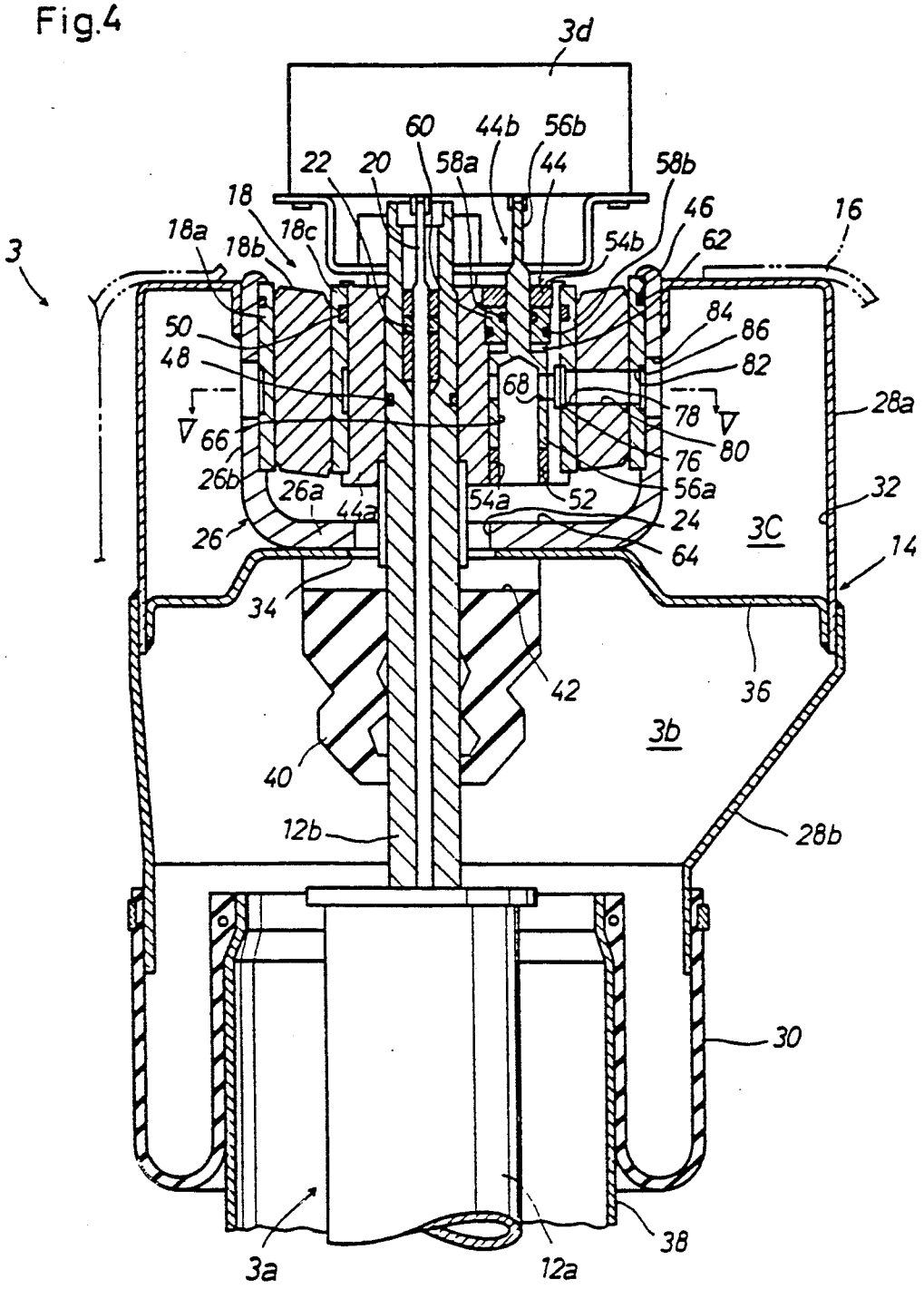
FIG. 4 shows a sectional view of a main part of an air suspension.
Figure 5:
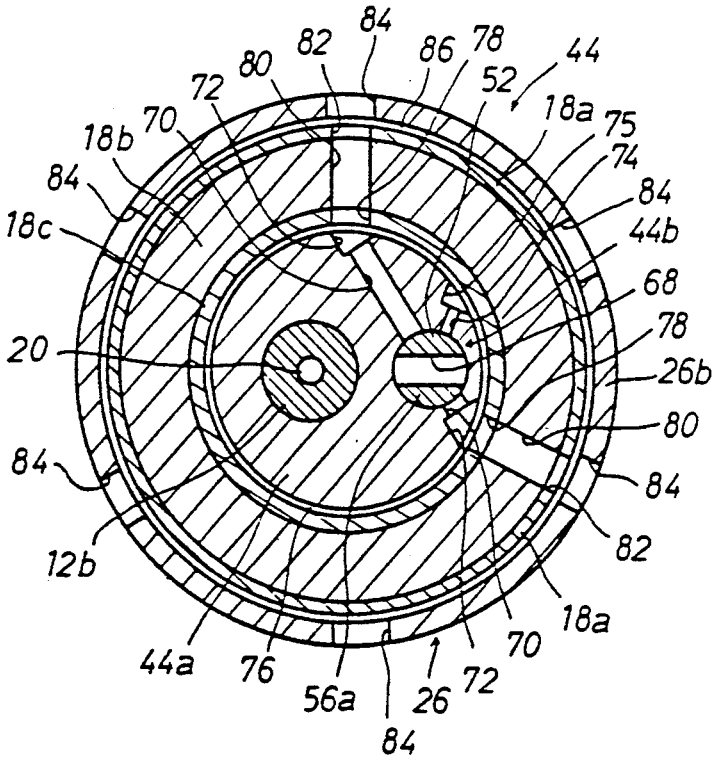
FIG. 5 shows a sectional view along a line V—V shown in FIG. 4.

FIG. 4 and FIG. 5 show constructions of the main part of the air suspension 3. FIG. 5 shows a sectional view along a line V—V shown in FIG. 4. The other air suspensions 4,5 and 6 have the same construction as the suspension 3. The air suspension 3 includes a conventional shock absorber 3a composed of a piston and a cylinder, and an air spring unit 14 provided in conjunction with the shock absorber. An axle (not shown in the drawings) is supported at the lower end of the cylinder 12a of the shock absorber 3a. An elastic cylindrical assembly 18 for elastically supporting a piston rod 12b to the vehicle body 16 is provided at the upper end of the piston rod 12b extending from the piston (not shown in the drawings) slidably fitted in the cylinder 12a. The shock absorber 3a is a conventional buffer whose damping force can be varied for adjustment by operating the valve function of the piston. A control rod 20 for adjusting the damping force is liquid-tightly and rotatably fitted with a sealing member 22 in the piston rod 12b.

The air spring unit 14 has a chamber 32 which is defined by a circumferential member 26 comprising a bottom 26a provided with an opening 24, through which the piston rod 12b is allowed to extend, and a wall 26b rising from the peripheral portion of the bottom 26a, an upper housing member 28a covering the circumferential member 26 and secured on the vehicle body, a lower housing member 28b open at the lower end and coupled to the lower end of the upper housing member 28a, and a diaphragm 30 made of an elastic material and closing the lower end of the lower housing member 28b. The chamber 32 is divided into a lower main air chamber 3b and an upper auxiliary air chamber 3c by a partition member 36 secured on the bottom 26a of the circumferential member 26 and having an opening 34 corresponding to the opening 24 provided in the bottom 26a. Both the chambers 3b and 3c are filled with compressed air. The partition member 36 is fitted with a conventional buffer rubber 40 which can be brought into contact with upper end of the cylinder 12a. The buffer rubber 40 has a passage 42 for connecting the openings 24 and 34 to the main air chamber 3b.

The elastic cylindrical assembly 18 is disposed inside the circumferential member 26 whose wall 26b defines the inside circumferential surface of the auxiliary air chamber 3c, in such manner that the assembly 18 surrounds the piston rod 12b. The cylindrical elastic assembly 18 is provided with a valve unit 44 for controlling the communication of both the air chambers 3b and 3c. The assembly 18 includes an outer cylinder 18a, a cylindrical elastic member 18b and an inner cylinder 18c which are disposed concentrically to each other. The cylindrical elastic member 18b is secured on both the cylinders 18a and 18b. The outer cylinder 18a of the assembly 18 is press-fitted on the wall 26b of the circumferential member 26 secured on the vehicle body, under the action of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically supported to the vehicle body by the cylindrical elastic assembly 18. An annular air sealing member 46 is tightly packed in between the outer cylinder 18a and the bottom 26b of the member 26. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 which is open at both the ends and extends in parallel with the piston rod 12b. A rotary valve 44b is rotatably supported in the hole 52. The valve 44b includes a main portion 56a, which can be brought into contact with a lower positioning ring 54a provided at the lower end of the hole 52; and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which connects with the main air chamber 3b through the openings 24 and 34 and the passage 42 of the buffer rubber 40, is formed in the lower portion of the elastic cylindrical assembly 18. The main portion 56a of the valve 44b has a recess 66 open to the chamber 64, and has a communication passage 68 extending through the main portion 56a in a diametral direction thereof across the recess 66.

The valve casting 44a, which houses the valve 44b, has a pair of air passages 70, each of which can connect at one end with the communication passage 68, as shown in FIG. 5.

The air passages 70 extend on almost the same plane outwards in a diametral direction of the hole 52, toward the peripheral surface of the valve 44b. The other end of each air passage 70 is open to the peripheral surface of the valve casing 44a through a face hole 72. An air passage 74, which can connect at one end with the communication passage 68, extends on almost the same place as the pair of air passages 70 toward the peripheral surface of the valve [casting] *casing* 44a, between the pair of air passages 70 outside the hole 52. The diameter of the air passage 74 is smaller than that of each of the air passages 70. The other end of the air passage 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b corresponding to the openings 78. The through holes 80 are made open to the peripheral surface of the outer cylinder 18a through the openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a are provided with plural openings 84 which are located at equal intervals in the circumferential direction of the member 26 and extend continuously to the auxiliary air chamber 3c to connect the openings 78 and 82 and the through holes 80 to the auxiliary air chamber 3c. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided correspondingly to the two air passages 70 of the valve casing 44a in the embodiment shown in FIG. 3(B), the air passages 70 and 74 can be provided in optional positions in the circumferential direction of the elastic member 18b because the annular air passage 76, with which the air passages 70 and 74 connect, is formed between the inner cylinder 18c and the valve casing 44a.

A control rod 20 for adjusting the damping force of the shock absorber 3a, and a conventional actuator 3d for rotating the valve 44b of the valve unit 44, are provided at the upper end of the piston rod 12b, as shown FIG. 4.

Since the air suspension 3 has the above-mentioned construction, the air suspension performs actions described hereinafter. When the valve 44b is kept in such a closed position shown in FIG. 5 that the communication passage 68 of the valve does not connect with any of the air passages 70 and 74 of the valve casing 44a, the main air chamber 3b and the auxiliary air chamber 3c are disconnected from each other so that the spring constant of the suspension 3 is set at a large value. When the actuator 3d has rotated the valve 44b into such a position that the communication passage 68 of the valve connects with the large-diameter air passages 70 of the valve casing 44a, the main air chamber 3b is connected to the auxiliary air chamber 3c through the communication passage 68 communicating with the main air chamber, the large-diameter air passages 70 and the openings 78 and through holes 80 of the elastic assembly 18 and the openings 82 and 84, so that the spring constant of the suspension 3 is set at a small value. When the valve 44b is rotated into such a position by the regulated actuator 3d that the communication passage 68 of the valve connects with the small-diameter communication passage 74 of the valve casing 44a, the main air chamber 3b is connected to the auxiliary air chamber 3c through the communication passage 68 communicating with the main air chamber, the small-diameter air passage 74, the air passage 76, the openings 78 and through holes 80 of the elastic assembly 18 and the openings 82 and 84, so that the spring constant of the suspension 3 is set at an intermediate value because the small-diameter air passage 74 provides a higher air flow resistance than the large-diameter air passages 70.

Leveling valves 151 through 154 are provided for the air suspensions 3 through 6, respectively, as shown in FIG. 3. A compressed air feed and discharge system 200, which is described below, is connected to or disconnected from the main air chambers 3b through 6b of the air suspensions 3 6 by the leveling valves 151 through 154 depending on whether electricity is supplied to solenoids 151a through 154a or not. When the leveling valves 151 through 154 are opened, compressed air is fed to the air suspensions, the height of the vehicle is increased. If the compressed air is discharged from the air suspensions, the height of the vehicle is decreased. When the leveling valve 151 through 154 are closed, the height of the vehicle is maintained.

In the compressed air feed and discharge system 200, a compressor 200b is driven by a motor 200a to produce the compressed air. An air drier 200c dries the compressed air to be fed to the air suspensions 3 through 6, to protect pipes and the parts of the air suspensions from moisture phase change in the main air chambers 3b through 6b and auxiliary air chambers 3c through 6c of the air suspensions. When the compressed air is fed to the air suspensions, a check valve 200d provided with a fixed orifice is opened. When the compressed air is discharged from the air suspensions, the check valve 200d is closed so that the air flows out through only the fixed orifice. When the compressed air is discharged from the air suspensions 3 through 6, a releasing solenoid valve 200e is driven so that the compressed air discharged from the air suspensions through the fixed orifice at the check valve 200d and through the air drier 200c is released into the atmosphere. The solenoid valve 200e can be regulated to change the volume of each of the main air chambers of the air suspensions 3 through 6 to adjust the height of the vehicle.

A vehicle speed sensor 250 is provided in a speedometer, for example, so that the sensor sends out a pulse signal corresponding to the speed of the vehicle, in response to the motion of the axle of the vehicle.

Figure 6:
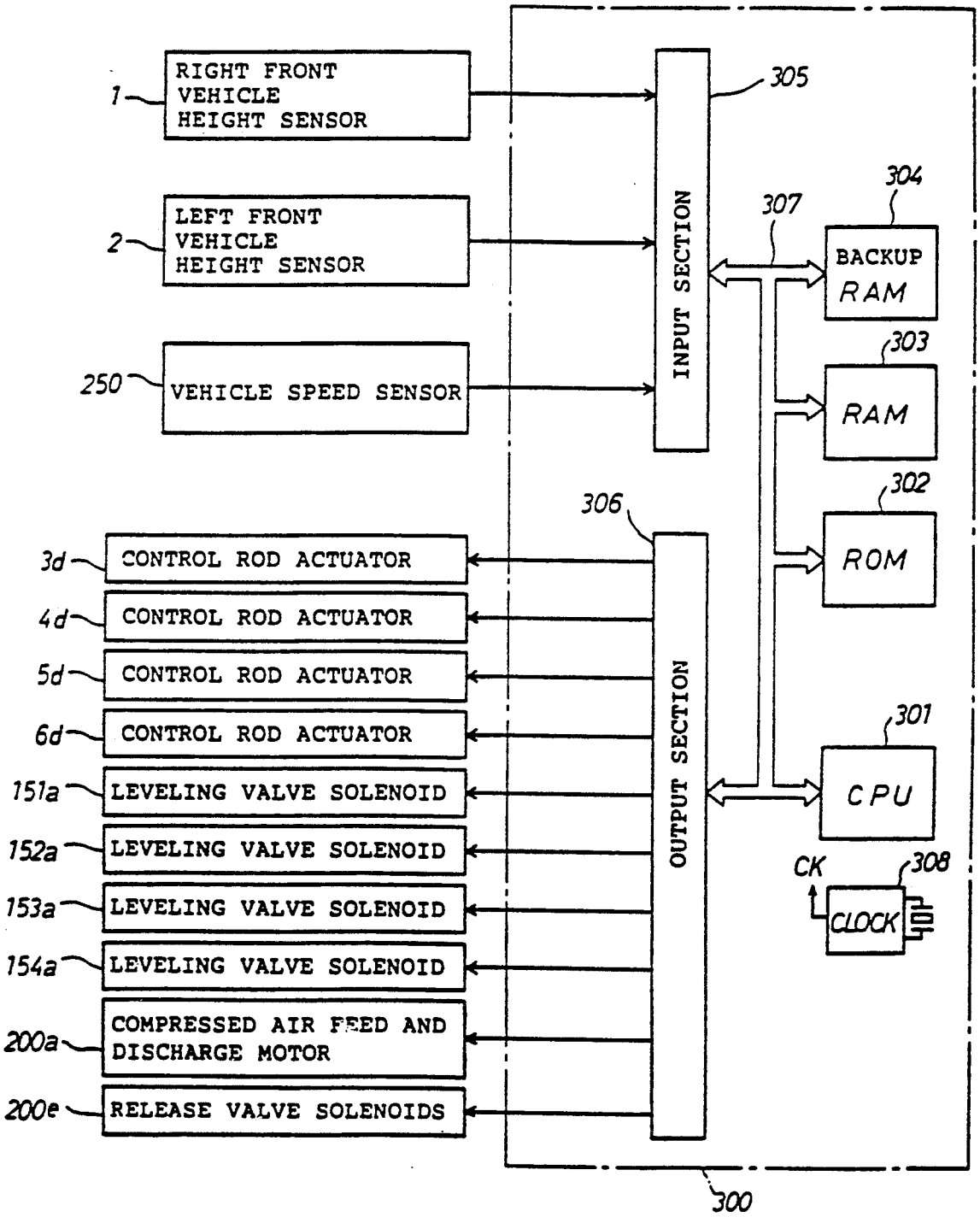
FIG. 6 shows a construction of an electronic control unit (ECU).

The output signals of the vehicle height sensors 1 and 2 and the vehicle speed sensor 250 are entered into an electronic control unit (hereinafter referred to as ECU) 300, which processes these signals to send out drive signals to the actuators 3d through 6d of the air suspensions 3 through 6, the leveling valves 151 through 154, the motor 200a of the compressed air feed and discharge system 200 and the solenoid valve 200e to perform appropriate control if necessary. FIG. 6 shows the construction of the ECU 300. A central processing unit (hereinafter referred to as CPU) 301 receives the output data from the sensors and performs operations on the data, in response to a control program, to carry out process steps for the control of various units or mean or the like. The control program and initial data are stored in a read-only memory (hereinafter referred to as ROM) 302. The data, which are entered in the ECU 300, and data necessary for operations and control, are stored into and read [our] *out* of a random-access memory (hereinafter referred to as RAM) 303. A backup random-access memory (hereinafter referred to as backup RAM) 304 is backed up by a battery so that even if the ignition key switch of the automobile is turned off, the backup RAM retains data which are needed after the turning-off of the switch. An input section 305 includes an input port not shown in the drawings, a waveshaping circuit provided if necessary, a multiplexer which selectively sends out the output signals of the sensors to the CPU 301, and an A/D converter which changes an analog signal into a digital signal. An output section 306 includes an output port not shown in the drawings, and a drive circuit for driving the actuators according to the control signals of the CPU 301 as occasion demands. A bus 307 connects circuit components such as the CPU 301 and the ROM 302, the input section 305 and the output section 306 to each other to transmit data. A clock circuit 308 sends out a clock signal at prescribed intervals to the CPU 301, the ROM 302, the RAM 303 and so forth so that a control timing is set by the clock signal.

Figure 7:
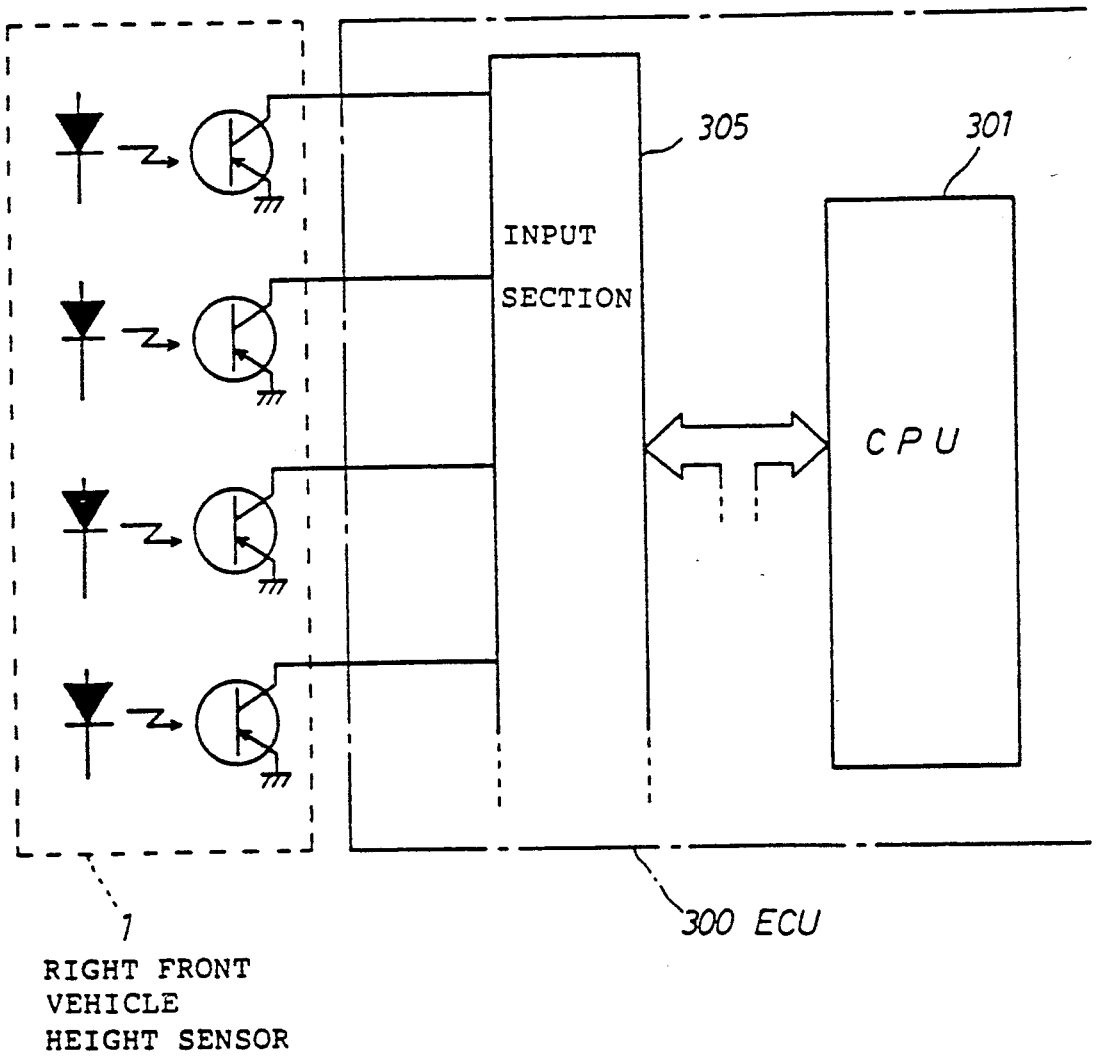
FIG. 7 shows a construction of an input section which receives a digital front vehicle height signal.
Figure 8:
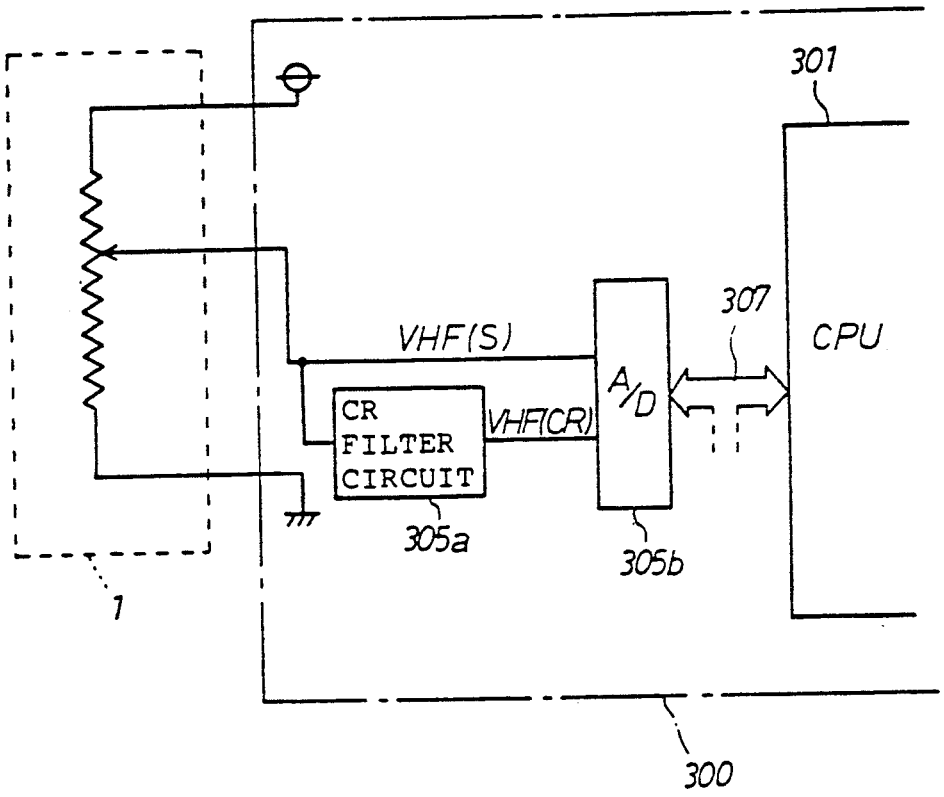
FIG. 8 shows a construction of an input section which receives an analog front vehicle height signal.

If the output signal of the vehicle height sensor 1 is a digital signal, the signal is transmitted to the CPU 301 through the input section 305 including a buffer as shown in FIG. 7. If the output signal of the vehicle height sensor 1 is an analog signal, a construction as shown in FIG. 8 is provided. In the latter case, the vehicle height sensor 1 sends out the analog signal of a voltage corresponding to the height of the vehicle. The analog voltage signal is converted into a voltage VHF(CR) indicating an average height of the vehicle, by a CR filter circuit 305a made of a low-pass filter. The voltage VHF(CR) is applied to an A/D converter 305b. The analog voltage signal is also directly applied as a voltage VHF(S) indicating the current height of the vehicle, to the A/D converter 305b. The converter 305b changes both the input signals into digital signals through the action of a multiplexer. The digital signals are transmitted from the converter to the CPU 301. The same applies to the left front wheel vehicle height sensor 2.

Figure 9:
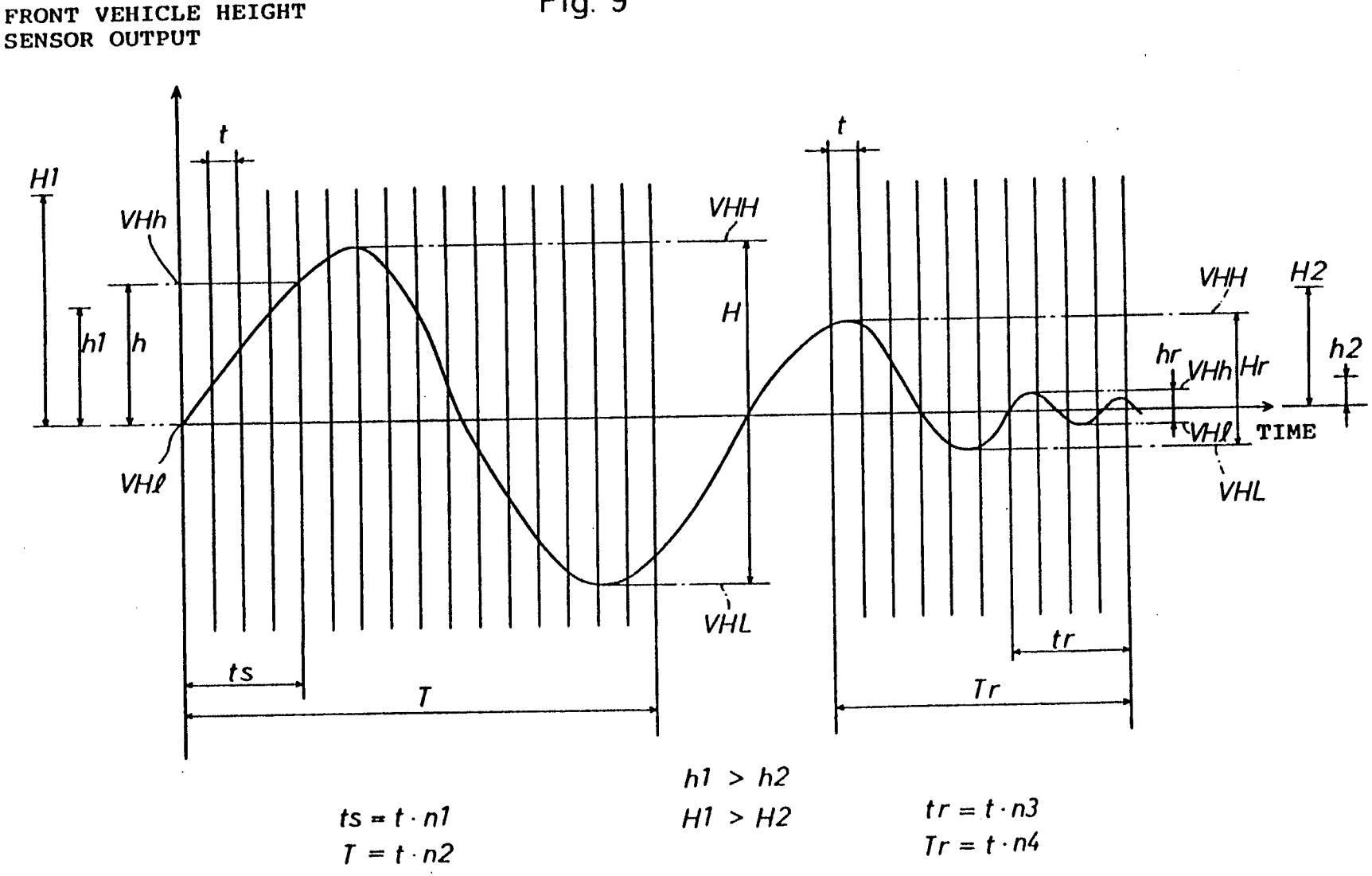
FIG. 9 shows a time chart explaining the first and the second judgment conditions of the first embodiment.

Here, relationships between the first and second judgment conditions and various variables of the first embodiment are explained with FIG. 9. A short time interval t in FIG. 9 is for sampling outputs from the front vehicle height sensors H1R and H2L and a time interval ts is for taking up a height data for judging in the first judgment condition. There is a relationship $$ts = t \times n1$$

between them, where n1 is an integer. For the first judgment condition, the largest front vehicle height change h is calculated by $$h = VHh - VHl.$$

where VHh and VHl denote a maximum front vehicle height and a minimum front vehicle height respectively during a time interval ts. When the height change h exceeded the corresponding reference value h1 in the first judgment condition, the rear suspension characteristic is altered from a 'SPORT' state which has been selected for a normal cruising of the automobile to a 'SOFT' state. A time interval tr is for taking up a height data for judging to return the altered rear suspension characteristic in the first judgment condition. There is a relationship $tr = t \times n3$, where n3 is an integer. The largest front vehicle height change hr during a time interval tr is calculated by $hr = VHh - VHl$. When the height change hr is smaller than the corresponding reference value h1 in the first judgement condition, the rear suspension characteristic is returned to the 'SPORT' state fron the 'SOFT' state. The intervals ts and tr may be the same, i.e. $ts = tr$. The reference value for alteration h1 and the reference value for returning h2 are determined as $h1 > h2$. A time interval T is for taking up a height data for the second judgment condition. There is a relationship $T = t \times n2$, where n2 is an integer. For the second judgment condition, the largest front vehicle height change H is calculataed by $H = VHH - VHL$, where VHH and VHL denote a maximum and a minimum front vehicle heights respectively during a time interval T. When the height change H exceeds the corresponding reference value H1 in the second judgment condition, the rear suspension characteristic is altered from a 'SOFT' or 'SPORT' state to a 'HARD' state. A time interval Tr is for taking up a height data for judging to return the altered rear suspension characteristic in the second judgment condition. There is a relationship $$Tr = T \times n4,$$

where n4 is an integer. The largest front vehicle height change Hr during a time interval Tr is calculated by $$Hr = VHH - VHL.$$

When the height change Hr is smaller than the corresponding reference value H2 in the second judgment condition, the rear suspension characteristic is returned to the 'SOFT' or 'SPORT' state from the 'HARD' state. The time intervals [Ts] *T* and Tr may be the same, i.e., [Ts] *T*=Tr. [the] *The* reference value for alteration H1 and the reference value for returning H2 are determined as $$H1 > H2.$$

The process steps, which are performed by the ECU 300, are hereinafter described referring to flow charts shown in FIGS. 10A–10E. The flowcharts indicate the process steps performed by the ECU 300 in response to the vehicle height sensor 1 of the linear type which sends out an analog signal, as shown in FIG. 8.

An outline of the process steps shown in the flow charts is described as follows with step numbers in the parentheses:

(1) A current front vehicle height VH(S)n is detected (108);

(2) The maximum front vehicle height and the minimum front vehicle height corresponding to each judgement condition and a delay time for returning rear suspension characteristic are calculated (110);

(3) It is judged whether the largest front vehicle height change exceeds a corresponding reference value h1 in the first judgment condition (122);

(4) If the largest front vehicle height change exceeds the reference value h1, the rear suspension characteristic is altered (160);

(5) Another front vehicle height is detected, the process steps as described above are repeated (104–116) and it is judged whether time has elapsed for returning the altered rear suspension characteristic (126);

(6) After the time had elapsed, it is judged whether the largest front vehicle height change is smaller than a corresponding reference value h2 in the first judgment condition (132);

(7) If the largest front vehicle height change is smaller than the reference value h2, the rear suspension characteristic is returned to the original state (160);

(8) If the largest front vehicle height change does not exceed the reference value h1 in the first judgment condition (122), it is then judged whether the largest front vehicle height change exceeds another corresponding reference value H1 (144);

(9) If the largest front vehicle height change exceeds the reference value H1, the rear suspension characteristic is altered (160);

(10) Another front vehicle height is detected, the process steps as described before are repeated (104–118, 138) and it is judged whether time has elapsed for returning the altered rear suspension characteristic (150);

(11) After the time elapsed, it is judged whether the largest front vehicle height change is smaller than a corresponding reference value H2 in the second judgment condition (156); and

(12) If the largest front vehicle height change is smaller than the reference value H2, the rear suspension characteristic is returned to the original state (160).

Among the process steps as described in (1)–(12), those relating to the effects of the present invention are (1)–(4), (8) and (9), while those (5)–(7) and (10)–(12) are supplementary process steps for this embodiment.

The alteration of rear suspension characteristic means, if the driving condition is that requires especially preventing shocks at the rear passanger seat, alteration to a 'SOFT' state. The actuators 3d and 4d are driven to connect the main air chambers 3b and 4b and the auxiliary air chambers 3c and 4c, respectively, or the damping forces of the shock absorbers 3a and 4a are decreased. If, on the other hand, the driving condition is that the controllability and stability are required against large vibrations due to the road surface irregularities, the alteration of the suspension characteristic means the alteration to a 'HARD' state. The main air chambers 3b and 4b and the auxiliary air chambers 3c and 4c are disconnected to make the spring constant of the air suspensions high or the damping forces of the shock absorbers 3a and 4a are increased. And if the driving condition is that for a normal cruising, the rear suspension characteristic is kept to be a 'SPORT' state, which is an intermediate state between the 'SOFT' state and the 'HARD' state. [In] *The* spring constant of the rear air suspensions or the damping forces of the shock absorbers are set to be an intermediate value.

The details of the process steps are hereinafter described. The process steps are repeatedly performed in every 5 msec. It is first judged whether or not the process steps are being performed for the first time since the activation of the ECU 300 (100). If the process steps are judged to be being performed for the first time, initial setting is effected (102), all variables are cleared and all flags are reset. After the initial setting is effected or if the process steps in the routine are judged to be performed for the second time or later, it is judged whether a timer T1 exceeds a front vehicle height sampling time interval t (104). The timer T1 is counted at step 200 in the intermittent interrupt routine process steps of FIG. 10(E). When the timer T1 elapses the time interval t, the timer T1 is reset (106) and current front vehicle height VH(S)n is inputted from the front vehicle height sensors 1 and 2 (108).

To detect the current vehicle height, either of the outputs of the vehicle height sensors for the right and left front wheels of the vehicle may be used. Since rear wheels receives a shock whichever of the front wheels has moved up or down due to the bump or dip of the road surface, the average of the outputs of both the vehicle height sensors for the front wheels may be used or the larger one of the outputs may be used.

Then, a delay time Tk for returning the rear suspension characteristic, the maximum front vehicle height for the first judgment condition VHh, the minimum front vehicle height for the first judgment condition [VH1] *VHl*, the maximum front vehicle height for the second judgment condition VHH and the minimum front vehicle height for the second judgment condition VHL are calculated (110). Details of this step 110 is explained with FIG. 10C as follows.

First, it is judged whether the current front vehicle height VH(S)n exceeds the past maximum front vehicle height VHh for the first judgement condition (110a). If the result is 'YES', a new maximum front vehicle height VHh is determined to be the current front vehicle height VH(S)n (110b). Otherwise it is judged whether the current front vehicle height VH(S)n is less than the past minimum front vehicle height [VH1] *VHl* for the first judgment condition (110c). If the result is YES, a new minimum front vehicle height [VH1] *VHl* is determined to be the current front vehicle height VH(S)n (110d). Otherwise, it is judged whether the current front vehicle height VH(S)n exceeds the past maximum front vehicle height VHH for the second judgment condition (110e). If the result is YES, a new maximum front vehicle height VHH is determined to be the current front vehicle height VH(S)n (110f). Otherwise it is judged whether the current front vehicle height VH(S)n is less than the past minimum front vehicle height VHL for the second judgement condition (110g). If the result is YES, a new minimum front vehicle height VHL is determined to be the current front vehicle height VH(S)n (110h). Otherwise the vehicle speed is detected by the vehicle speed sensor 250 (100i) and the delay time Tk is calculated (110j) as $$Tk = WB/V + A1,$$

where WB is a wheelbase of the vehicle, V is a vehicle speed and A1 is a compensatory term regarding of a detecting lag and passing time. Those are details of step 110.

Returning to FIG. 10A, it is judged whether 'AUTO' mode is selected by the driver (112). If the 'AUTO' is selected, the vehicle speed is compared with a reference value V0(114).

If V>=V0 the vehicle is judged to be moving and subsequent process steps are executed.

If is judged whether a flag F1 is set (116), which indicates the process step is in the first judgement condition. This time, as F1=0, step 118 is selected and it is judged whether a time T2 exceeds a time interval ts for alteration control of the first judgement condition. The timer T2 is counted at step 200 in the intermittent interrupt routine process steps of FIG. 10E. When the timer T2 elapses the time interval ts, the timer T2 is reset (120).

Then it is judged whether the largest front vehicle height change during the time interval ts exceeds a corresponding reference value h1 for alteration control of the first judgment condition (122). If the result is 'YES', the flat F1 is set (124) and the process step goes to step 136. Otherwise, the process step directly goes to step 136, and the maximum front vehicle height VHh and the minimum front vehicle height [VH1] *VHl* during the time interval ts are replaced by the current front vehicle height VH(S)n.

Figure 10A:
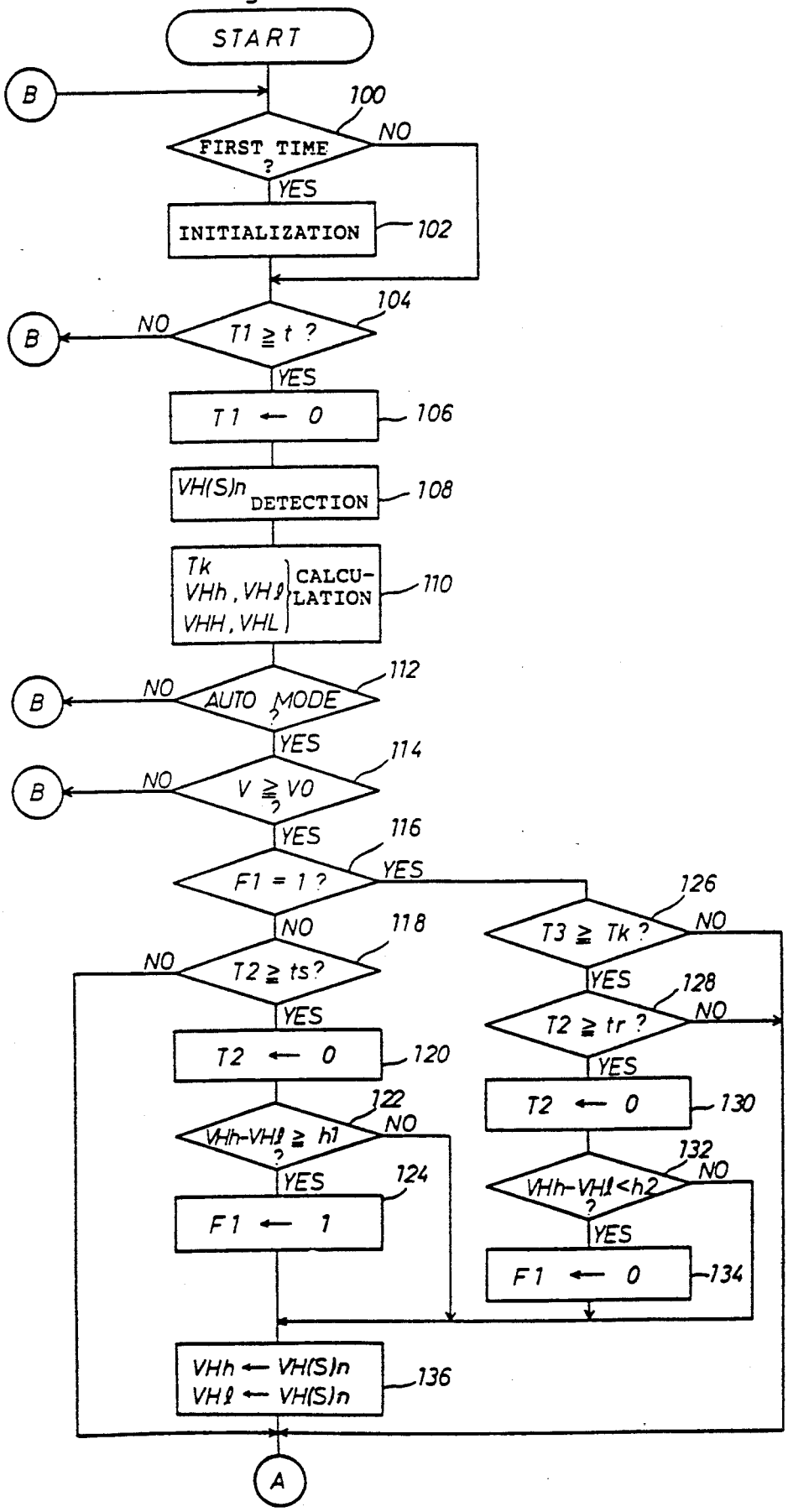
FIGS. 10A, 10B, 10C, 10D, and 10E show flowcharts of process steps executed by the ECU in the first embodiment.
Figure 10B:
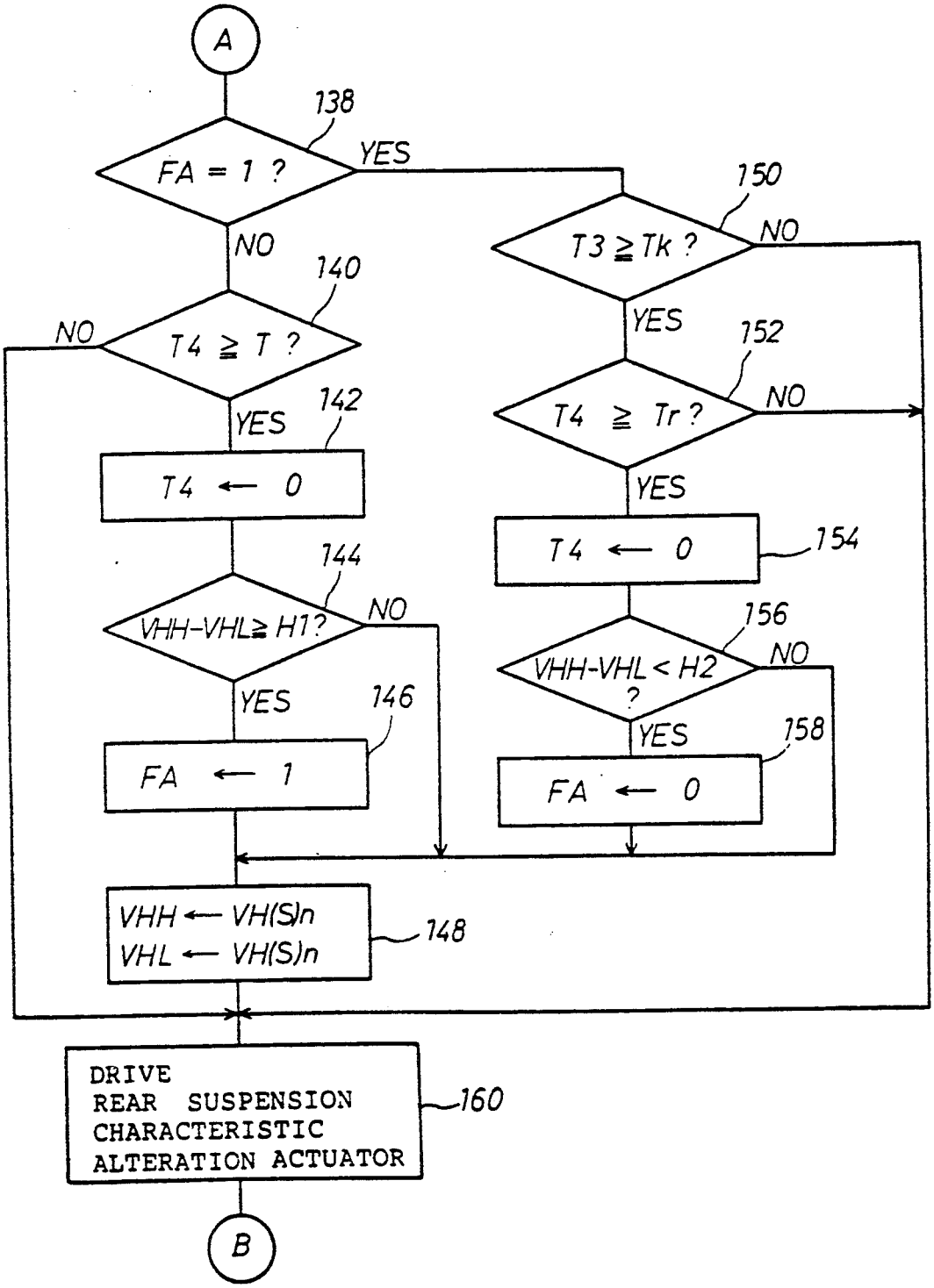
Figure 10C:
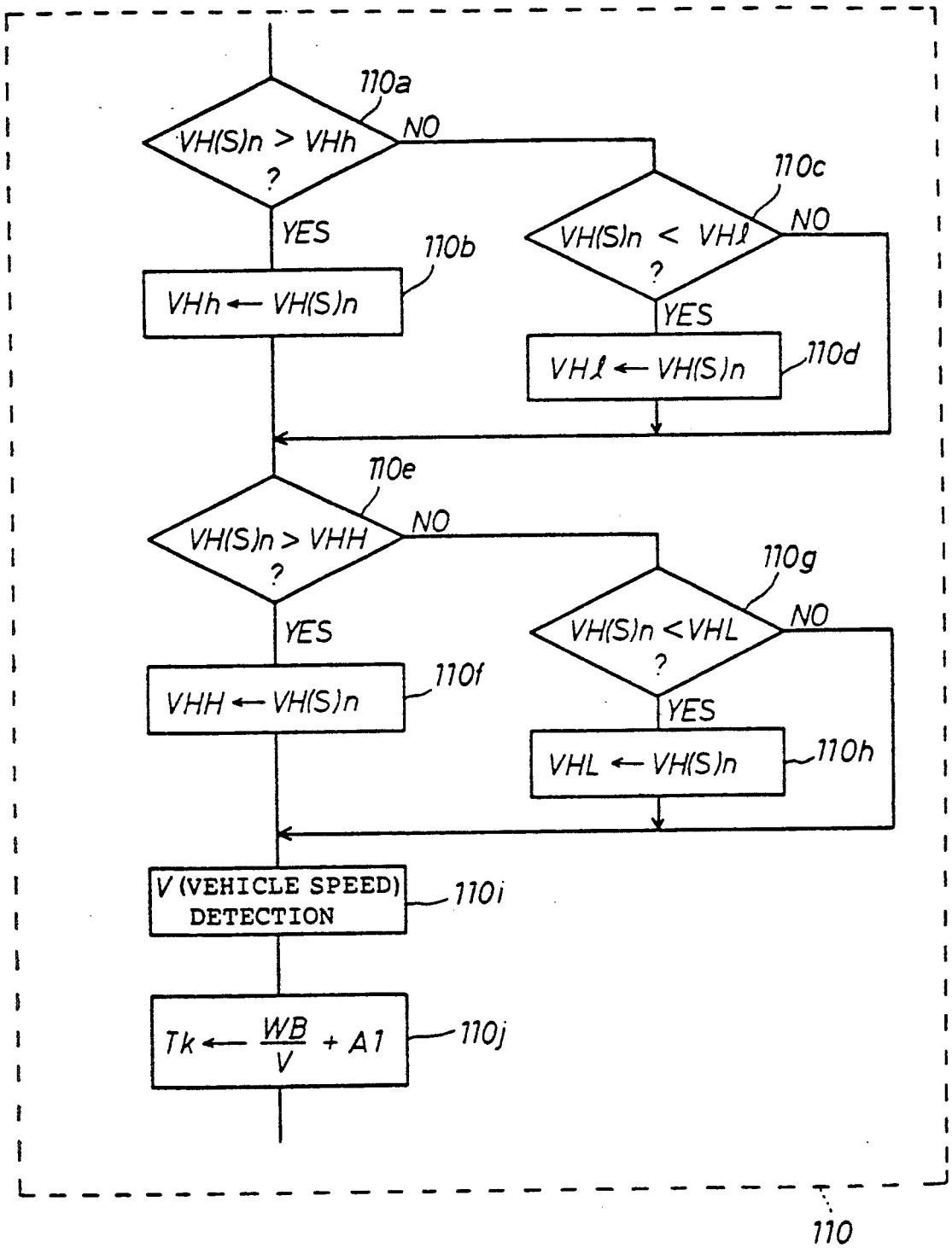

Then at step 138 in FIG. 10B, it is judged whether a flat FA is set, which indicates the process step is in the second judgment condition. This time, as FA=0, step 140 is selected and it is judged whether a timer T4 exceeds a time interval T for alteration control of the first judgement condition. The timer T4 is counted at step 200 in the intermittent interrupt routine process steps of FIG. 10E. This time, as T4 does not exceed the time interval T, the process step goes to step 160, where the rear suspension characteristic alteration actuators are driven. Details of the step 160 are explained with FIG. 10D as follows.

It is judged whether the flag F1 is set (160a) and, since this time F1=1, it is judged whether the flag FA is set (160c). Since FA=0 this time, it is judged whether a flat FSF is set (160f). Since this time FSF=0, the rear suspension characteristic is altered to the 'SOFT' state, the flag FSF is set and flags FSP and FH representing the 'SPORT' and 'HARD' states respectively are reset (160i). Then a timer T3 for counting a delay time until returning the rear suspension characteristic is reset (160j). Those are details of step 160 and the process steps returns to B in FIG. 10B.

After executing steps 100–114, step 126 is selected at step 116, since F1=1 this time. It is judged whether the timer T3 exceeds a delay time Tk for returning the rear suspension characteristic (126). The timer T3 is counted at step 200 the intermittent interrupt routine process steps of FIG. 10E. If the result is 'NO', process steps goes to step 138 and, since FA=0 this time, then the step 140, where it is judged whether the timer T4 exceeds the time interval T. If the timer T4 exceeds the time interval T, the timer T4 is reset (142). Then it is judged whether the largest front vehicle height change during the time interval T exceeds a corresponding reference value H1 for alteration control of the second judgment condition (144).

If the result is YES, the flag FA is set (146), and the process steps goes to step 148.

This time, the explanation is proceeded as the result is NO, so that the process step directly goes to step 148, and the maximum front vehicle height VHH and minimum front vehicle VHL during the time interval T are replaced by the current vehicle height VH(S)n. Then step 160 is executed, whose details are explained with FIG. 10D as follows. Since current flags are such that F1=1, FA=0 and FSF=1, the process steps proceed through steps 160a, 160c and 160f and go back to B in FIG. 10A. Then after executing 100 and 104–[106] *116* and when the timer T3 exceeds Tk (126), it is judged whether the timer T2 exceeds a time interval tr for returning control of the first judgment condition. The timer T2 is counted at step 200 in the intermittent interrupt routine process steps of FIG. 10E. [when] *When* the timer T2 elapsed the time interval tr, the timer T2 is reset (130).

Then, it is judged whether the largest front vehicle height change during the time interval tr is less than a corresponding reference value h2 for returning control of the first judgement condition (132). If the result is YES, the flag F1 is reset (134) and the process step goes to step 136. This time, the explanation is proceeded as the result is 'YES', so that the maximum front vehicle height VHh and minimum front vehicle height VHl during the time interval tr are replaced by the current front vehicle height [(]VH(S)n. Then, the process steps proceed through steps 138, 140 and 160, whose details are explained with FIG. 10D as follows. Since current flags are such that F1=0, FA=0, FSF=1, FH=0 and FSP=0, the process steps proceed through 160a, 160b, 160e and 160h, where the rear suspension characteristic is altered from the 'SOFT' state to the 'SPORT' state, the flag FSP is set and the flags FH and FSF are reset. Lastly for the process steps of step 160, the timer T3 is reset at step 160j.

As another cycle of the routine from B of FIG. 10A, steps 100 and 104–116 are performed. Since this time F1=0, the process steps proceed through steps 118, 120, and 122, where the result this time is provided to be NO. The process step proceed through steps 138, 140 and 142, and 140 of FIG. 10B, where it is judged whether the largest front vehicle height change during the time interval T exceeds a corresponding reference value H1 for alteration control of the second judgment condition (144). Provided the result is YES, the flag FA is set (146), and the process step goes to step 148. Since current flags are such that F1=0, FA=1, FSP=1, FH=0 and FSF=0, the process step proceed through 160a, 160b, 160d and 160g, where the rear suspension characteristic is altered from the 'SPORT' state to the 'HARD' state, the flage FH is set and the flags FSP and [FSf] *FSF* are reset. Lastly for the process steps of step 160, the timer T3 is reset at step 160j.

As another cycle of the routine from B of FIG. 10A, steps 100 and 104–116 are performed. Since this time F1=0, the process steps proceed through steps 118, 120, 122, 136 and 138 of FIG. 10B. As FA=1 this time, it is judged whether the timer T3 exceeds a delay time Tk for returning the rear suspension characteristic (150). The timer T3 is counted at step 200 in the intermittent interrupt routine process steps of FIG. 10E. If the result is NO, the process step goes to step 160 and, since current flags are such that F1=1, FA=1, FH=1, FSP=0 and FSF=0, the process steps proceed through steps 160a, 160b and 160d and go back to B in FIG. 10A.

As described before, the process steps proceed through 100, 104–116, 118, 120, 122 and 136 of FIG. 10A then 138 and 150 of FIG. 10B. After the time interval Tk, it is judged whether the timer T4 exceeds a time interval Tr for returning control of the second judgment condition (152). [the] *The* timer T4 is counted at step 200 in the intermittent interrupt routine process steps of FIG. 10E. When the timer T4 elapses the time interval Tr, the timer T4 is reset (154).

Then it is judged whether the largest front vehicle height change during the time interval Tr is less than a corresponding reference value H2 for returning control of the first judgment condition (156). If the result is YES, the flag FA is reset (158), and the process steps goes to step 148.

Then at step 160, since current flags are such that F1=0, FA=0, FSP=0, FH=1 and FSF=0, the process steps proceed through 160a, 160b, 160e, and 160h, where the rear suspension characteristic is altered from the 'HARD' state to the 'SPORT' state, the flag FSP is set and the flags FH and FSF are reset. Lastly for the process steps of step 160, the timer T3 is reset at step 160j. Then other routine cycles are repeated from B of FIG. 10A.

In the explanation above, the order of the alteration of the rear suspension characteristic is such that alteration by the first judgment condition, returning by the first judgment condition, alteration by the second judgment condition and then returning by the second judgment condition. In actual driving case, though, the order is not necessarily the same as that. For example, if a large bump [is followed by] *follows* a small bump, the rear suspension characteristic is altered to the 'HARD' state by the second judgment condition immediately after passing a small bump with the 'SOFT' state, and then returned to the 'SPORT' state by the second judgment condition after the vibration decays.

Figure 10D:
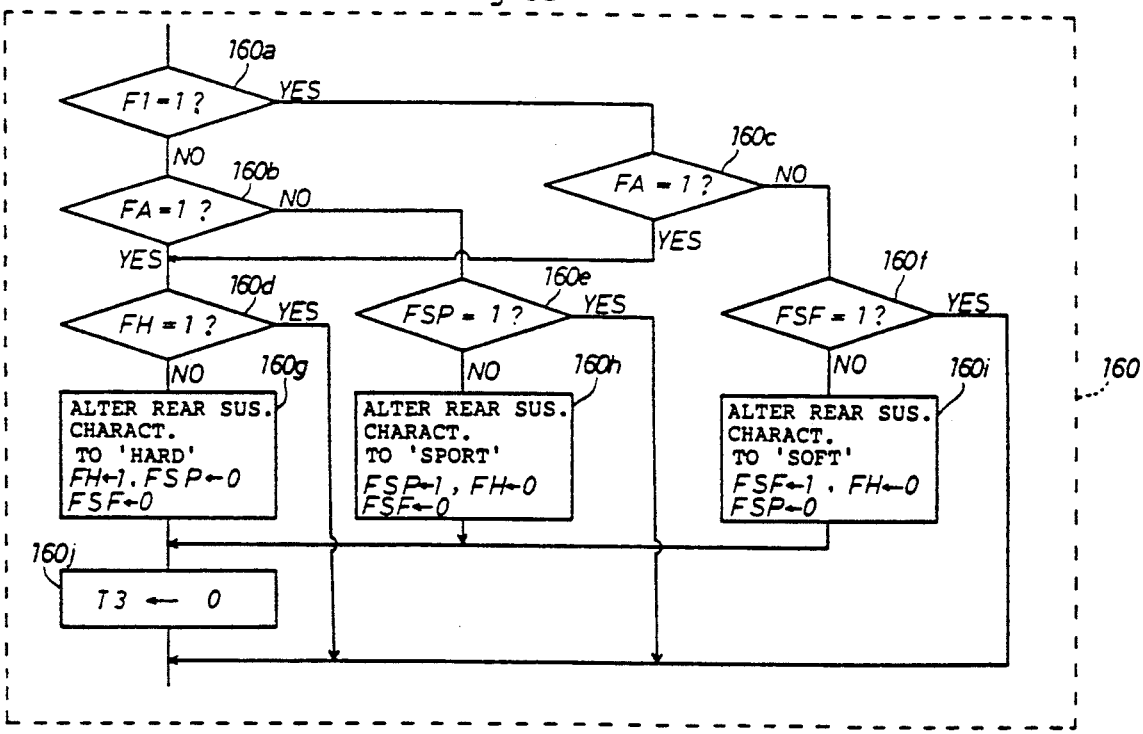
Figure 10E:
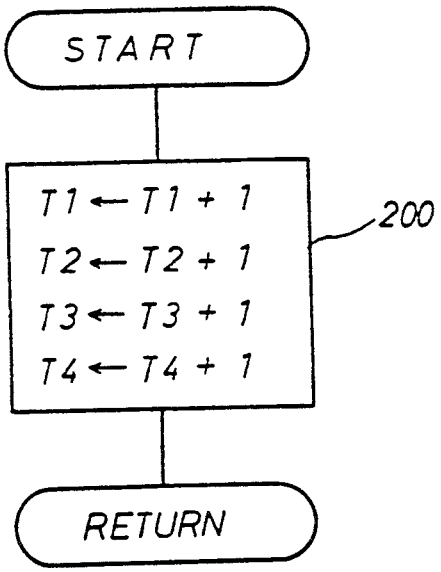

The process steps in FIG. 10D (160a, 160b, 160c) are so arranged that the second judgment condition is given a priority over the first judgment condition. This is for improving the controllability and stability of the automobile in case sporadic small irregularities are followed by large irregularities of the road surface.

Figure 11A:
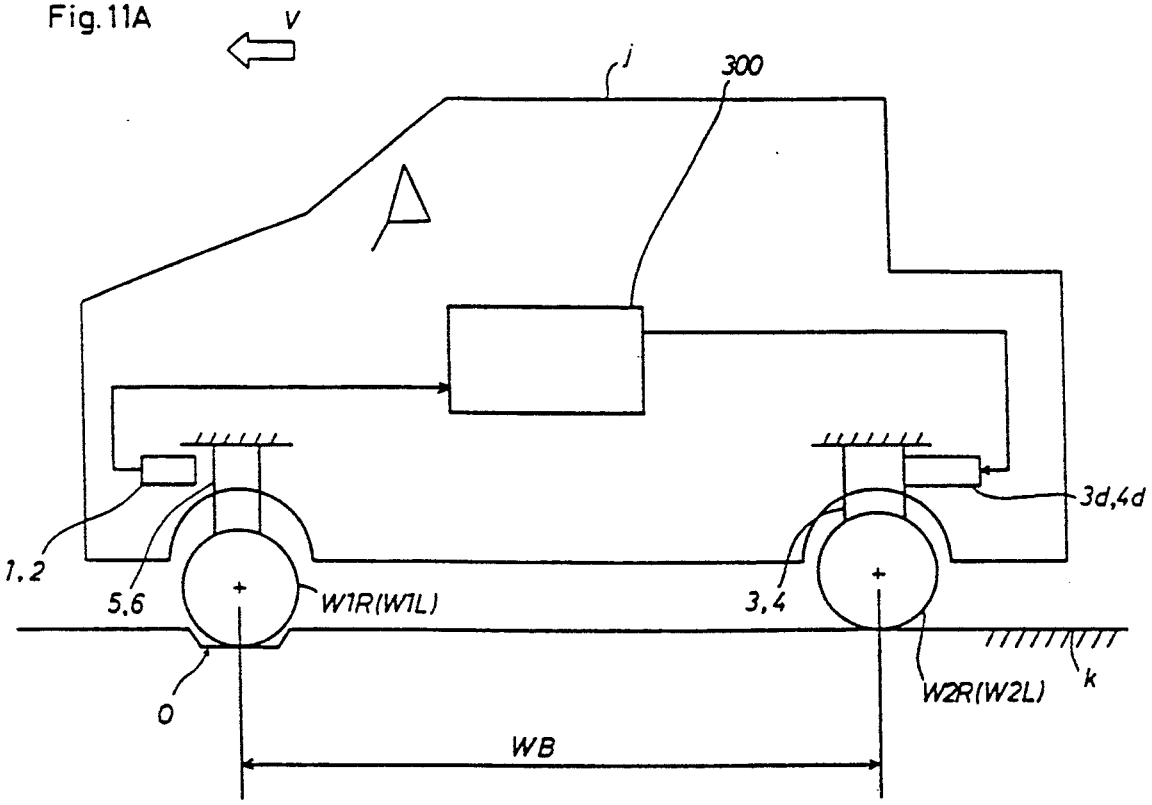
FIG. 11A shows a schematic figure of a vehicle passing a small dip of a road surface in the first embodiment and FIG. 11B shows timing charts corresponding to FIG. 11A.
Figure 11B:
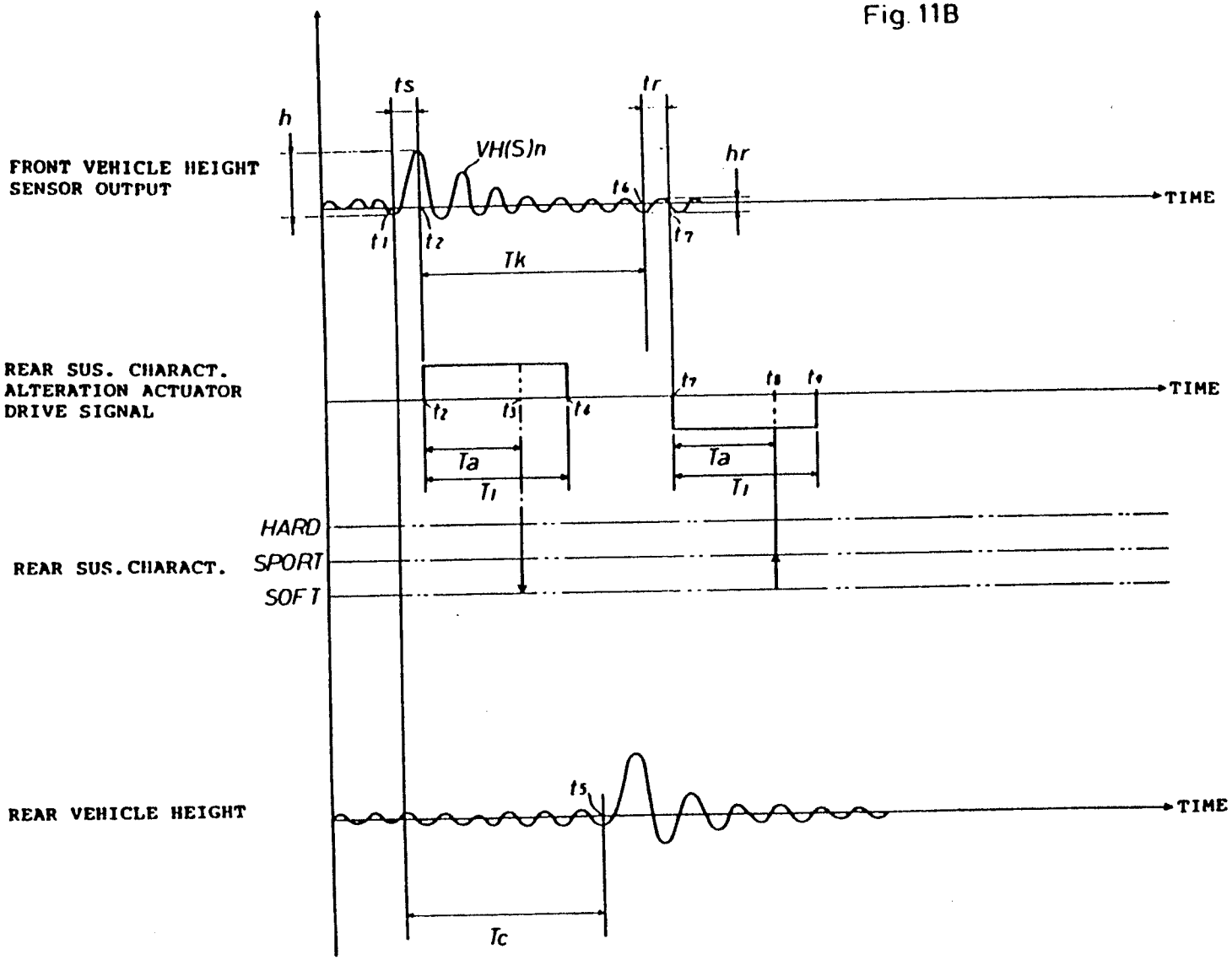

An example of control timing performed by the first judgment condition is then explained with FIGS. 11A and 11B. FIG. 11A shows an automobile j whose front wheel W1R or W1L is passing a small dip O of a road surface k with a speed V. FIG. 11B shows time charts of the output of the front vehicle height sensor 1 or 2, the drive signal for the rear suspension characteristic alteration actuators 3d and 4d, the rear suspension characteristic and the rear vehicle height.

The front wheel W1R or W1L begins to move down into the small dip O at a time point t1. Since then the output VH(S)n of the front vehicle height sensor 1 or 2 becomes large. From the time point t1, the front vehicle height is sampled every time interval t as shown in FIG. 9, and at a time point t2, which is a time interval ts later than the time point t1, the ECU 300 judges that the largest front vehicle height change h exceeds a corresponding reference value h1. At this time point, the ECU 300 drives the rear suspension alteration actuators 3d and 4d to alter the rear suspension characteristic to a 'SOFT' state, i.e. the main air chambers 3b and 4b are connected with the auxiliary air chambers 3c and 4c, respectively, by the large section passage 70. The alteration operation is finished at a time point t3, a time interval Ta later than t2. The driving signal from the ECU 300 is sent to the actuators 3d and 4d until a time point t4, though the alteration operation per se is finished before at the time point t3. Between the time point t1 and a time point t5, which is a time interval Tc later than the time point t1, the rear wheels W2R, W2L begin to move down into the small dip O.

At a time point t6, which is a time interval Tk for returning control after the time point t2, the rear wheels W2R, W2L have passed the small dip O. At a time point t7, which is a time interval tr later than the time point t6, the ECU 300 judges that the largest front vehicle height change hr is less than a corresponding reference value h2. At this time point, the ECU 300 drives the rear suspension alteration actuators 3d and 4d to alter the rear suspension characteristic to a 'SPORT' state, i.e. the main air chambers 3b and 4b are connected with the auxiliary air chambers 3c and 4c, respectively, by the small section passage 74.

The alteration operation is finished at a time point t8, a time interval [ta] *Ta* later than [T7] *t7*. The driving signal from the ECU is sent to the actuators 3d and 4d until a time point t9, though the alteration operation per se is finished before at the time point t8.

Figure 12A:
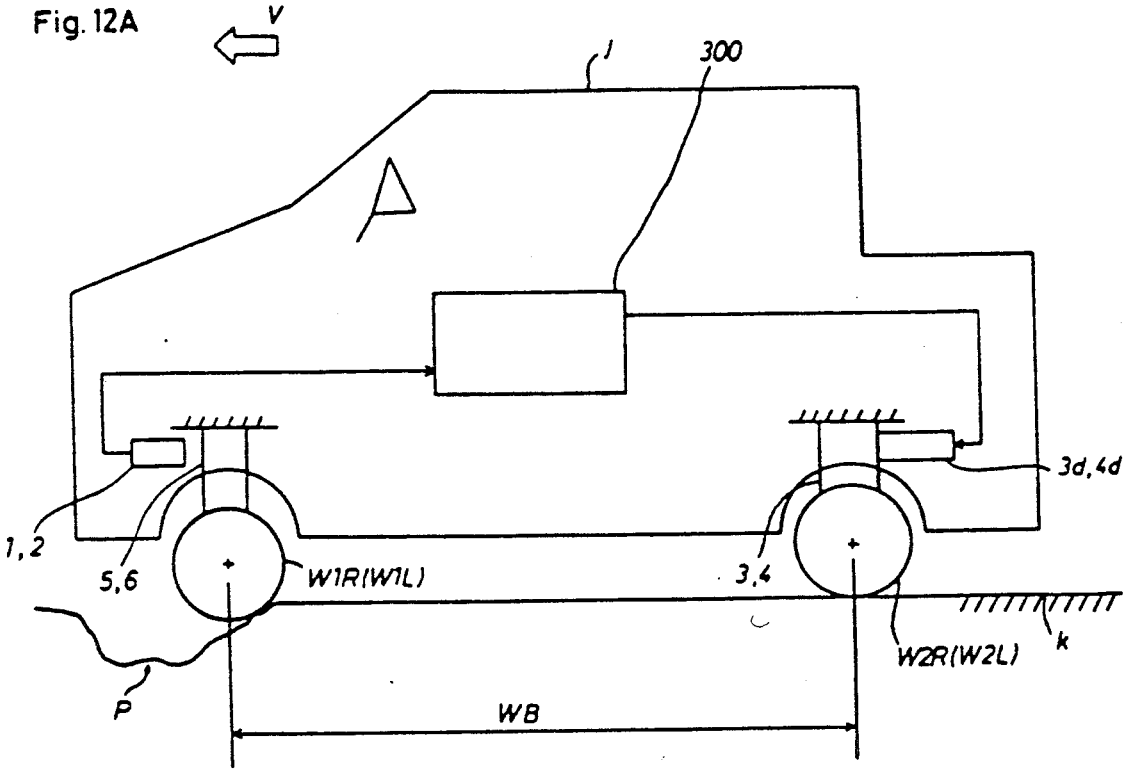
FIG. 12A shows a schematic figure of a vehicle passing a large dip of a road surface in the first embodiment and FIG. 12B shows timing charts corresponding to FIG. 12A.
Figure 12B:
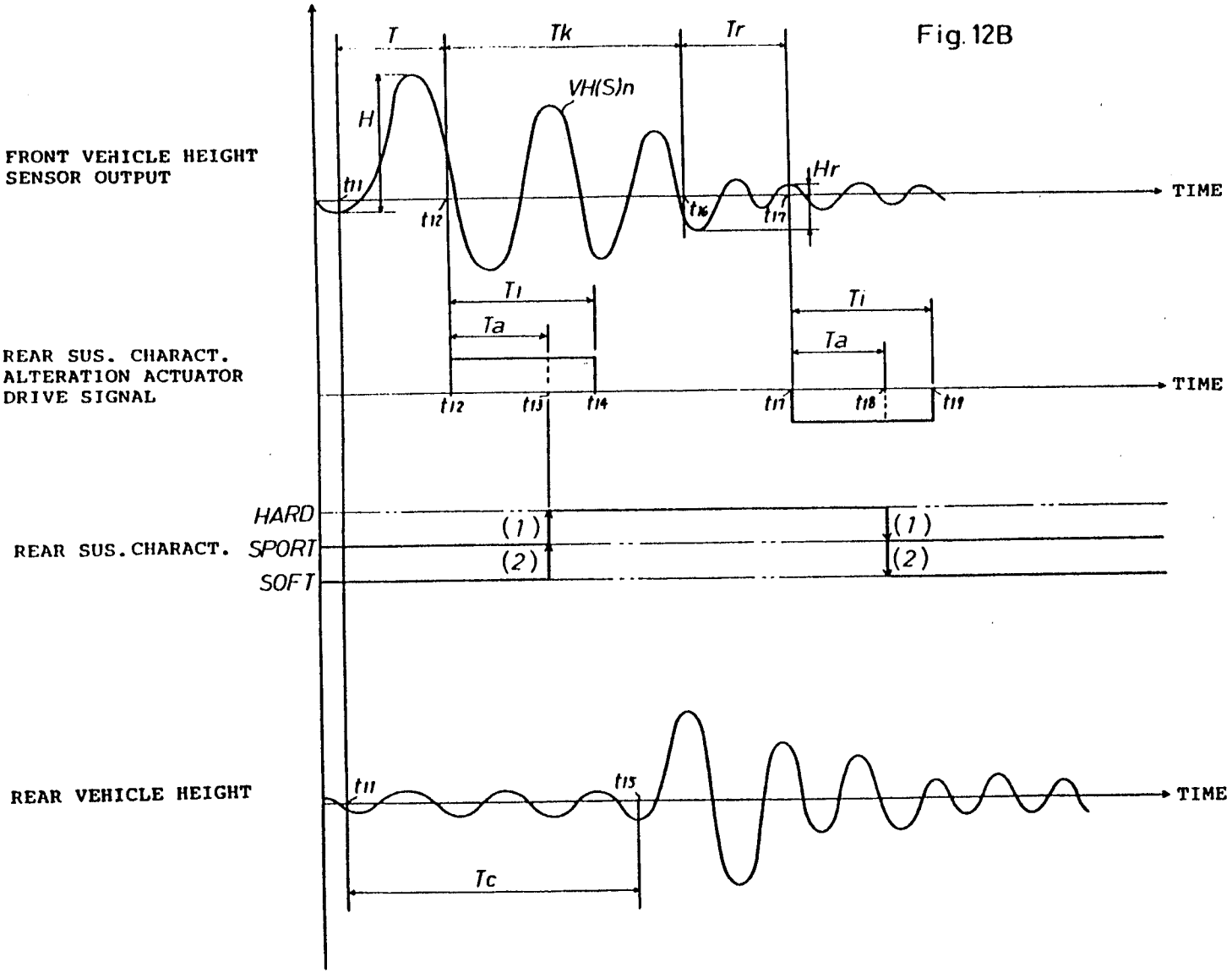

Another example of control timings performed by the second judgment condition is then explained with FIGS. 12A and 12B. FIG. 12A shows an automobile j whose front wheel W1R or W1L is passing a large dip P of a road surface k with a speed V. FIG. 12B shows time charts of the output of the front vehicle height sensor 1 or 2, the drive signal for the rear suspension characteristic alteration actuators 3d and 4d, the rear suspension characteristic and the rear vehicle height.

The front wheel W1R or W1L begins to move down into the large dip P at a time point [t12] *t11*. Since then the output VH(S)n of the front vehicle height sensor 1 or 2 becomes large. From the time point t11, the front vehicle height is sampled every time interval t as shown in FIG. 9, and at a time point t12, which is a time interval T later than the time point t11, the ECU 300 judges that the largest front vehicle height change H exceeds a corresponding reference value H1. At this time point, the ECU drives the rear suspension alteration actuators 3d and 4d to alter the rear suspension characteristic to a 'HARD' state, i.e. the main air chambers 3b and 4b are connected with the auxiliary air chambers 3c, 4c, respectively. The alteration operation is finished at a time point t13, a time interval Ta later than t12. The driving signal from the ECU 300 is sent to the actuators 3d and 4d until a time point t14, though the alteration operation per se is finished before the time point t13. The alteration of the rear suspension characteristic to the 'HARD' state is either from a 'SOFT' state or from a 'SPORT' state. Between the time point t11 and a time point t15, which is a time interval Tc later than the time point t11, the rear wheels W2R, W2L begin to move down into the large dip P. Here the time interval Tc is that for the front and rear wheels to pass the dip. So the time point t13 should be preferably before the time point t15, but other cases may be allowed, i.e. the time points t13 and t15 may coincide or the time point t13 may be a little later than the time point t15, since this alteration is aimed to prevent a large vibrations.

At a time point t16, which is a time interval Tk for returning control after the time point t12, the rear wheels W2R, W2L have passed the large dip P. At a time point t17, which is a time interval Tr later than the time point t16, the ECU 300 judges that the largest [from] *front* vehicle height change Hr is less than a corresponding reference value H2. At this time point, the ECU 300 drives the rear suspension alteration actuators 3d and 4d to alter the rear suspension characteristic to a 'SPORT', i.e. the main air chambers 3b and 4b are connected with the auxiliary air chambers 3c and 4c, respectively, by the small section passage 74, or the rear suspension alteration actuators 3d and 4d are driven to alter the rear suspension characteristic to a 'SOFT' state, i.e. the main air chambers 3b and 4b are connected with the auxiliary air chambers 3c and 4c, respectively, by the large section passage 70.

Figure 13A:
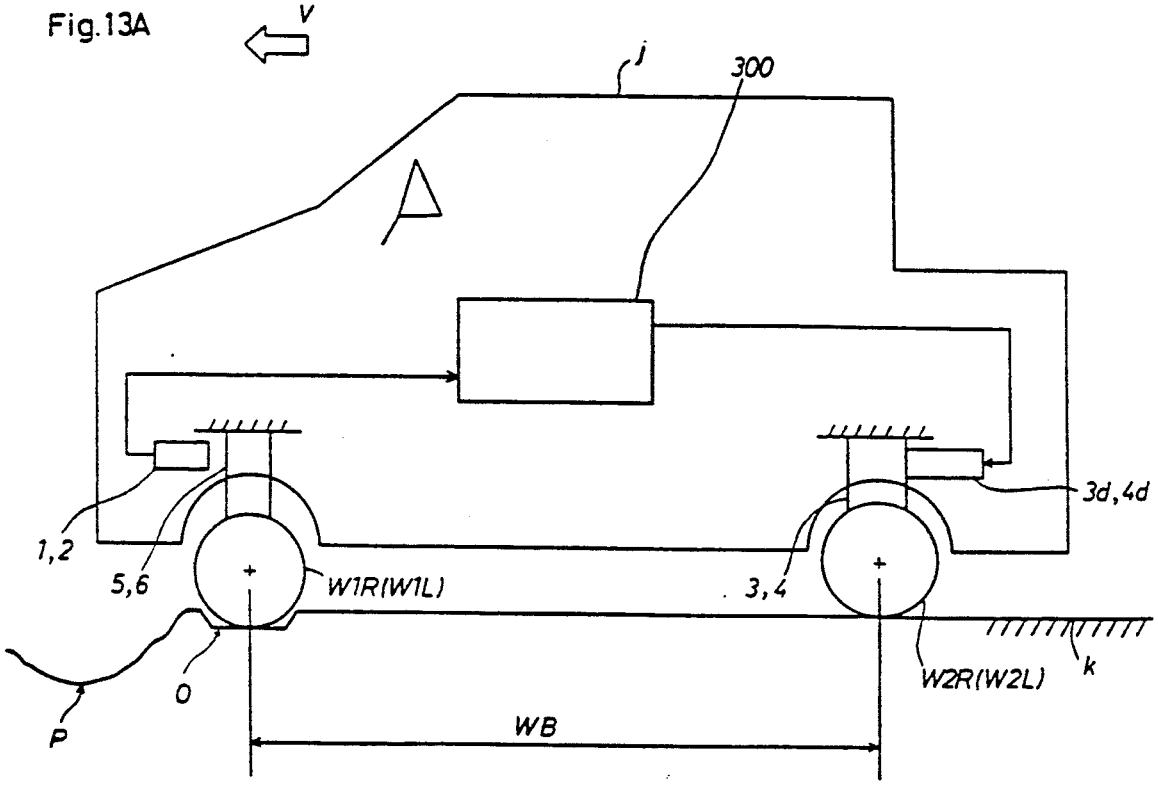
FIG. 13A shows a schematic figure of a vehicle passing a small dip and a subsequent large dip of a road surface in the first embodiment and FIG. 13B shows timing charts corresponding to FIG. 13A.
Figure 13B:
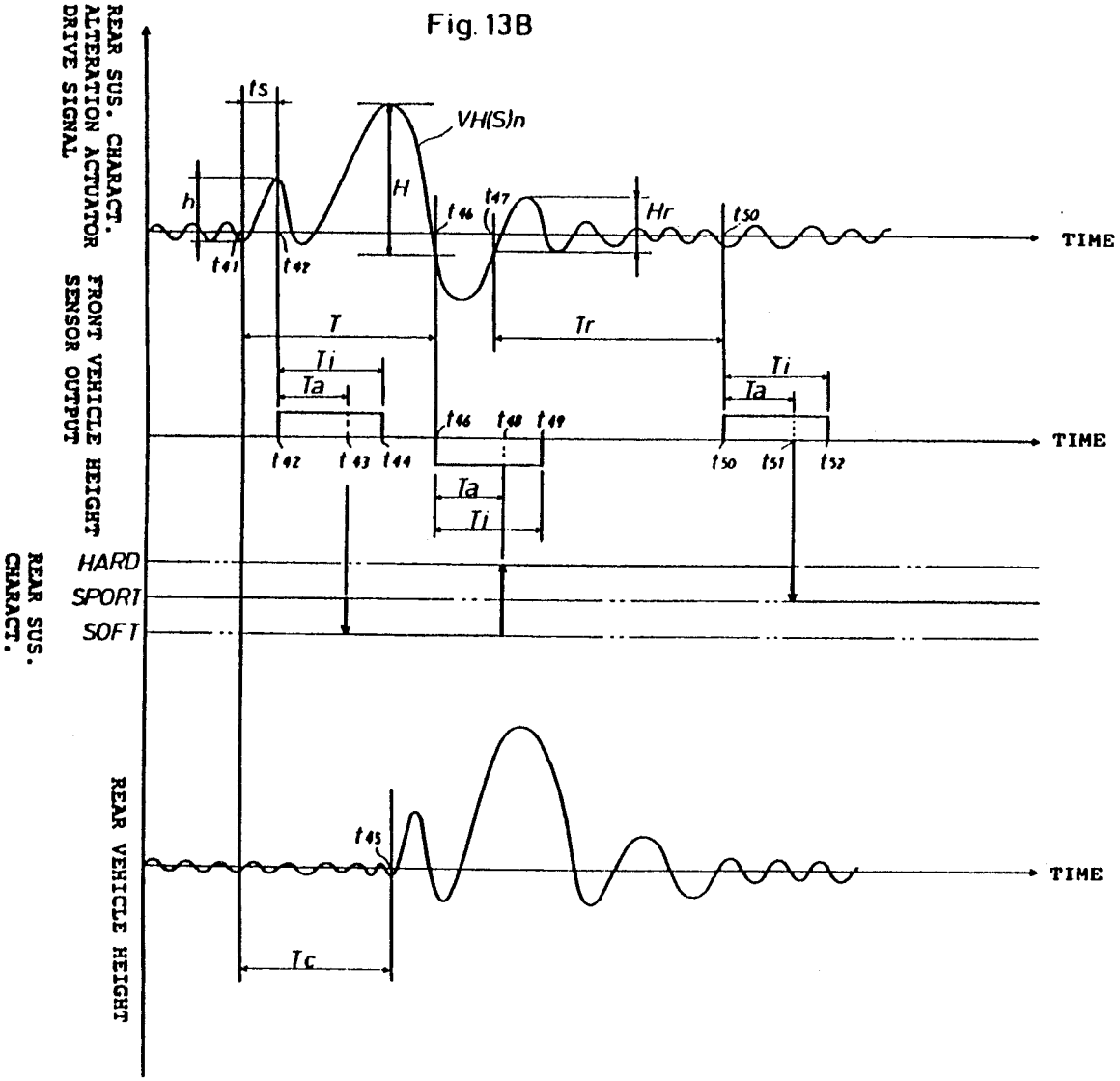

Another example of control timing of a case of an automobile passing a small bump O which is judged by the first judgment condition followed by a large bump P which is judged by the second judgment condition is explained with FIGS. 13A and 13B. FIG. 13A shows an automobile j whose front wheels W1R or W1L is passing a small dip O and a large dip P of a road surface k with a speed V. FIG. 13B shows time charts of the output of the front vehicle height sensor 1 or 2, the drive signal for the rear suspension characteristic alteration actuators 3d and 4d, the rear suspension characteristic and the rear vehicle height.

The front wheel W1R or W1L beings to move down into the small dip O at a time point t41. Since then, the output VH(S)n of the front vehicle height sensor 1 or 2 becomes large. From the time point t41, the front vehicle height is sampled every time interval t as shown in FIG. 9, and at a time point t42, which is a time interval ts later than the time point t41, the ECU 300 judges that the largest front vehicle height change h exceeds a corresponding reference value h1 by the first judgment condition. At this time point, the ECU 300 drives the rear suspension alteration actuators 3d and 4d to alter the rear suspension characteristic from a normal 'SPORT' state to a 'SOFT' state, i.e. the main air chambers 3b and 4b are connected with the auxiliary air chambers 3c and 4c, respectively, by the large section passage.

The alteration operation is finished at a time point t43, a time interval Ta later than t42. The driving signal from the ECU 300 is sent to the actuators 3d and 4d until a time point t44, though the alteration operation per se is finished before the time point t43.

Then at a time point t46, which is a time interval T later than the time point t41, the ECU judges that the largest front vehicle height change H during the time interval T exceeds a corresponding reference value H1 by the second judgment condition. At this time point t46, the ECU 300 drives the rear suspension alteration actuators 3d and 4d to alter the rear suspension characteristic from the 'SOFT' state to a 'HARD' state. The alteration operation is finished at a time point t48, a time interval Ta later than t46. The driving signal from the ECU 300 is sent to the actuators 3d and 4d until a time point t49, though the alteration operation per se is finished before at the time point t48. So the rear wheels W2R and W2L pass the large bump P with the 'HARD' state suspension characteristic to prevent large vibration. At a time point t50, which is a time interval Tr later than the time point t47, the ECU 300 judges that the largest front vehicle height change Hr is less than a corresponding reference value H2. At this time point t50, the ECU 300 drives the rear suspension alteration actuators 3d and 4d to alter the rear suspension characteristic from the 'HARD' state to the 'SPORT' state.

The alteration operation is finished at a time point t51, a time interval Ta later than t50. The driving signal from the ECU 300 is sent to the actuators 3d and 4d until a time point t52, thourgh the alteration operation per se is finished before at the time point t51.

As described above, the first embodiment is so arranged that shocks are prevented at the rear part of the automobile and the ride comfort thereof is maintained in passing sporadic bumps or dips. And after passing them, the suspension characteristic is returned to fit to a normal road surface to maintain the controllability and stability. In the above embodiment, the rear suspension characteristic is altered to 'SOFT', 'SPORT' and 'HARD' states according to the judgment results, the alteration steps may be increased by so arranging the air suspensions or shock absorbers or combining the various characteristics of every component.

The degree of freedom in designing the driving characteristic of an automobile is increased. While the first embodiment uses two judgment conditions, it is possible to adopt three or more judgment conditions to cope with various road surface irregularities.

As the first embodiment gives the second judgment condition a priority over the first judgment condition, i.e. hardening the rear suspension characteristic is given a priortity, the driving controllability and stability are most regarded. And since the first embodiment has different reference values for altering the rear suspension characteristic and for returning it, hunting of the alteratio and return control is eliminated.

Figure 14A:
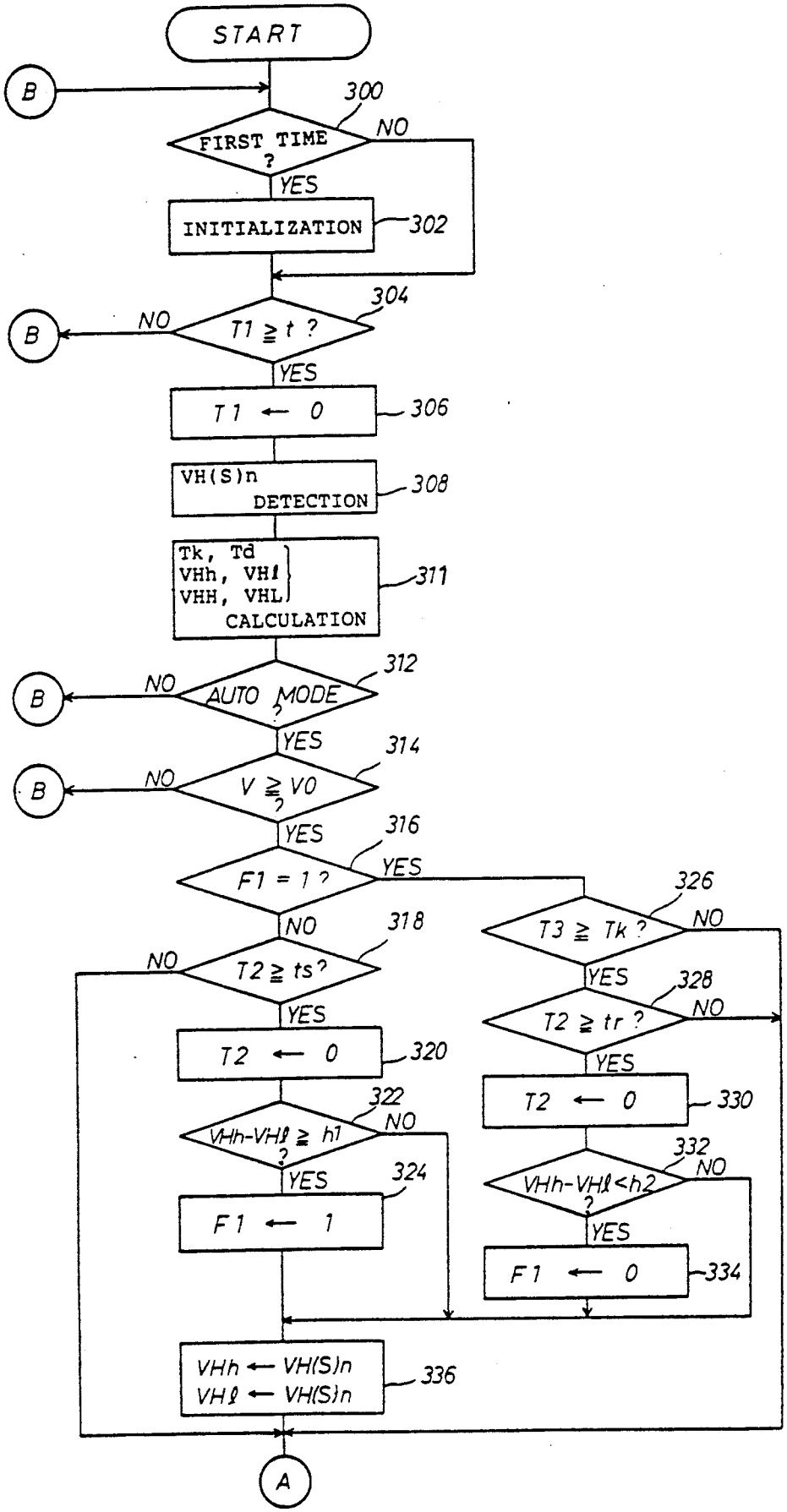
FIGS. 14A, 14B, 14C, 14D and 14E show flowcharts of process steps executed by the ECU in the second embodiment.
Figure 14B:
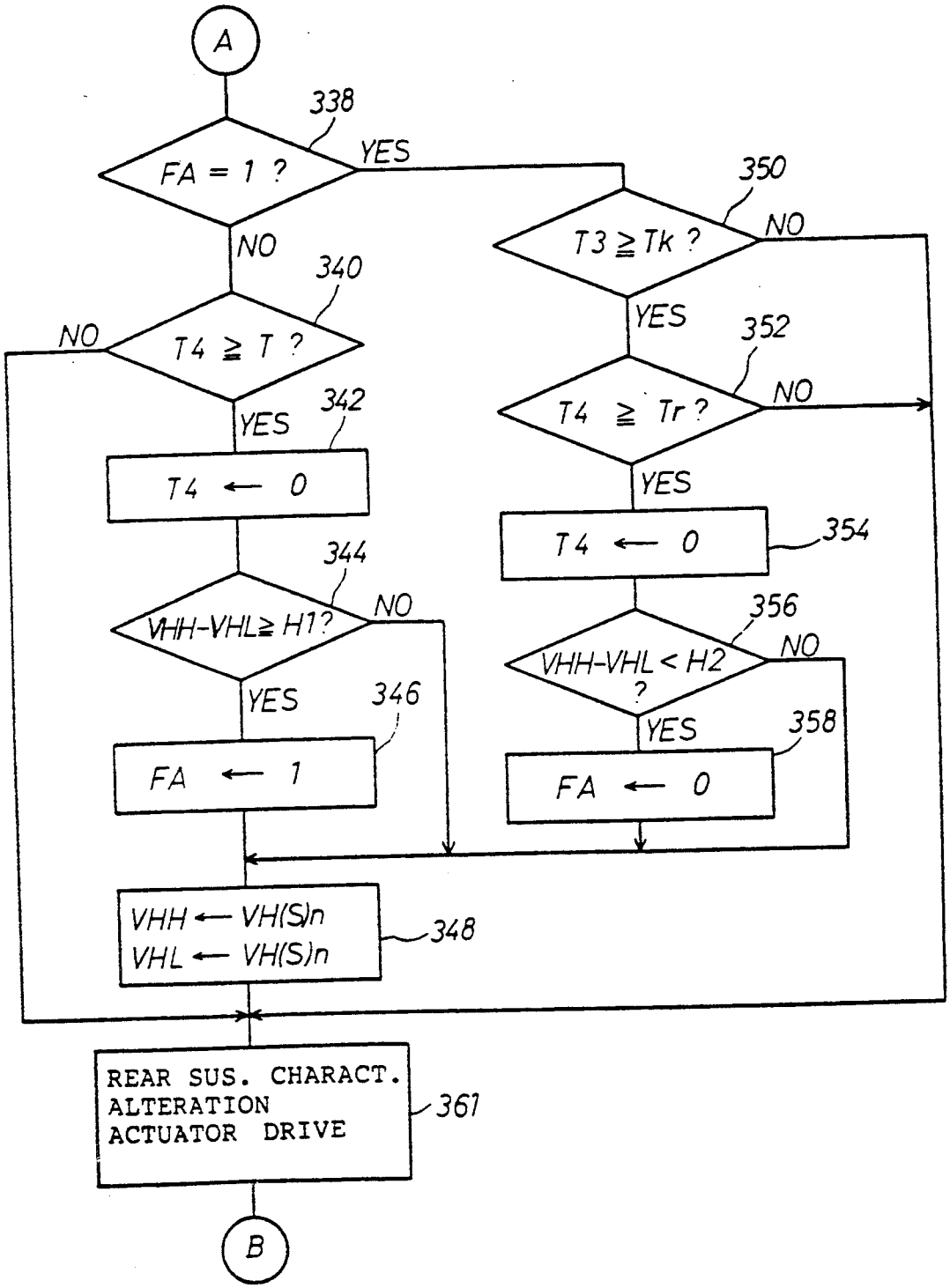
Figure 14C:
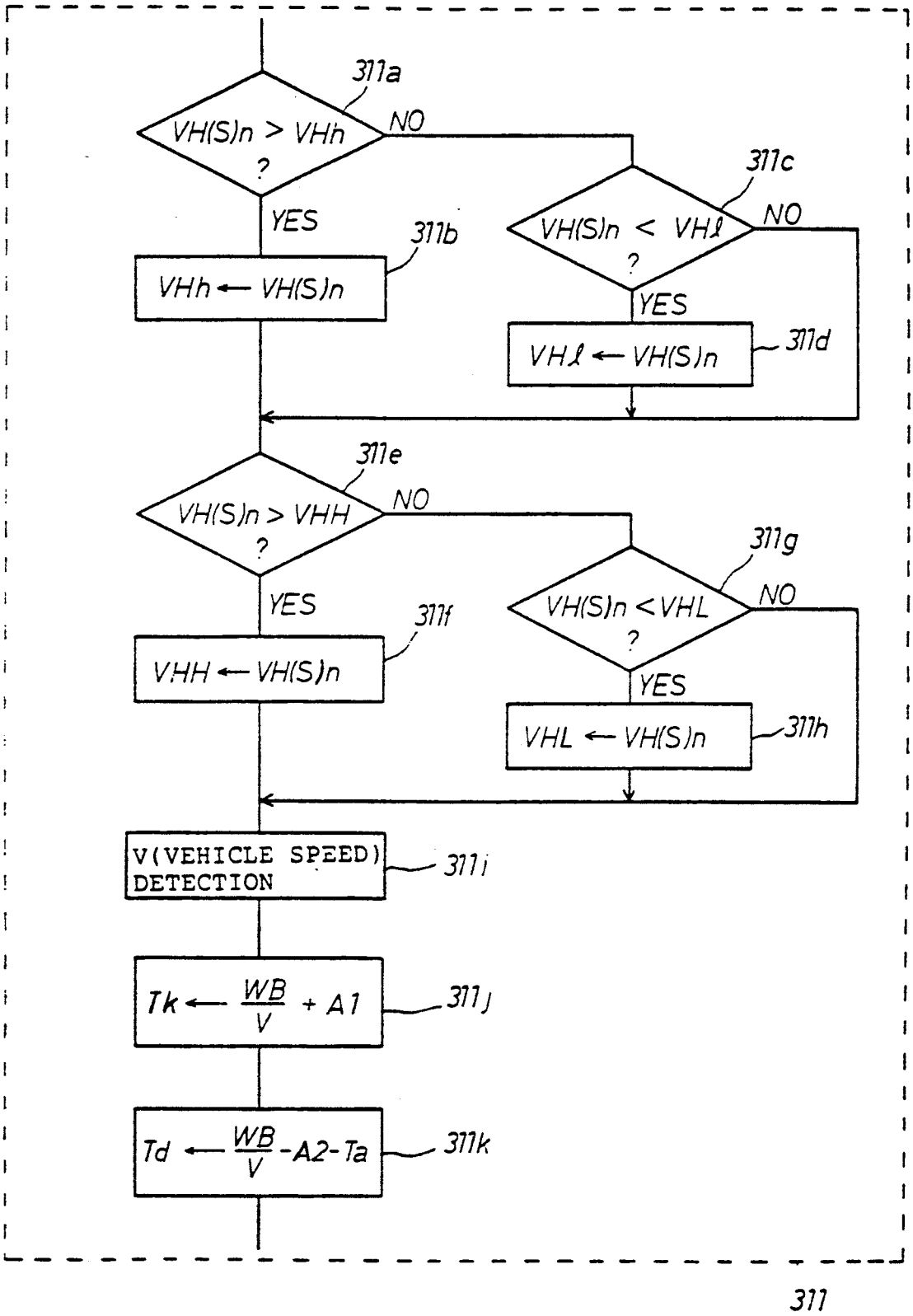
Figure 14D:
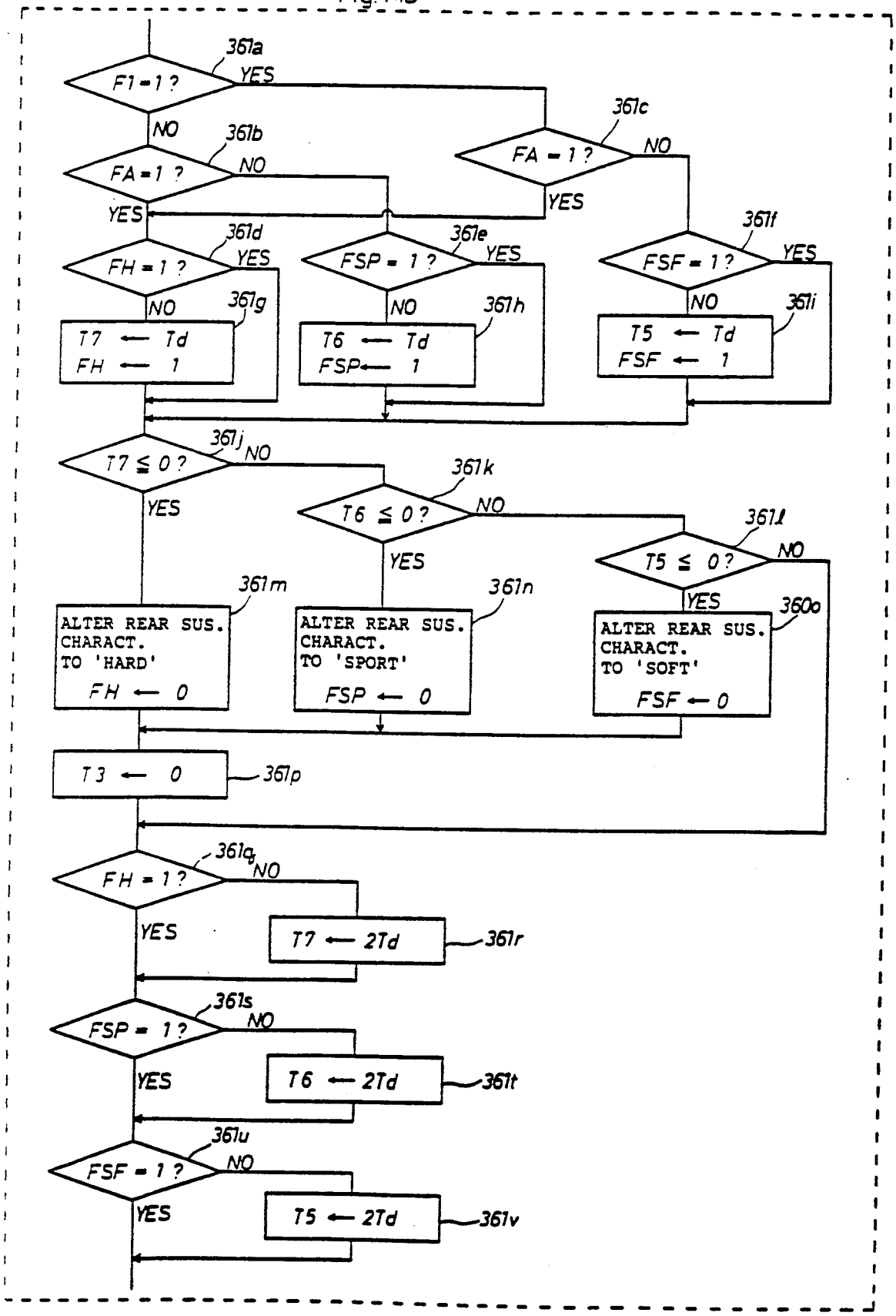
Figure 14E:
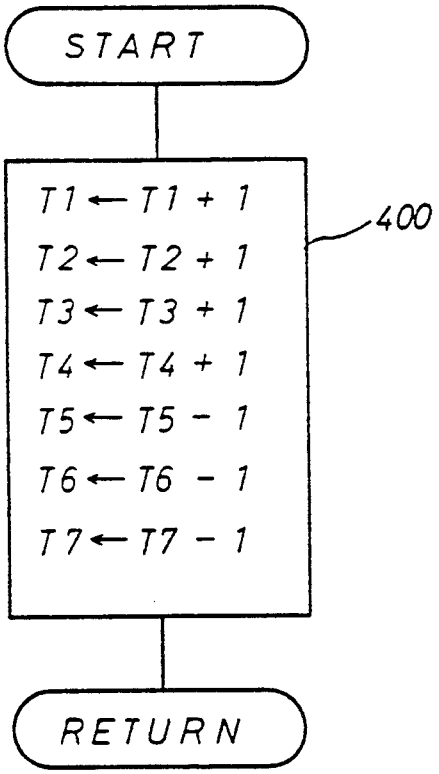
Figure 15:
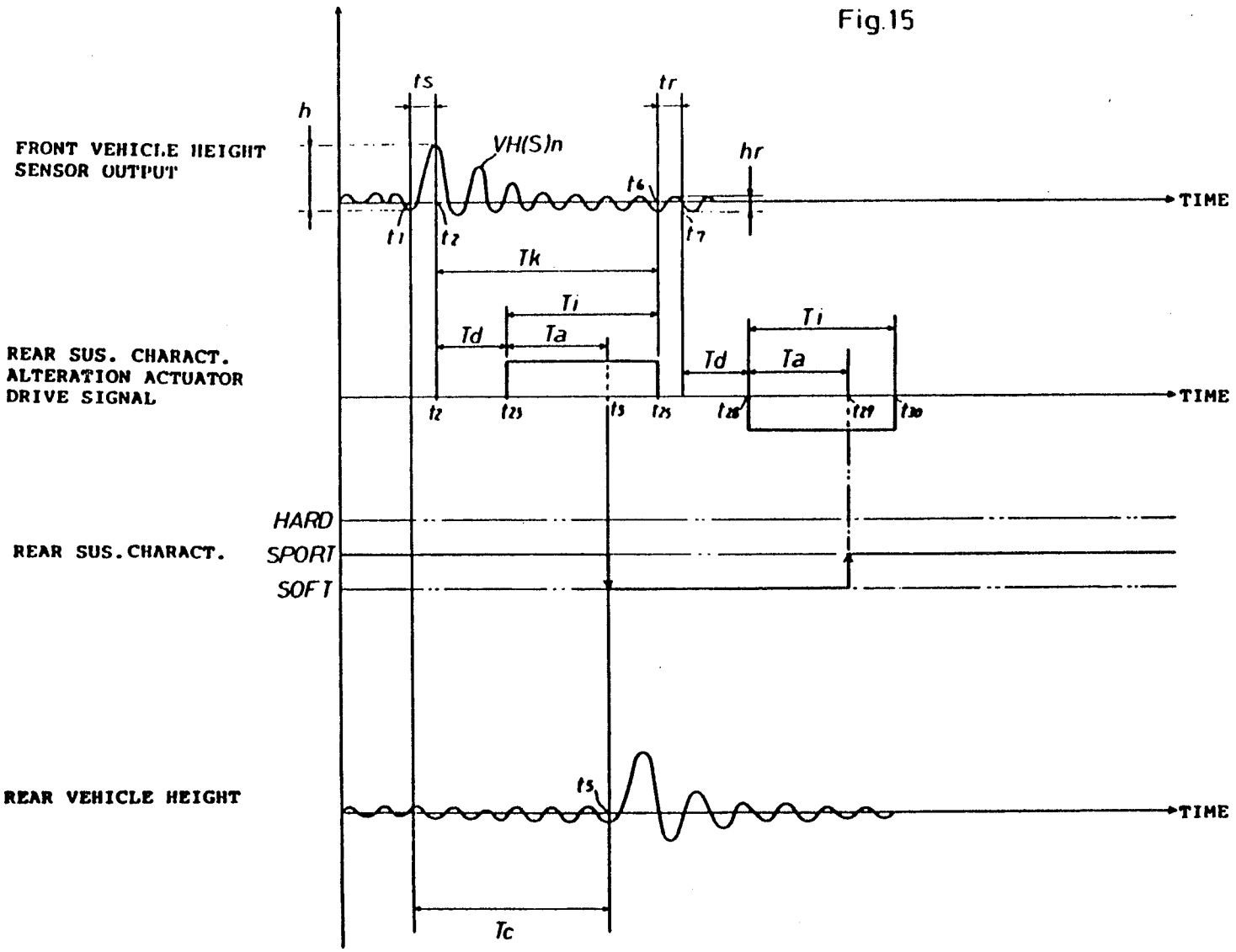
FIG. 15 shows timing charts about a vehicle passing a small dip of a road surface in the second embodiment.
Figure 16:
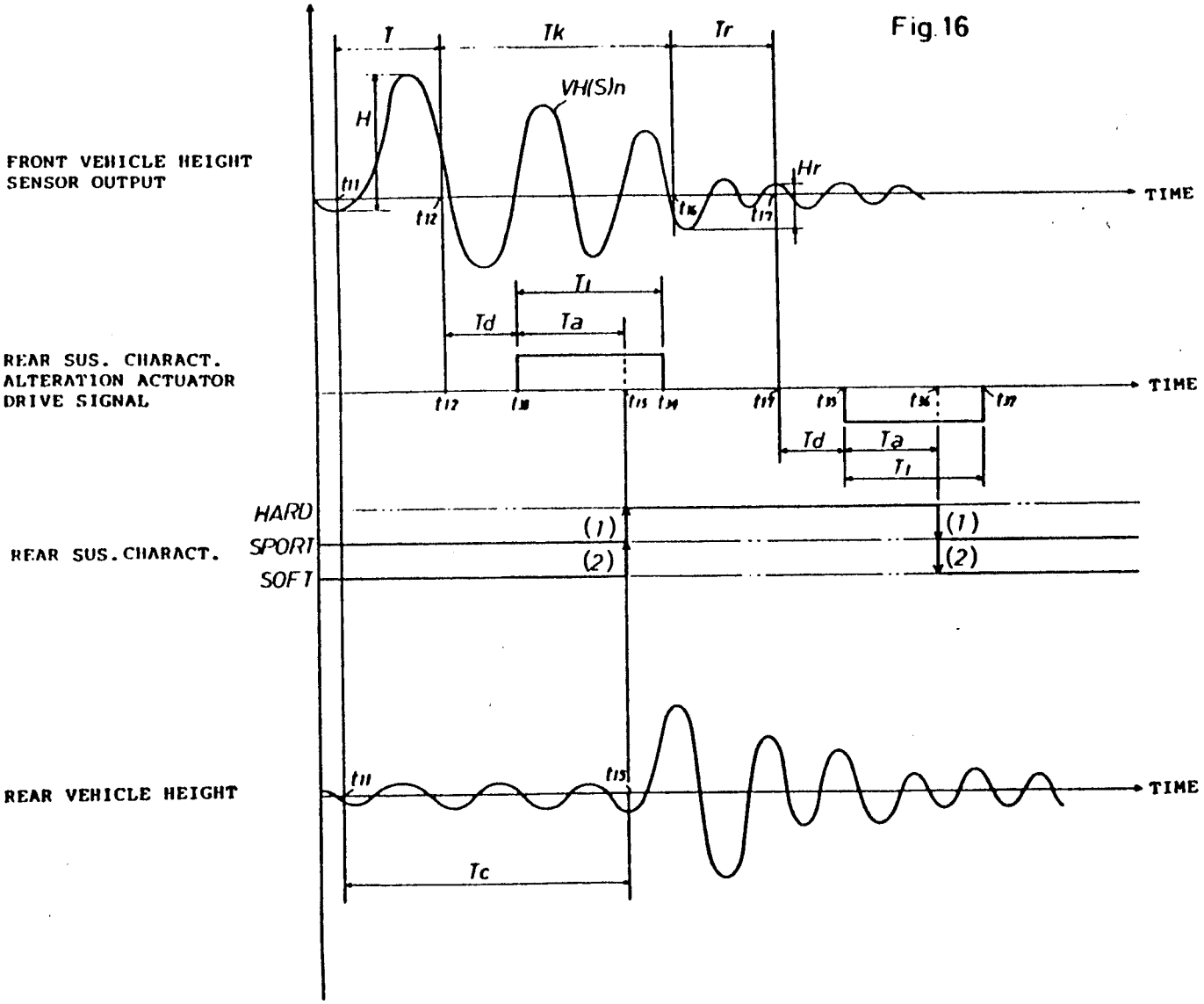
FIG. 16 shows timing charts about a vehicle passing a large dip of a road surface in the second embodiment.

The second embodiment of the present invention is then explained with flow charts of FIGS. 14A, 14B, 14C, 14D and 14E and timing charts of FIGS. 15 and 16. The construction of the apparatus of this embodiment is the same as that of the first embodiment, as FIGS. 3–8. The flow charts of this embodiment are so made to coincide by the last two digits of the step number with that of the first embodiments, as FIGS. 10A–10E, if the corresponding steps are similar with each other.

The main difference between the first and the second embodiments lies in when to alter the rear suspension characteristic. While in the first embodiment the alteration control is performed as soon as the front vehicle height exceedes the corresponding reference value, it is performed just before the rear wheels pass the bump or dip in this embodiment. For that purpose, a delay time Td, which is a time interval between the detection of the bump or dip by the front vehicle height sensors and the beginning of the rear suspension characteristic alteration control, is introduced in the second embodiment.

The steps 300–308 in the flow chart of FIG. 14A are the same as the counterparts of FIG. 10A of the first embodiment. At step 311, a delay time Tk, the maximum front vehicle height VHh of the first judgment condition, the minimum front vehicle height [VH1] *VHl* of the first judgment condition, the maximum front vehicle height of the second judgment condition VHH and the minimum front vehicle height of the second judgment condition VHL are calculated as the first embodiment as well as the delay time Td. Details of the step 311 is shown in FIG. 14C, where steps 311a–311j are the same as steps 110a–110j of FIG. 10C. At step 311k, the delay time Td is calculated as $$Td = WB/V - A2 - Ta,$$

where WB is a wheelbase, V is a vehicle speed, A2 is a compensatory term and Ta is a duration time of driving signal to the actuators to alter the rear suspension characteristic.

Steps 312–336 of FIG. 14A and steps 338–358 of FIG. 14B are the same as steps 112–136 of FIG. 10A and steps 138–158 of FIG. 10B, respectively. Details of step 361, where the rear suspension characteristic is altered after a delay time Td, are hereinafter described with FIG. 14D. With a state for altering by the first judgment condition, i.e. the flags are such that F1=1, FA=0, FH=0, FSP=0 and FSF=0, the process steps proceed through steps 361a, 361c, 361f and 361i. At step 361i, the delay time Td is put into a timer T5 and the flag FSF is set, where T5 is a timer which is counted down by an intermittent interrupt routine step 400 of FIG. 14E. Timers T6 and T7 are also counted down by step 400. Since [T4] *T5*, T6, and T7 are all non-negative, the process steps proceed through 361j, 361k, 361l and 361q. Since FH=0 at step 361q, the value 2×Td is put into the timer T7. Since [FSO] *FSP*=0 at step 361s, 2×Td is put into the timer T6. Then since FSF=1 (361u), the process steps of step 361 are finished and the process steps begin from B of FIG. 14A again. Though in these process steps the timers T5, T6 and T7 are counted down (400), the timers T6 and T7 are renewed by a value 2×Td every time, preventing them from being negative. The timer T5, on the other hand is not renewed by these routines, so it becomes negative after the time interval Td. Then as step 361 of FIG. 14B, steps 361a, 361c, 361f, [3621j] *361j*, 361k, [361] *361l* and 361o of FIG. 14C are processed. At step 361o, the rear suspension characteristic is altered to the 'SOFT' state and the flag FSF is reset. These are the process steps to actually alter the rear suspension characteristic a delay time Td after the judgment for performing that. Then a timer T3 for returning the rear suspension characteristic is reset (361p), followed by steps 361q, 361r, 361s, 361t, 361u and 361v. Then the process steps being from B of FIG. 14A again.

Another case of the second embodiment is explained, the case being returning rear suspension characteristic by the first judgment condition, i.e. proceeding to step 361 of FIG. 14B with flags F1=0, FA=0, FH=0, FSP=0 and [FSf] *FSF*=0. The process steps proceed through 361a, 361b, 361e and 361h of FIG. 14D, and at step 361h the delay time Td is put into the timer T6 and the flag FSP is set.

As described before, the process steps proceed through 361j, 361k, 361l, 361q, 361r, 361s, 361u and 361v and then return to B of FIG. 14A. In this case, only the timer T6 becomes negative after a time interval Td, so the process steps proceed through 361a, 361b, 361e, 361j, 361k and 361n, where the rear suspension characteristic is altered to the 'SPORT' state and the flag FSP is reset. Then the process steps begin from B of FIG. 14A again.

Another case of the second embodiment is explained, the case being altering by the second judgment condition, i.e. proceeding to step 361 of FIG. 14B with flags F1=0, FA=1, FH=0, FSP=0 and FSF=0. The process steps proceed through 361a, 361b, [36d] *361d* and 361g of FIG. 14D, and at step 361g the delay time Td is put into the timer T7 and the flag [FSH] *FH* is set. As described before, the process steps proceed through 361j, 361k, [361h] *361l*, 361q, 361s, 361t, 361u and [36v] *361v* and then return to B of FIG. 14A.

In this case, only the timer T7 becomes negative after a timer interval Td, so the process steps proceed through 361a, 361b, 361d, 361j, and 361m, where the rear suspension characteristic is altered to the 'HARD' state and the flag FH is reset. Then the process steps begin from B of FIG. 14A again.

The case of returning the rear suspension characteristic by the second judgment condition, i,e, proceeding to step 361 of FIG. 14B with flags F1=0, FA=0, FH=0, FSP=0 and FSF=0, is the same as the case of first judgment condition which is explained before.

Those process steps are so repeated. An example of control timings performed by the second embodiment is then explained with FIGS. 15 and 16. Firstly, the case of altering and returning of rear suspension characteristic by the first judgment condition is explained with FIGS. 11A and 15. The front wheel W1R or W1L begins to move down into a small dip O at a time point t1. At a time point t2, which is a time interval ts later than the time point t1, the ECU 300 judges that the largest front vehicle height change h exceeds a corresponding reference value h1. At a time point t23, which is a delay time Td after t2, the ECU 300 drives the rear suspension alteration actuators 3d and 4d to alter the rear suspension characteristic to a 'SOFT' state. At a time point t5 which is the time interval Ta after the time point t23 the rear suspension characteristic has been altered to the 'SOFT' state. The time point t5 coincides with the time point when the rear wheels W2R, W2L arrive at a small dip O. The driving signal from the ECU 300 is sent to the actuators 3d and 4d until a time point t25.

At a time point t6, which is the delay time Tk for returning the rear suspension characteristic after the time point t2 when the judgment is made that the front wheel W1R or W1L moves down into the small dip O, the rear wheels W2R and W2L pass the small dip O and begin to move on a flat surface.

At a time point [T7] *t7*, which is a timer interval tr later than the time point t6, the ECU 300 judges that the largest front vehicle height change hr is less than a corresponding reference value h2. At a time point t28, which is a delay time Td after t7, the ECU 300 drives the rear suspension alteration actuators 3d and 4d to alter the rear suspension characteristic from the 'SOFT' state to a 'SPORT' state. The driving signal from the ECU 300 is sent to the actuators 3d and 4d until a time point t30.

Another case of altering and returning of rear suspension characteristic judgment condition is explained with FIG. 12A and FIG. 16. The front wheel W1R or W1L begins to move down into a large dip P at a time point t11. At a time point t12, which is a time interval T later than the time [pint] *point* t11, the ECU 300 judges that the largest front vehicle height change H exceeds a corresponding reference value H1. At a time point t33, which is a delay time Td after t12, the ECU 300 drives the rear suspension alteration actuators 3d and 4d to alter the rear suspension characteristic to a 'HARD' state. At a time point [T15] *t15* which is the time interval Ta after the time point t33 the rear suspension characteristic has been altered to the 'HARD' state. The time point t15 coincides with the time point when the rear wheels W2R, W2L arrive at the large dip P. The driving signal from the ECU 300 is sent to the actuators 3d and 4d until a time point t34.

At a time point t16, which is the delay time Tk for returning the rear suspension characteristic after the time point t12 when the judgment is made that the front wheel W1R or W1L moves down into the large dip P, the rear wheels W2R and W2L pass the large dip and begin to move on a flat surface.

At a time point t17, which is a time interval [tr] *Tr* later that the time point t16, the ECU 300 judges that the largest front vehicle height change Hr is less than a corresponding preference value H2. At a time point t35, which is a delay time Td after t17, the ECU 300 drives the rear suspension alteration actuators 3d and 4d to alter the rear suspension characteristic from the 'HARD' state to the 'SPORT' state or to the 'SOFT' state. The driving signal from the ECU 300 is sent to the actuators 3d and 4d until a time point t37.

The second embodiment of the present invention is so arranged as described above that it has a following advantage besides that derived from the first embodiment. The alteration of the rear suspension is restricted only to necessary instances to maintian both the controllability and stability and the ride comfort as much as possible by introducing the delay time for performing the rear suspension alteration control after the front wheel passes a bump or a dip.

Figure 17:
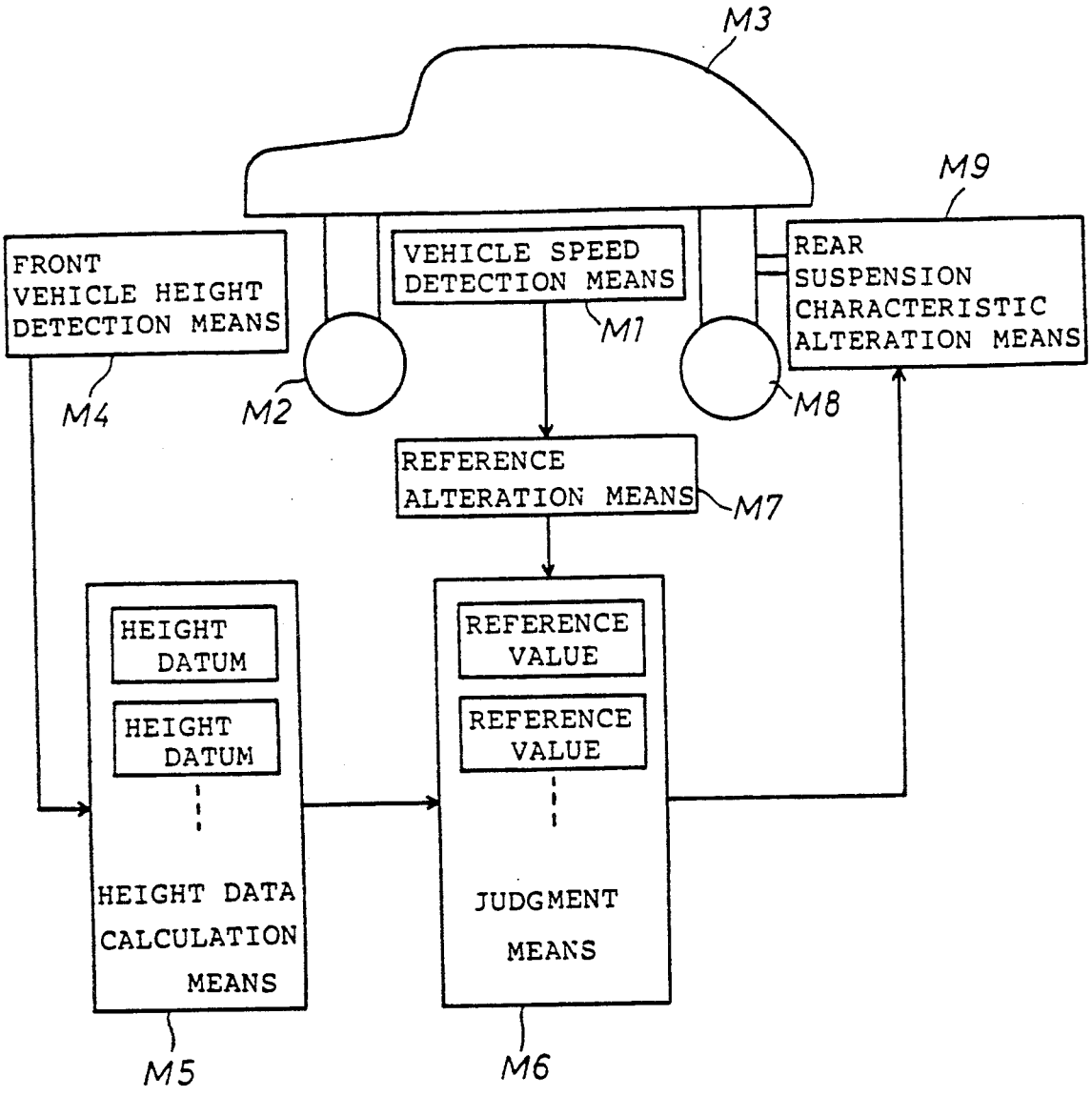
FIG. 17 shows an outline of the third embodiment of the present invention.

The third embodiment is hereinafter explained, an outline of whose construction is illustrated in FIG. 17. A front vehicle height detector M4 provided between a front wheel M2 and a body M3 of an automobile detects the distance therebetween to generate and send a front vehicle signal to a [hieght] *height* data calculation means M5. A plurality of height data are calculated in the height data calculation means from the front vehicle height signal and sent to a judgmant means M6, where each height data is compared with a corresponding reference value. When certain conditions are satisfied, the judgment means M6 generate a judgment result signal and send it to a rear suspension characteristic alteration means M9 which drives rear suspension between the rear wheels M8 and the body M3 to alter the characteristic according to the judgment result signal. While the construction described as far is the same as that of the first and the second embodiments, this third embodiment is provided with a vehicle speed detection means M1 and a reference alteration means M7, which alter the reference value of the judgment means according to the vehicle speed. The construction or apparatus of the third embodiment is the same as the first and the second embodiments. FIGS. 3, 4, 5, 6, and 8.

The process steps, which are performed by the ECU in this embodiment, are hereinafter described referring to flow charts shown in FIGS. 18A–18F. The flow charts indicate the process steps performed by the ECU in response to the vehicle height sensor 1 of the digital type which sends out a digital signal, as shown in FIG. 7.

The process steps are repeatedly performed in every predetermined time interval, such as 5 msec.

Figure 18A:
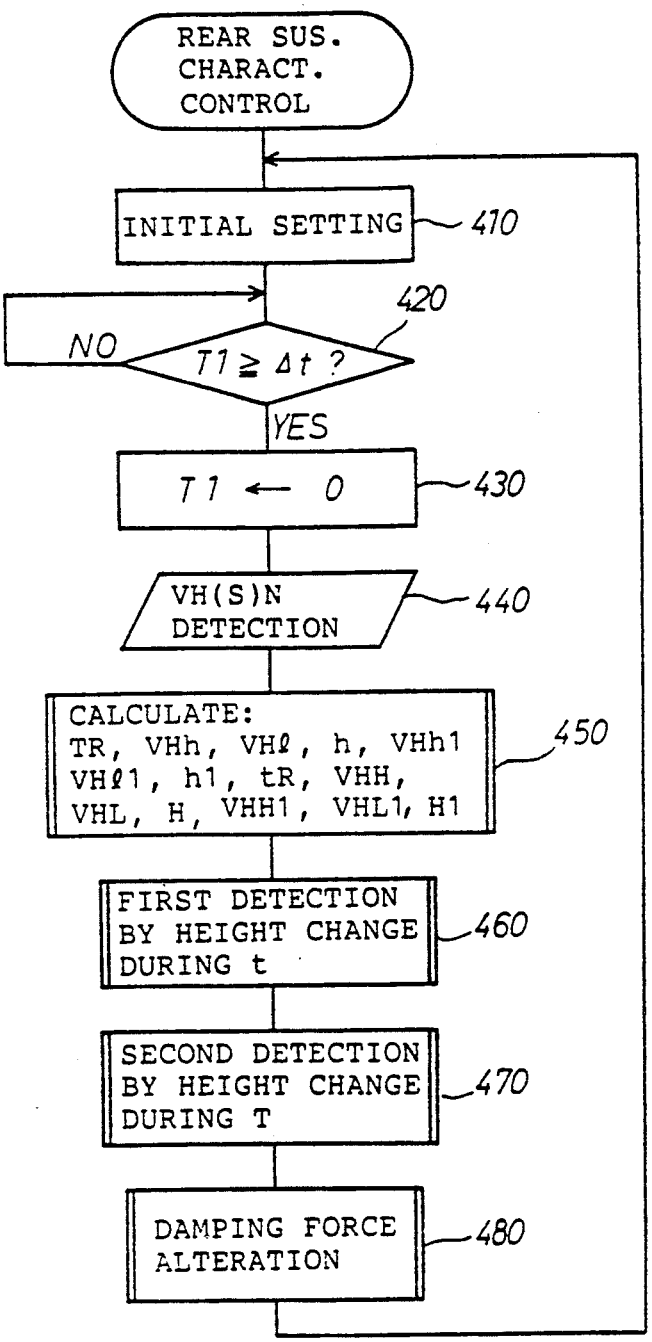

An outline of the process steps shown in the flow chart of FIG. 18A is described as follows with step numbers in the parentheses:

Firstly initial setting is performed, i.e., all variables and all flags are reset (410) except those storing the maximum and the minimum front vehicle height, VHh and VHl. After waiting for a time interval Δt(420), a timer T1 is cleared (430). The timer T1 is counted up by an intermittent interrupt routine as shown in FIG. 18B, where other timers T2, T3, TC, TD, TE and TF are counted up.

A current front vehicle height VH(S)n is detected by the front vehicle height sensors 1 and 2 (440) and a first preset time tR, a second preset time TR, a first maximum front vehicle height VHh, a first minimum front vehicle height VHl, a second minimum front vehicle height VHL, a second maximum front vehicle height VHH, *a* first tentative minimum front vehicle height VHh1, a first tentative minimum front vehicle height VHl1, a second tentative minimum front vehicle height VHL1 and a second tentative maximum front vehicle height VHH1 are calculated (450). At step 450, the differences between corresponding maximum and minimum front vehicle heights are calculated to make a first largest front vehicle height change h, a first tentative largest front vehicle height change h1, a second largest front vehicle height change H and a second tentative largest front vehicle height change H1. Then a front vehicle height change during a time interval t which is shorter than a quarter of the cycle time of the front vehicle height vibration is detected to get a speed of front vehicle height change (460). That is called a first detection process step. A second detection process step is to detect the largest front vehicle height change during a time interval T which is longer than a quarter of the cycle time of the front vehicle height vibration to get the amplitude (470). And lastly the damping force of shock absorbers 3a and 4a is altered to a desired state according to the result of the first and second detection process steps (480).

Since the time intervals used in the first and the second detection process steps are much longer than the cycle time needed to perform the routine of steps 410–480 (i.e. 5 msec), two results of the first and the second detection process steps are not detected in every cycle of the routine.

Details of steps 450–480 are hereinafter explained. After steps 410–440 are performed as described before, the values TR, tR, VHh, VHl, h, VHh1, VHl1, h1, VHH, VHL, H, VHH1, VHL1 and H1 are calculated by the flow chart shown in FIG. 18C. The vehicle speed V is detected by the front vehicle height sensor 250 (500) and the first maxinum front vehicle height VHh for the first detection process steps is compared with the current front vehicle height VH(S)n (502). If the current front vehicle height VH(S)n is greater, the current value of the first maximum front vehicle height VHh is replaced by the current front vehicle height (504), otherwise the first minimum front vehicle height VHl is compared with the current front vehicle height VH(S)n.

If VH(S)n < VHl, the value of VHl is replaced by the value of VH(S)n. Otherwise the process steps proceed to step 510. Seps 510–516 are the process steps for calculating the first tentative maximum front vehicle height VHh1 and the first tentative minimum front vehicle height VHl1, which is similar to the prescribed steps 502–508. Also steps 518–524 are for calculating the second maximum front vehicle height VHH and second minimum front vehicle [vehicle] height VHL, steps 526–532 for the second tentative maximum front vehicle height VHH1 and the second tentative minimum front vehicle height VHL1.

Lastly for the process steps of FIG. 18C, step 534 is performed. Here the first largest front vehicle height change h is calculated as the difference between the first maximum front vehicle height VHh and the first minimum front vehicle height VHl, a first tentative largest front vehicle height change h1 as the difference between the first tentative maximum front vehicle height VHh1 and the first tentative [manimum] *minimum* front vehicle height VHl1, a second largest front vehicle height change H as the difference between the second maximum front vehicle height VHH and the second minimum front vehicle height VHL and a second tentative largest front vehicle height change H1 as the difference between the second tentative maximum front vehicle height VHH1 and the second tentative minimum front vehicle height VHL1. The first preset time tR and the second preset time TR are calculated from the vehicle speed V, the wheelbase A1 and compensatory terms A2 and A3 as follows.

$$tR = A1/V + A2$$

$$TR = A1/V + A3$$

Here the compensatory terms A2 and A3 are determined from the response time of actuators 3d and 4d and front vehicle height sensors 1 and 2.

Figure 18D:
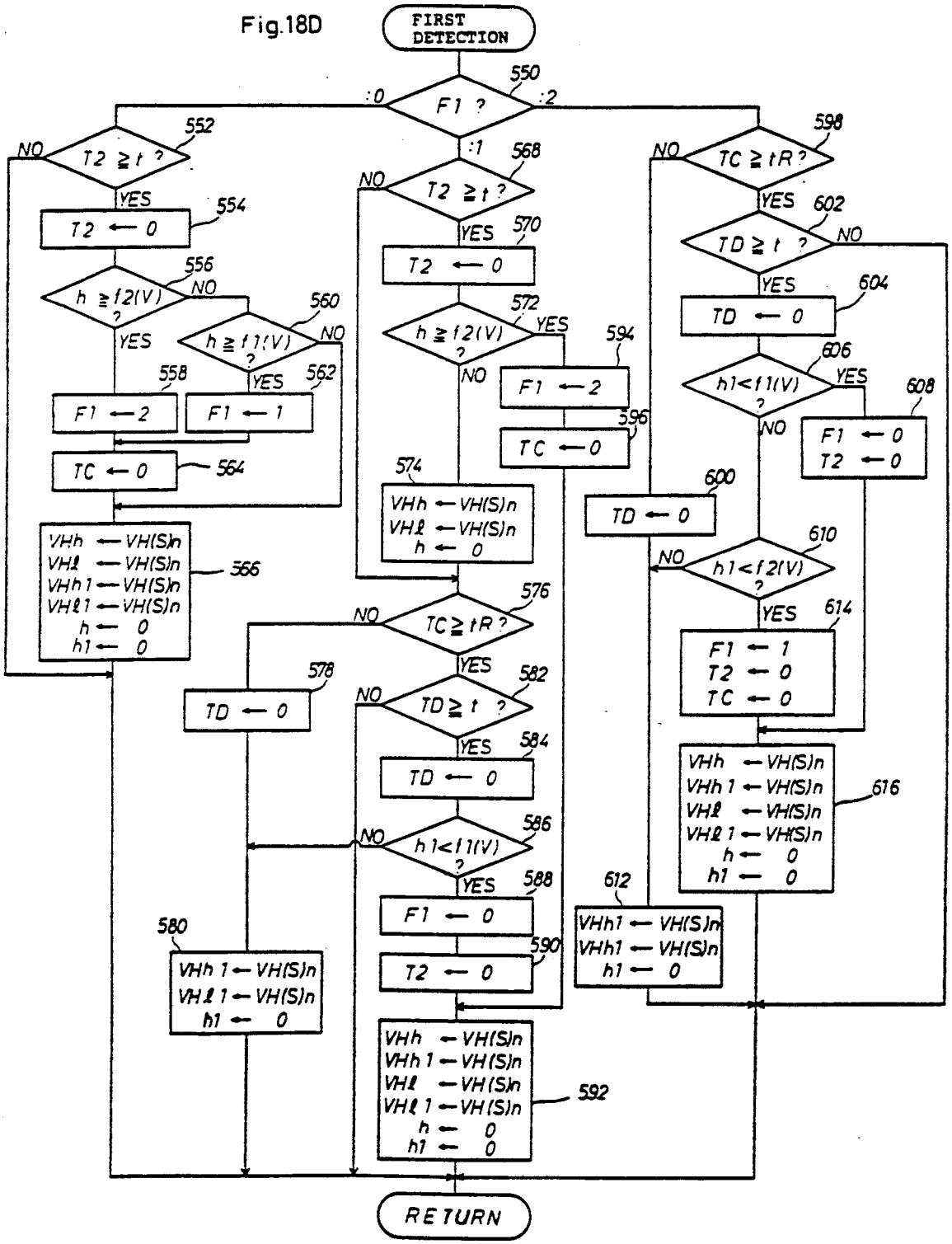

The first detection process steps are then explained with the flowchart of FIG. 18D. These process steps are for detecting a front vehicle height change during a relatively small time interval t which is determined to be about a quarter of a cycle time of the front vehicle height vibration in order to get a speed of front vehicle height change.

Figure 19:
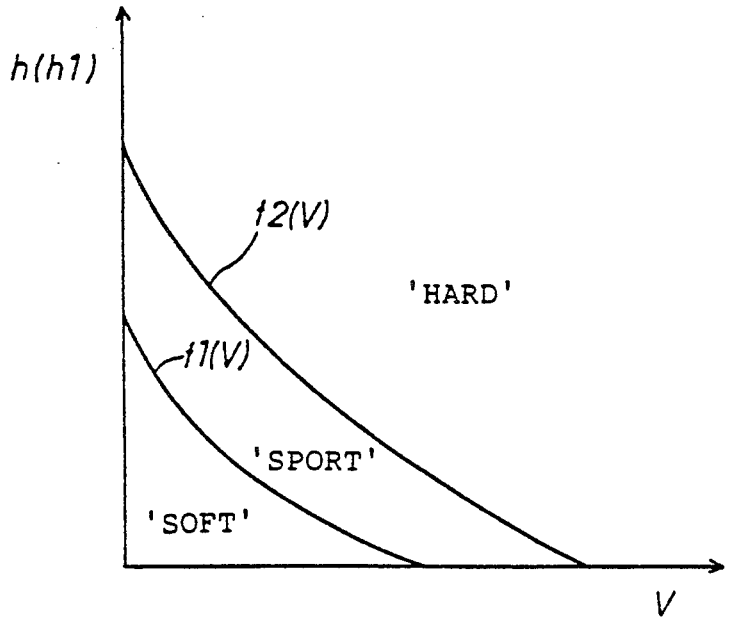
FIG. 19 shows a relationship between a reference value of the first detection process steps and the vehicle speed.

At step 500 it is judged which value a flag F1 is among '0', '1', '2'. The flag F1 represents the states of the damping force of the shock absorbers 3a and 4a, 'soft', 'sport' and 'hard' respectively. Since at the initial state the value is '0', it is judged whether the timer T2 has elapsed the time interval t (552). While T2<t this detection process steps are repeated and no further action is made. When T2>=t is realized, the timer T2 is cleared (554) and it is judged wheter the first largest front vehicle height change h is greater than a corresponding reference value f2(V) (556). If the result is NO, then it is judged whether h is greater than another corresponding reference value f1(V) (560). These reference values are illustrated in FIG. 19. The reference value f1(V) represents a boundary between the 'soft' and the 'sport' states of the shock absorbers 3a and 4a and so determined to increase as the decrease in the vehicle speed and to decrease as the increase in the vehicle speed. Similarly f2(V) represents a boundary between the 'sport' and the 'hard' states of the shock absorbers and so determined to be higher than the f1(V) and increase according to the decrease in the vehicle speed. Here the 'soft' state of the shock absorbers means that the damping force is weak to improve the ride comfort by preventing the shock from the road surface vibrating the vehicle body. The 'hard' state means that the damping force is strong to improve the controllability and stability of the vehicle. The 'sport' state is an intermediate state between the 'soft' and the 'hard' states suited for a normal driving state.

In case h>=f2(V), the flag F1 is set to be '2' (558), and in case f2(V)>h>=f1(V), the flag F1 is set to be '1' (562). Then the timer TC is cleared, the values of VHh, VHl, VHh1 and VHl1 are replaced by the value of the current front vehicle height VH(s) and h and h1 are cleared (566). Here the current cycle of the routine is finished.

Then the next routine begins from the judgment of the value of the flag F1 (550). If the flag F1 is '1' then it is judged whether the timer T2 is greater than t (568). If T2<t, then it is judged whether the timer TC is greater than the first preset time tR (576). The first preset time tR is normally set to be larger than the time interval t. If it is judged that TC<tR here, the timer TD is cleared (578), the values of VHh1 and VHl1 are replaced by the current front vehicle height VH(S)n and h1 is cleared (580).

In the mean time when T2>=t (568), the timer T2 is cleared (570) and it is judged whether h>=f2(V) (572). If it is still f1(V)<=h<f2(V), the values of VHh and VHl are replaced by the current front vehicle height VH(S)n and h is cleared (574). And if TC<tR yet, the steps 578 and 580 are processed and the current routine is finished.

When it has become TC>=tR (576), it is then judged whether the timer TD is greater than the time interval t (582). If TD<t the current routine is finished but if TD>=t the timer TD is cleared (584) and it is judged whether h1<f1(V) (586). While h1<=f1(V), the routine is finished with the process step of step 580. When it has become h1<f1(V), the flag F1 is set to be '0' (588), the timer T2 is cleared, the values of VHh, VHl, VHh1 and VHl1 are replaced by the current front vehicle height VH(S)n and h and h1 are cleared (592).

That shows that when it has become f2(V)>h>=f1(V) with the state of the flag F1=0, it is set that F1=1 once, and after the time interval tR, if h<f1(V), the flag F1 is again set to be '0'.

If it has become h>[f2(V)] =*f2(v)* within the time interval t (572), F1 is set to be '2' (594), the timer TC is cleared and the step 592 is processed to finish the routine.

In the next routine, since F1=2, the timer TC is compared with the first preset time tR (598) and, until TC exceeds the first preset time tR, the timer RD is cleared, the values of VHh1 and VHl1 are replaced by the current front vehicle height VH(S)n and h1 is cleared (612). After the first present time tR, the [time] *timer* TD and the time interval t is compared (602), it is checked by every time interval t in which domain h1 lies. When TD>=t (602) the timer TD is cleared (604) and the comparisons between h1 and f1(V) (606) and between h1 and f2(V) (610) are performed respectively.

If h1>=f2(V) (610), then the flag F1 is not changed. When h1 decreases and it has become that f2(V)>h1>=f1(V) (610), the flag F1 is set to be '1', the timers T2 and TC are cleared (614), the values of VHh, VHl, VHh1 and VHl1 are replaced by the current front vehicle height VH(S)n and h and h1 are cleared (616). When h1 is further decreased that it has become h1<f1(V), the flag F1 is set to be '0' and the timer T2 is cleared (608).

The summary of the above process steps is as follows.

(1) When the speed of the front vehicle height change, which is the change h (h1) in the front vehicle height during the time interval t, exceeds a reference value f1(V) which is determined according to the vehicle speed, the flag F1 is set to be '1' (562) and when it exceeds another reference value f2(V), the flag F1 is set to be '2' (558) from its original value of '0'. When h increases to become larger than f2(V) (572) after the flag F1 is set to be '1', it is immediately set to be '2' (594).

(2) When h decreases to become less than f1(V) (586) after it is set F1=1, the first preset time tR is waited (576) and then it is set that F1=0 (588).

(3) When h decreases to become less than f2(V) (610) after it is set F1=2, the first preset time tR is waited (598) and then it is set F1=1 (614). When h further decreases to become less than f1(V) (606), the first preset time tR is waited (598) and then it is set F1=0 (608).

In the first detection process steps as described above, the alteration of the flag F1 which indicates the state of the shock absorber damping force is immediately done when it is altered to a higher value, while it is altered after the time interval tR when it is altered to a lower value. This is so arranged because the operations for alteration of the damping force should be done immediately to adequately cope with the bump or dip of the road surface, while the returning operations are needed a definite time later regarding the lag time due to the wheelbase.

The first tentative largest front vehicle height change h1 is calculated from VHh1 and VHl1 besides h because it is needed to store the front vehicle height changes separately for in case of the process steps for returning to F1=0 (576–592) and for in case of the process steps for going to F1=2 (568–572, [584] *594*, 596) when it is judged that F1=1 at step 550, since there is a time difference of the first preset time tR in the beginning of the front vehicle height detection.

Figure 18E:
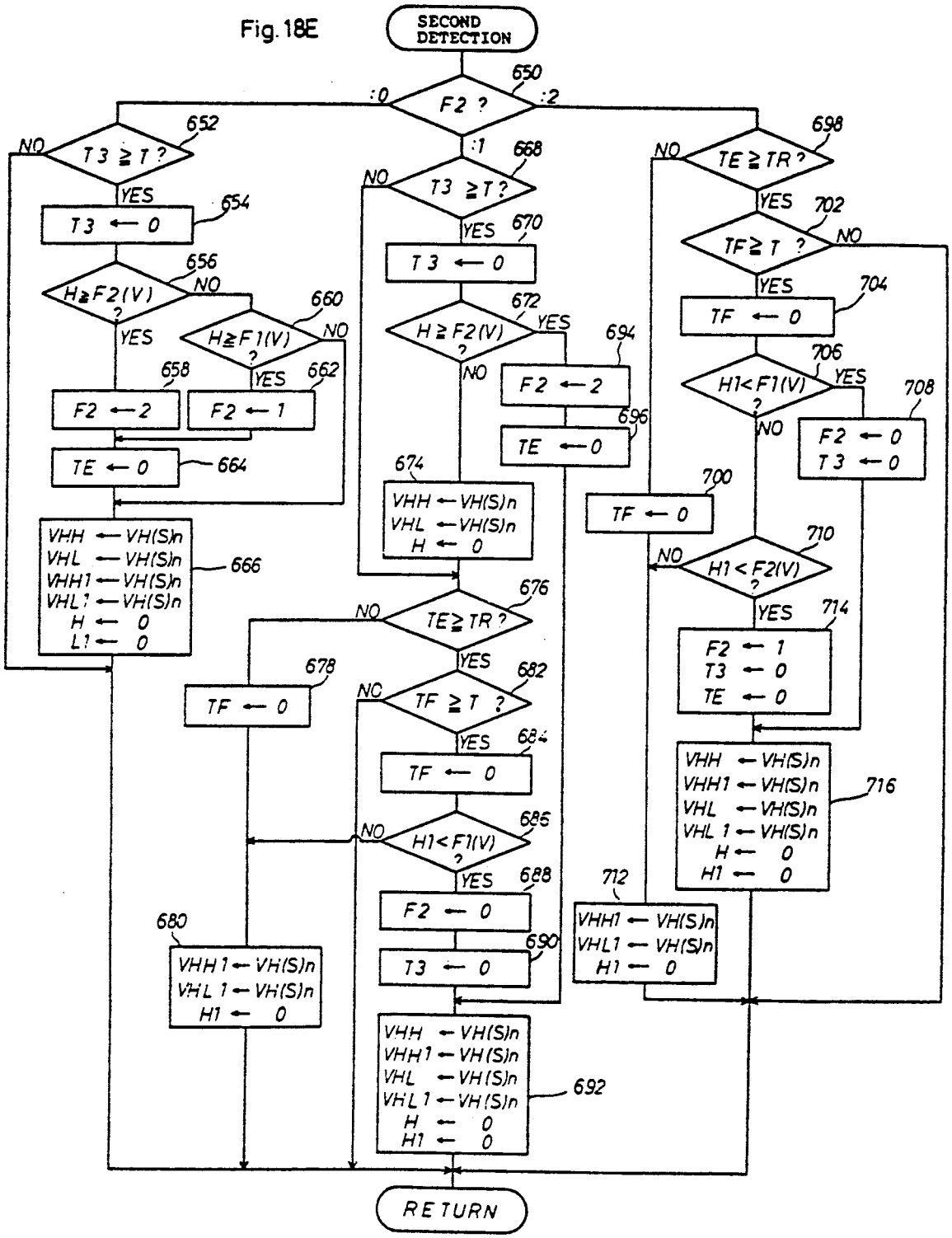

The second detection process steps is hereinafter explained with FIG. 18E. In these process steps, F1 corresponds to F2, T2 to T3, t to T, tR to TR, TC to TE, TD to TF, f1(V) to F1(V), f2(V) to F2(V), VHh to VHH, VHl to VHL, VHh1 to VHH1, VHl1 to VHL1, h to H and h1 to H1 respectively of the variables described above. And the steps also correspond to those of FIG. 18D when the last two digits of the step numbers coincide with each other. The summary of the second detection process steps is as follows.

(1) When the amplitude of the front vehicle height vibration which is the change H (H1) in the front vehicle height during the time interval T, exceeds a reference value F1(V) which is determined according to the vehicle speed V, the flag F2 is set to be '1' (662) and when it exceeds another reference value F2(V), the flag F2 is set to be '2' (658) from its original value of '0'. When H increases to become larger than F2(V) (672) after the flag F2 is set to be '1', it is immediately set to be '2' (694).

(2) When H decreases to become less than F1(V) (686) after it is set F2=1, the second preset time TR is waited (676) and then it is set F2=0 (688).

(3) When H decreases to become less than F2(V) (710) after it is set F2=2, the second preset time TR is waited (698) and then it is set F2=1 (714). When H further decreases to become less than F1(V) (706), the second preset time TR is waited (698) and then it is set F2=0 (708).

Figure 20:
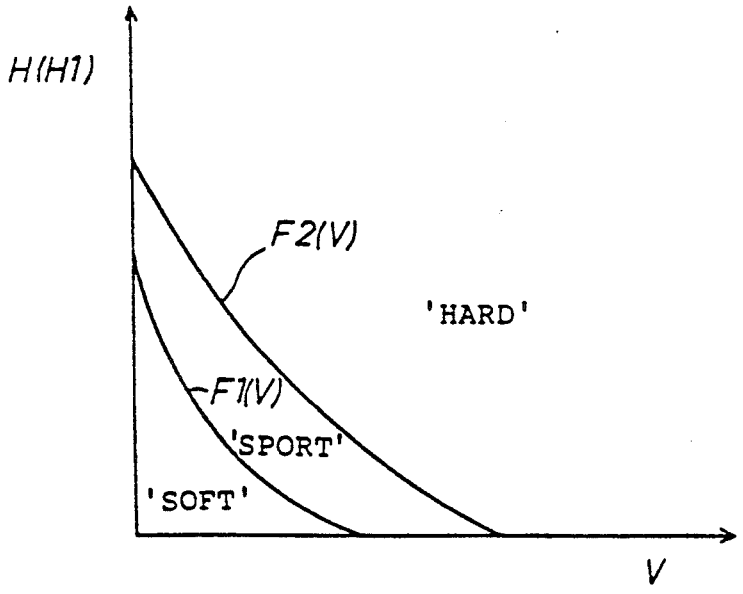
FIG. 20 shows a relationship between a reference value of the second detection process steps and the vehicle speed.

In the second detection process steps as described above, the alteration of the flag F2 which indicates the state of the shock absorber damping force is immediately done when it is altered to a higher value, while it is altered after the time interval TR when it is altered to a lower value, just as same as the case of the first detection process steps. In this second detection process steps, the time interval T is longer than the time interval t and is between a quarter and a full cycle time of the front vehicle height vibration. This process steps are so arranged to detect the amplitude of the front vehicle height vibration. The relationships between F1(V), F2(V) and the vehicle speed V [is] *are* shown in FIG. 20. The second preset time TR may be the same as the first preset time tR, or it may be either longer or shorter, depending on the occasion.

Figure 18F:
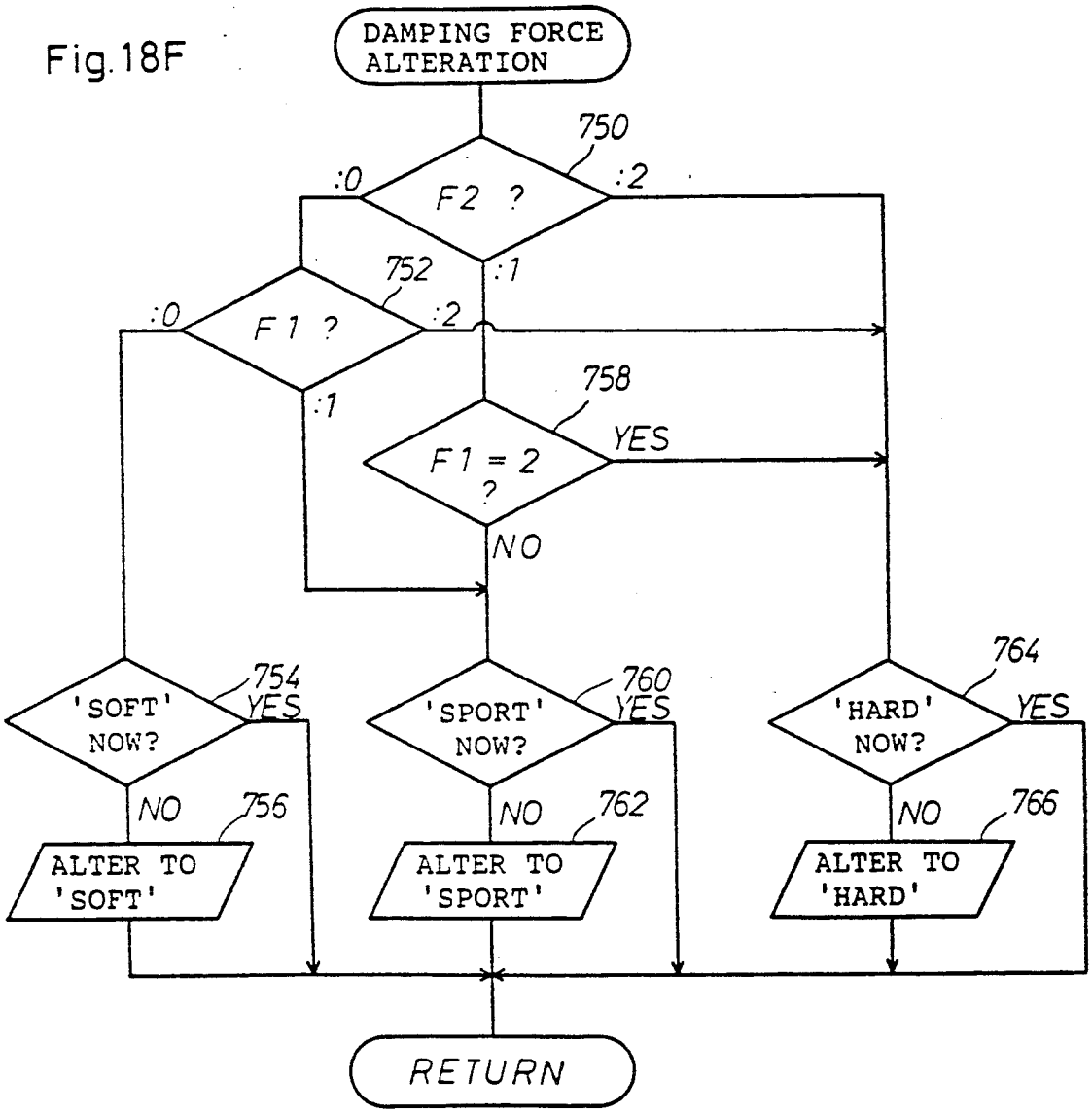

The damping force alteration process steps as the last process steps are explained with FIG. 18F. The flag F2 is judged (750) at first and if the value is '0' then the flag F1 is judged (752). If the value is '0', it is judged whether the current state of the shock absorbers 3a and 4a is the 'soft' state (754). If the result is NO, the actuators 3d and 4d are driven to make the damping force of the shock absorbers weak. Otherwise the process steps are finished.

If the flag F1 is '1' at step 752, it is judged whether the state of the rear shock absorbers 3a and 4a is the 'sport' state (760). If the result is NO, the actuators are driven to make the damping force of the shock absorbers 3a and 4a normal. Otherwise the process steps are finished.

If the flag F1 is '2' at step 752, it is judged whether the state of the rear shock absorbers 3a and 4a is the 'hard' state (764). If the result is NO, the actuators are driven to make the damping force of the shock absorbers 3a and 4a strong. Otherwise the process steps are finished.

If the flag F2 is '1' at step 750, it is judged whether the flag F1 is '2' (758). If the result is NO, the shock absorbers are made to be in the 'sport' state or, if it is already in the 'sport' state, kept to be in the 'sport' state (762). Otherwise, if the flag F1 is '2', they are made to be in the 'hard' state or, if the state is already 'hard', are kept to be in the 'hard' state (766).

The damping force of the rear shock absorbers 3a and 4a are thus controlled according to the values of flag F1 by the first detection process steps or of the flag F2 by the second detection process steps.

Figure 21A:
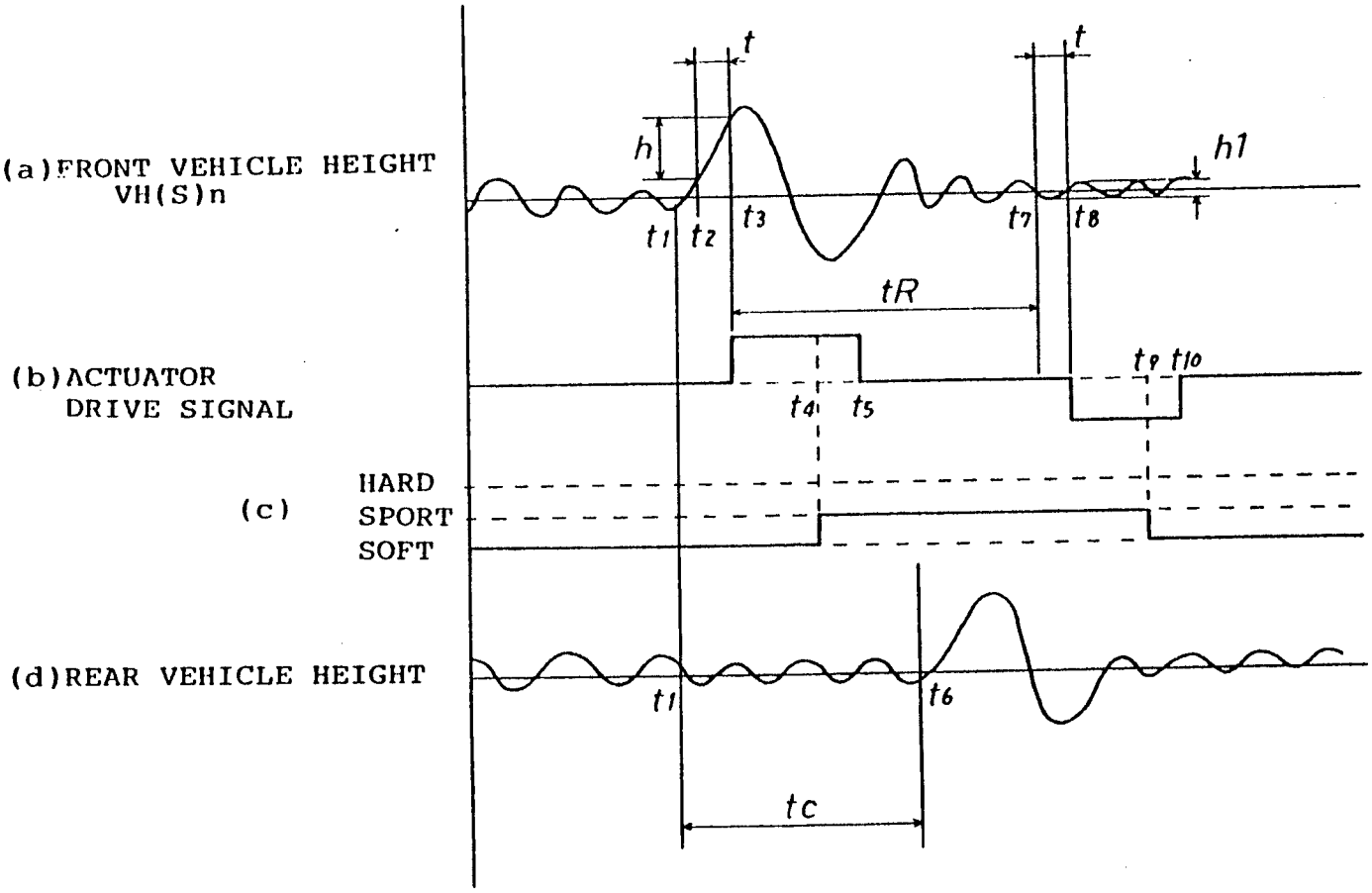
FIGS. 21A, 21B and 21C show time charts corresponding to three cases of the third embodiment.
Figure 21B:
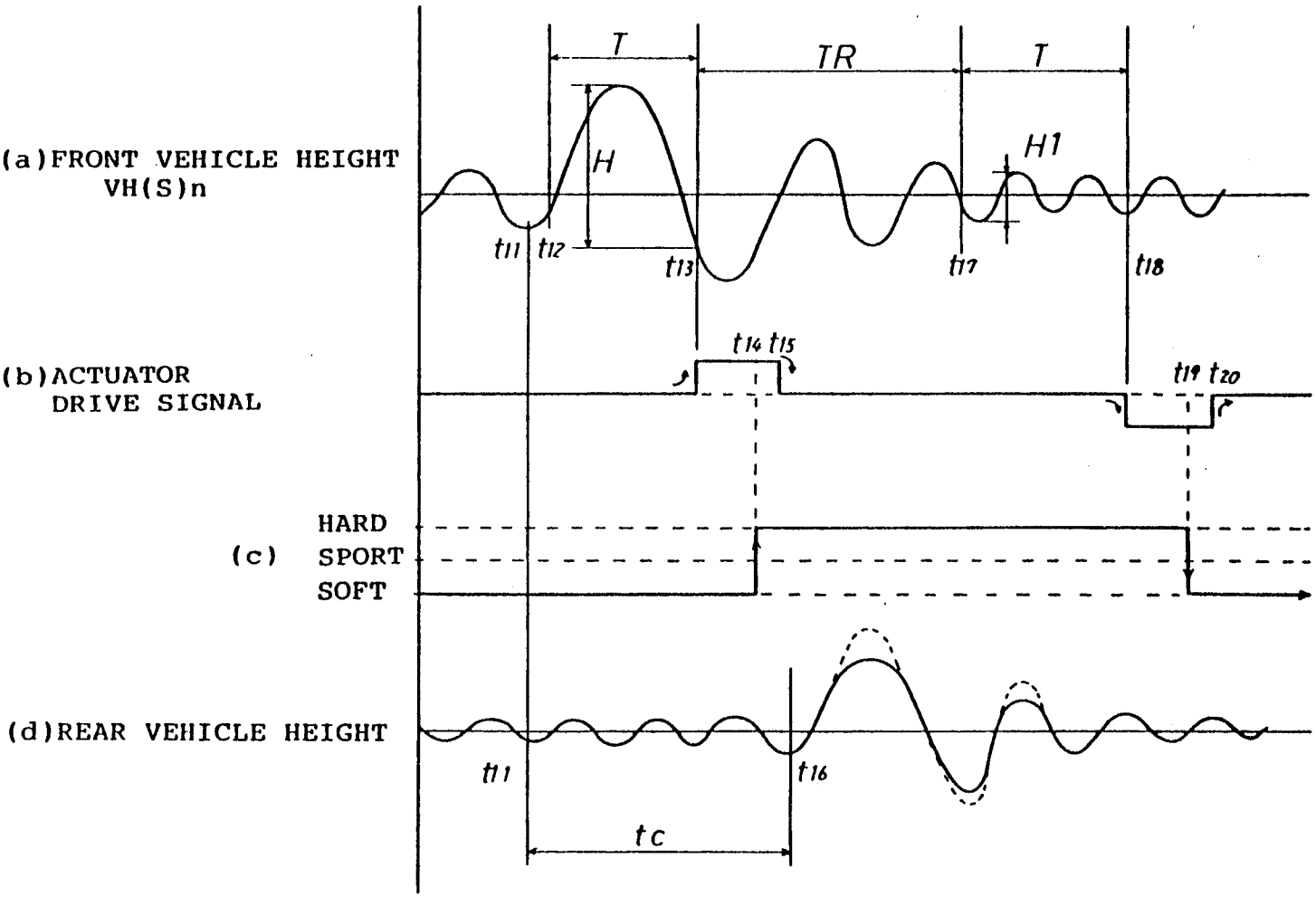
Figure 21C:
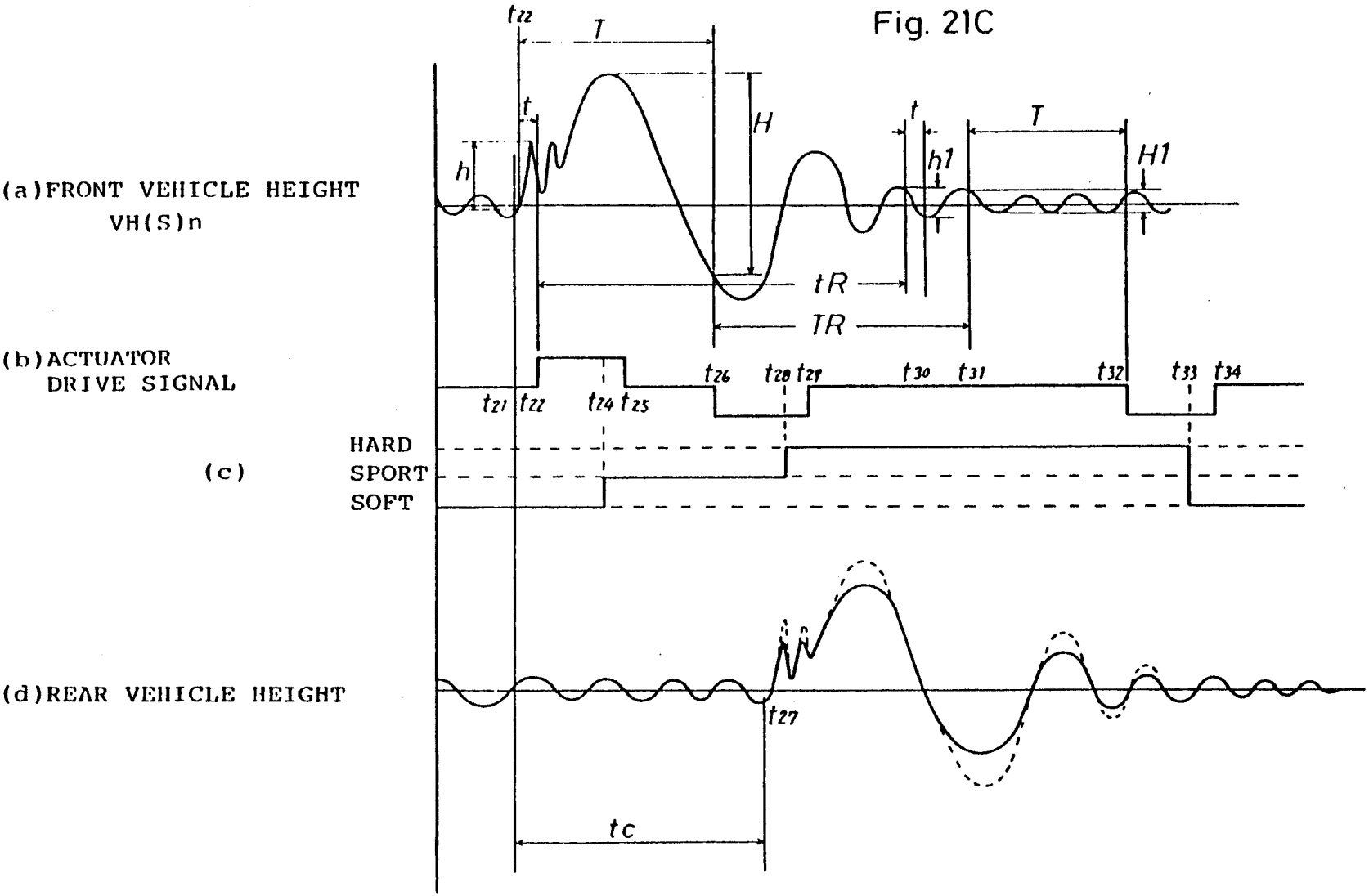

The process steps are then explained with the aid of the time charts of FIGS. 21A–21C, which show the timings of (a) the current front vehicle height VH(S)n, (b) the actuator drive signal, (c) the state of the rear shock absorbers and (d) the rear vehicle height.

In the case of FIG. 21A, front wheels of a vehicle begin to move down in a dip of a road surfece at a time point t1. Since then the current front vehicle height VH(S)n increases sharply and if the first largest front vehicle height change h during the time interval t which is between time points t2 and t3, exceeds f1(V), it is set that F1=1 by the first detection process steps (562). Since the flag F2 is '0' by the initial setting, the rear shock absorbers are altered to the 'sport' state (762). From the time point t3 the drive signal is sent to the actuators 3d and 4d and is terminated at a time point t5, the alteration operation of the actuators are finished at the time point t4 which is between the time points t3 and t5. After that, at a time point of t6 which is a time interval tc later than the time point t1, the rear wheels begin to move down into the dip, where tc is determined as A1/V, A1 being the wheelbase and V being the vehicle speed.

If the first largest front vehicle height change h does not exceed f2(V) from the time point t3 until a time point t7, the interval being tR, the first tentative largest front vehicle height change h1 during the time interval t is detected from the time point t7. If h1 is less than f1(V) (586), it is set that F1=0 (588), the actuator drive signal is sent at a time point t8 which is the time interval t later than the time point t7 to the actuators and the damping force of the rear shock absorbers 3a and 4a is altered at a time point t9 from the 'sport' state to the 'soft' state. At a time point t10 the actuator drive signal is terminated. In summary, the damping force of the rear shock absorbers are altered according to the first vehicle height data, i.e. the first largest front vehicle height change h during the time interval t, and then after the time interval tR, when the rear wheels have already passed the bump or dip, the damping force is corrected according to the second vehicle height data, i.e. the first tentative largest front vehicle height change h1 during the time interval t.

In the case of FIG. 21B, front wheels of a vehicle begin to move down in a dip of a road surface at a time point t11. Since then the current front vehicle height VH(S)n increases sharply and if the second largest front vehicle height change H during the time interval T, which is between time points t12 and t13, exceeds F2(V), it is set that F2=2 by the second detection process steps (658). If the flag F1 is '0' by the first detection process steps, the rear shock absorbers are altered to the 'hard' state (766). From the time point t13 the drive signal is sent to the actuators 3d and 4d and is terminated at a time point t15, the alteration operation of the actuators are finished at the time point t14 which is between the time points t13 and t15. After that, at a time point of t16 which is a time interval tc later than the time point t11 the rear wheels being to move down into the dip.

If the second largest front vehicle height change H during the time ineterval T does not exceed F2(V) from the time point t13 to a time point t17, the interval being TR, the second tentative largest front vehicle height change H1 during the time interval T is detected from the time point t17. If H1 is less than F1(V) (706), it is set that F2=0 (708), the actuator drive signal is sent at a time point t18 which is the time interval T later than the time point t17 to the actuators and the damping force of the rear shock absorbers 3a and 4a is altered at a time point t19 from the 'hard' state to the 'soft' state. At a time point t20 the actuator drive signal is terminated. In summary, the damping force of the rear shock absorbers is altered according to the first vehicle height data, i.e. the second largest front vehicle height change H during the time interval T, and then after the time interval TR, when the rear wheels have already passed the bump or dip, the damping force is corrected according to the second vehicle height data, i.e. the second tentative largest front vehicle height change H1 during the time interval T.

In the case of FIG. 21C, which explains the case that the two damping force alteration operations by the first and the second detection process steps are performed in combination, front wheels of a vehicle begin to move down in a dip of a road surface at a time point t21. Since then the current front vehicle height VH(S)n increases sharply and if the first largest front vehicle height change h during the time interval t, which is between time points t22 and t23, exceeds f1(V), it has become F1=1 by the first detection process steps (562). Since the flag F2 is '0' by the initial setting, the rear shock absorbers are altered to the 'sport' state (762). From the time point t23 the drive signal is sent to the actuators 3d and 4d.

If the second largest front vehicle height change H during the time interval T exceeds F2(V) from the time point t22 to a time point t23, it is set that F2=2 by the second detection process steps (658). So, though the flag F1 is '1', the rear shock absorber is altered to be the 'hard' state (766). From the time point t26 the actuator drive signal is sent and the hardening operation is finished at a time point t28. The actuator drive signal is terminated at a time point t29. During that, at a time point t27 which is a time interval tc later than the time point t21 the rear wheels begin to move down in the dip.

After that, at a time point t30 which is a time interval tR later than the time point t23, the value of h1 is checked by every time interval t by the first detection process steps (584). As h1 is already less than f1(V), it is set that F1=0 (588). Since, however, this time point is still within the time interval of TR+T from the time point t26, it is maintained that F2=2 until a time point t32 (698). So at the damping force alteration judgement (750), the 'hard' state is maintained and the vehicle body vibration is detered to keep the controllability and stability good.

After that, from a time point t31, the value of H1 is checked by every time interval T by the second detection process steps (706). As H1<F1(V) at first of the process steps, it is set that F2=0 (708). So, since F1=0 already, the shock absorbers are altered to be in the 'soft' state by the damping force alteration process step (756). In this combined process steps, firstly the rear shock absorber damping force is altered according to the first largest front vehicle height change h during the time interval t by the first detection process steps and then it is corrected according to the second largest front vehicle height change H during the time interval T by the second detection process steps. And further correction of the damping force is made after the time interval TR.

As described above, the third embodiment of the present invention detects the speeds of the front vehicle height change h and h1 and the rear suspension characteristic is controlled by judging h1 with the reference values, f1(V) and f2(V), and H1 with F1(V) and F2(V). The embodiment is so arranged that the controllability and stability of the vehicle can be maintained and the rear portion of the vehicle is protected from being shocked. With the use of the speed of the front vehicle height change h and h1 a quick response or alteration of the rear suspension characteristic against sporadic bumps or dips of the road surface is made, and with the use of the amplitude of the front vehicle height change H and H1 the alteration is corrected to keep the control more precise and adequate to the disturbance. Besides that, as the reference values are determined according to the vehicle speed, the control is maintained at further wide situations. Since the reference values, f1(V) and f2(V) corresponding to h and h1 and F1(V) and F2(V) corresponding to H and H1, are made to be two separate values, the control can well cope with the size of the bump or dip.

While in the third embodiment, the suspension characteristic is altered by altering the damping force of the rear shock absorbers, it is also realized by the alteration of the spring contact of rear air suspensions into three different states, also 'soft', 'sport' and 'hard'. That is done actually by changing the cmmunication passage between the main air chambers 3b and 4b and the auxiliary air chambers 3c and 4c with the use of the large diameter air passages 70 and the small diameter air passage 74 of the valve unit 44 (FIG. 5). The two means, the shock absorbers and the air suspensions, can be used simultaneously to alter the rear suspension characteristic.

Instead of the speed of front vehicle change used in the embodiment, an acceleration of that may be used to judge the bump or dip, which has a merit of detecting them at the earliest stage of the moving up or down of the front wheels.

The fourth and the fifth embodiments of the present invention are hereinafter described.

Figure 22:
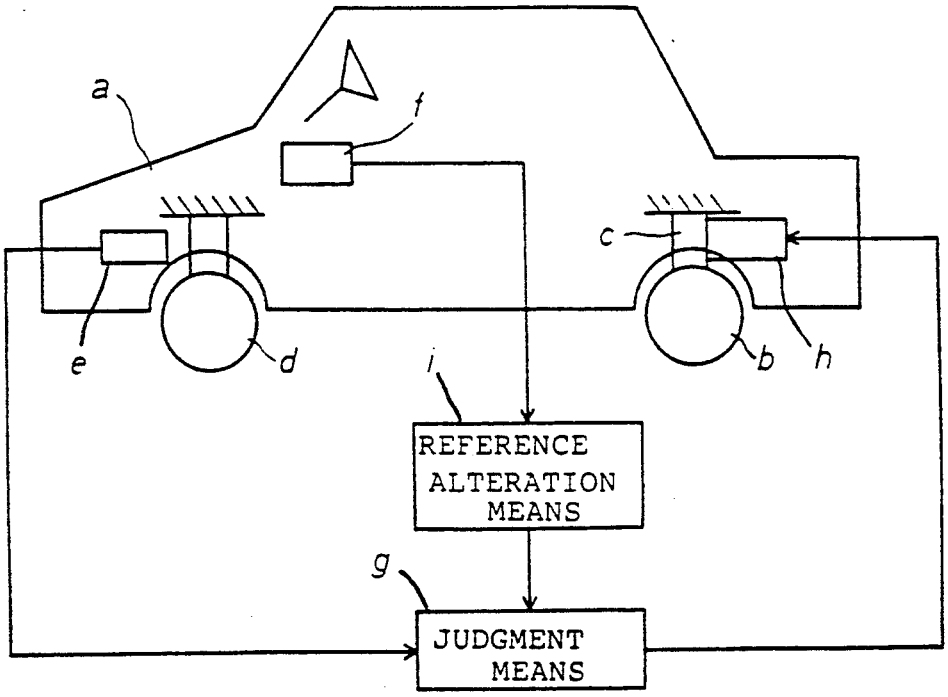
FIG. 22 shows an outline of the fourth and fifth embodiments of the present invention.

FIG. 22 shows an outline of the embodiments. These embodiments include a reference alteration means i which alters the reference value used in a judgment means g.

A front vehicle height detector e is provided between the body and the front wheels d of an automobile to detect the distance therebetween and generate and send vehicle height data to the judgment means g. The judgment means g compares the vehicle height data with corresponding reference values, which can be altered by the alteration means i depending on the vehicle speed detected by a speed sensor f.

A judgment result signal is generated according to the comparison by the judgment means g and is sent to a rear suspension characteristic alteration means, which alters rear suspensions c provided between the body and rear wheels b.

Figure 23A:
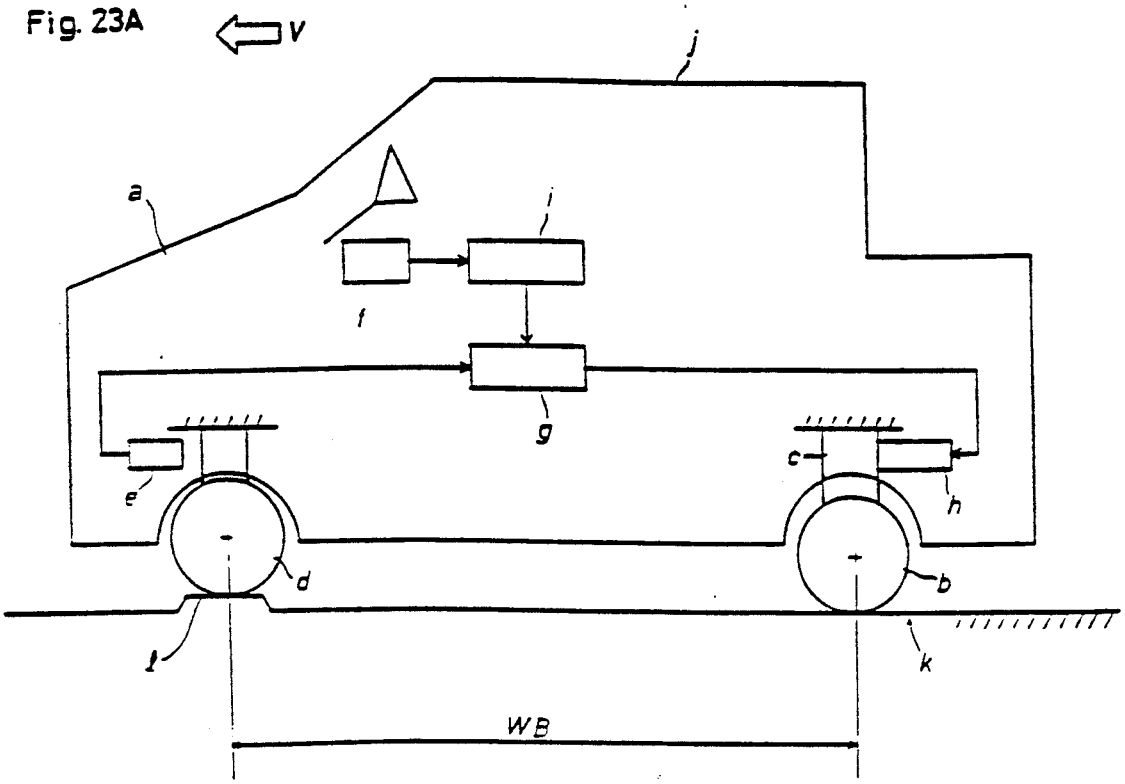
FIG. 23A shows a schematic figure of a vehicle passing a bump of a road surface in the fourth and fifth embodiments.
Figure 23B:
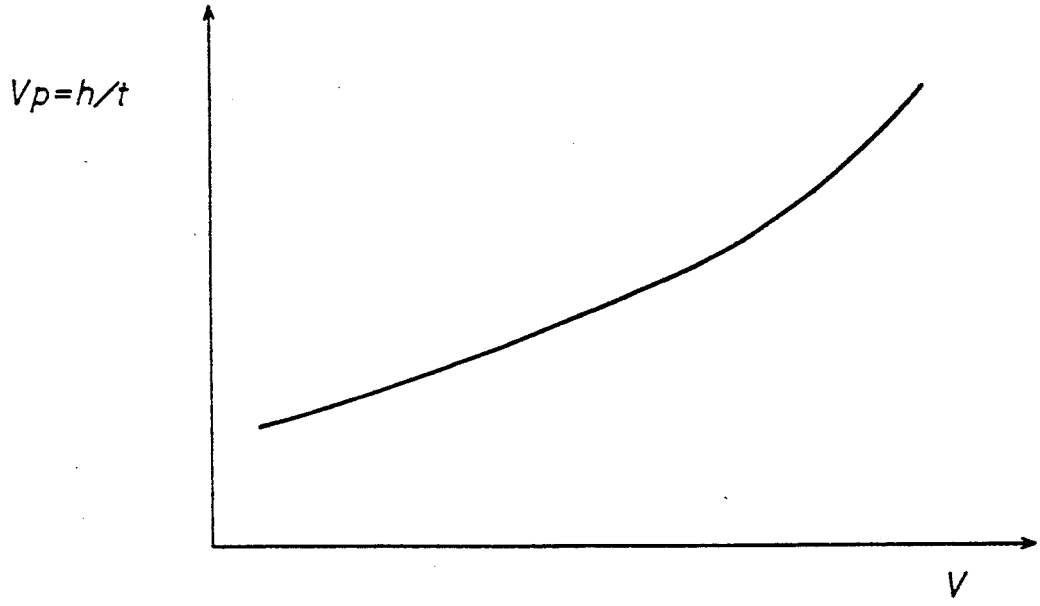
FIG. 23B shows a relationship between a piston speed of a shock absorber and a vehicle speed.
Figure 23C:
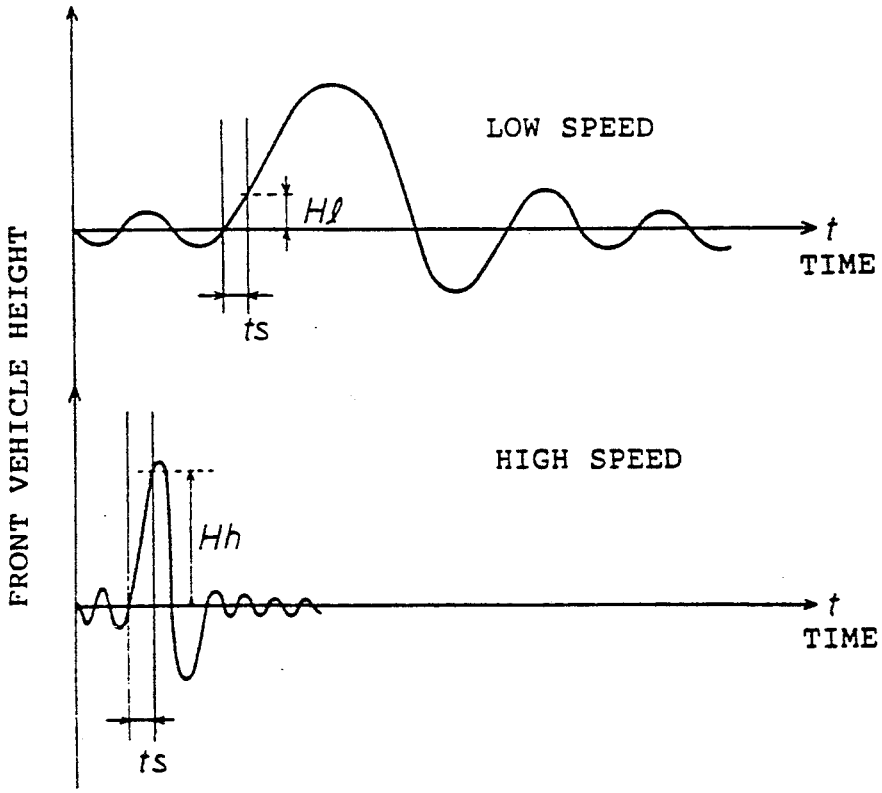
FIG. 23C shows timing charts corresponding to FIG. 23A.

FIG. 23A shows a schematic figure of an automobile passing a bump 1, FIG. 23B shows a relationship of a piston speed of a shock absorber and a vehicle speed V and FIG. 23C shows time charts corresponding to the case of FIG. 23A. The figures are for explaining an abstract of the process steps performed by the fourth and the fifth embodiments.

The moving speed of a piston of a shock absorber generally increases according to an increase in the running speed of an automobile as FIG. 23B. A change in the front vehicle height during a definite time interval ts increases as the automobile speed increases, as shown in FIG. 23C, whose upper part shows a time chart of the change of the front vehicle height when the automobile is running with relatively low speed and the lower chart shows that when it is running with relatively high speed.

The front vehicle height change of lower automobile speed [H1] *Hl* is less than that of higher speed Hh. This indicates that the conditions of the automobile is different when it runs with a higher speed and when with a lower speed. So the speed sensor f is provided to alter the judging condition of the judgment means g according to the speed of an automobile j to detect, for example, a bump 1 of a road surface k.

The construction of the apparatus of these embodiments is the same as that of the first embodiment as shown in FIGS. 3–8. But the process steps performed by the ECU 300 is different and are shown by the flowcharts of FIGS. 24A–24D for the fourth embodiment and of FIGS. 28A–28D for the fifth embodiment.

An outline of the process steps of the fourth embodiment is described referring to FIG. 24A as follows.

(1) Current front vehicle height VH(S)n is detected (808).

(2) a reference value h1 is calculated using the current vehicle speed V (810).

(3) It is judged whether a front vehicle height change during a definite time interval exceeds the reference value h1 (822).

(4) If the front vehicle height change exceeds the reference value h1, the rear suspension characteristic is altered (834).

The alteration of rear suspension characteristic means, if the driving condition is that requires especially preventing shocks at the rear passenger seat, alteration to a 'SOFT' state. In definite, the actuators 3d and 4d are driven to connect the main air chambers 3b and 4b and the auxiliary air chambers 3c and 4c, respectively, or the damping forces of the shock absorbers 3a and 4a are decreased. If, on the other hand, the driving condition is that the controllability and stability are to be required against large vibrations due to the road surface irregularities, the alteration of the rear suspension characteristic means the alteration to a 'HARD' state. In definite, the main air chambers 3b and 4b and the auxiliary air chambers 3c and 4c are disconnected to make the spring constant of the rear air suspensions high or the damping forces of the shock absorbers 3a and 4a are increased.

The above-mentioned items (1)–(4) are the main process steps for producing the effect of the present invention through the fourth embodiment. In addition, other process steps are performed in this embodiment as follows:

(5) Subsequently to the item (4), the characteristic of the rear wheel suspensions is returned to the original state if the front vehicle height is within a predetermined range after a predetermined time interval (826–834).

Figure 25:
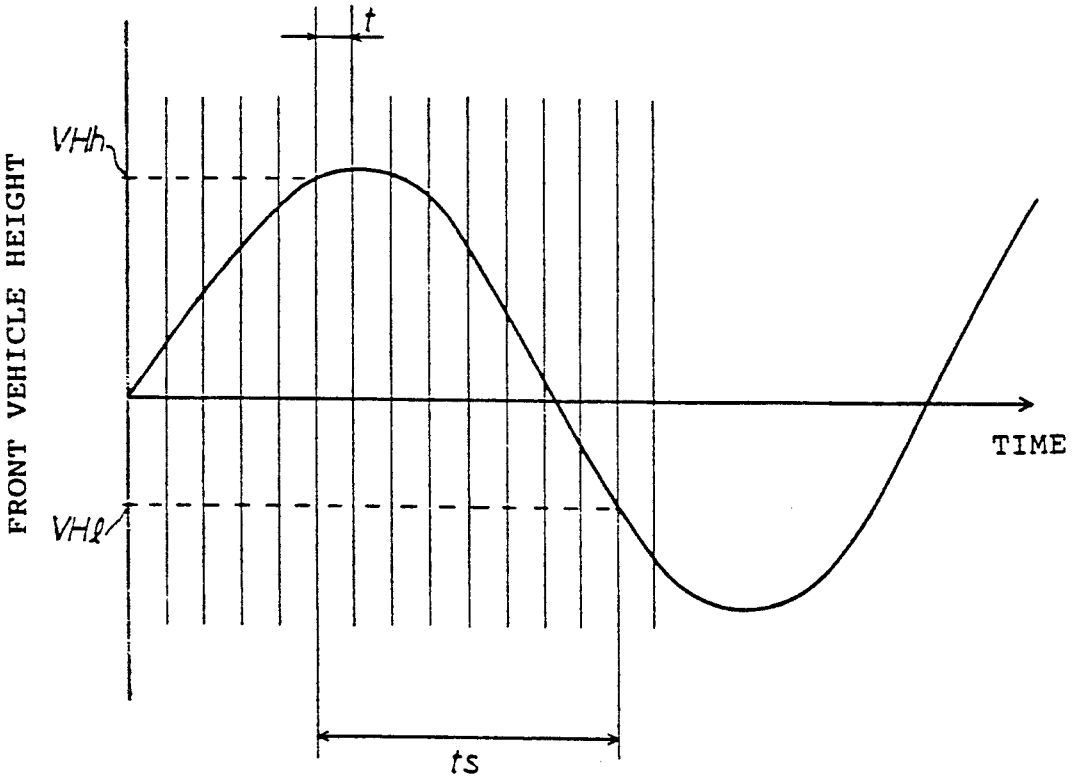
FIG. 25 shows a timing chart explaining a vehicle height data sampling time interval t and a vehicle height judgment time interval ts.

The process steps in the fourth embodiment are hereinafter described in detail. It is judged firstly whether or not the process steps are being performed for the first time since the activation of the ECU 300 (800). If the process steps are judged to be being performed for the first time since the activation of the ECU 300, initial setting is performed (802), all variables are cleared and all flags are reset. After the initial setting is performed [(800)] (*802*) or if the process steps in the routine are judged to be performed for the second time or later since the activation of the ECU 300, it is judged whether a sampling time interval t has elapsed (804). The time interval t is a preset smallest time interval for sampling vehicle height data, as shown in FIG. 25. A timer T1 is counted at step 840 in the intermittent interrupt routine process steps of FIG. 24B. When the timer T1 elapses the time interval t, the timer T1 is reset (806) and a current front vehicle height VH(S)n is input from the front vehicle height sensors 1 and 2 (808).

Then a delay time Tr for returning the rear suspension characteristic is determined and the maximum front vehicle height VHh and the minimum front vehicle height [VH1] *VHl* during the time interval t are determined (810). Also a reference value h1 for beginning the control and another reference value h2 for terminating the control are calculated (810).

Details of this step 810 are explained with FIG. 24C as follows. Firstly it is judged whether the current front vehicle height VH(S)n exceeds the past maximum front vehicle height VHh (810a).

Figure 26:
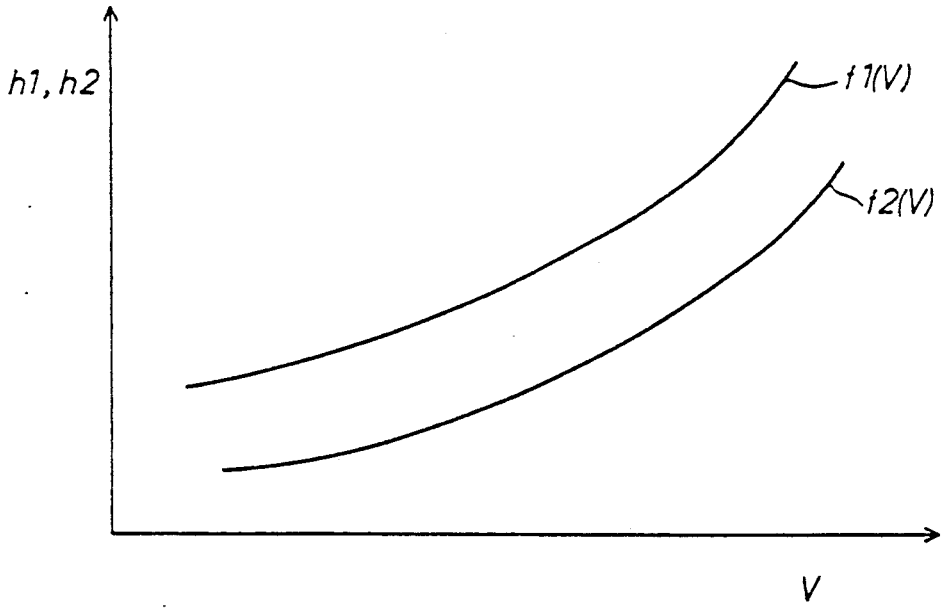
FIG. 26 shows a relationship between reference values h1 and h2 and the vehicle speed V.

If the result is YES, a new maximum front vehicle height VHh is determined to be the current front vehicle height VH(S)n (810b). Otherwise it is judged whether the current front vehicle height VH(S)n is less than the past minimum front vehicle height [VH1] *VHl*(810c). If the result is YES, a new minimum front vehicle height [VH1] *VHl* is determined to be the current front vehicle height VH(S)n (810d). Otherwise and after step 810b or 810d is performed, the vehicle speed V is detected by the vehicle speed sensor 250(810e) and the delay time Tr is calculated (810f) as $$Tr = WB/V + A2,$$

where WB is wheelbase of the vehicle, V is the vehicle speed and A2 is a compensatory term regarding to a detection lag and passing time. The reference values h1 and h2 are determined, by the use of preset relationships as shown by FIG. 26, according to the vehicle speed V (810g). They are so determined to increase as the vehicle speed V increases and it is always set that $h1 > h2$. The relationship between h1 and V is represented by a function f1 and that between h2 and V is represented by a function f2, as in FIG. 26.

Returning to FIG. 24A, it is judged whether the vehicle is running by comparing the current vehicle speed V and a reference preset value VO (812) and only when the vehicle is running, further process steps are performed. Then it is judged whether 'AUTO' mode is selected by the driver (814). If the 'AUTO' mode is selected, then it is judged whether a flag F1 is set (816), which indicates that the rear suspension characteristic is in the altered state. This time, as $F1=0$, step 818 is selected and it is judged whether a timer T2 exceeds a time interval ts for judging the front vehicle height. The time interval ts is determined as a product of the sampling time interval t and an integer as shown in FIG. 25. The timer T2 is counted at step 840 in the intermittent interrupt routine process steps of FIG. 24B. When the timer T2 elapses the time interval ts, the timer T2 is reset (820). Then it is judged whether the largest front vehicle height change VHh–VHl during the time interval ts exceeds the corresponding reference value h1 for beginning the alteration control (822). If the result is YES, the flag F1 is set (824) and the maximum front vehicle height VHh and the maximum front vehicle height VHl are replaced by the current front vehicle height VH(S)n (832). Then at step 834 the rear suspension characteristic alteration actuators are driven. Details of the step 834 are explained with FIG. 24D as follows.

It is judged whether the flag F1 is set (834a) and, since this time $F1=1$, it is judged whether a flag FSF is set (834d). The flag FSF indicates that the rear suspension characteristic is in the 'SOFT' state. Since this time $FSF=0$, the rear suspension characteristic is altered to the 'SOFT' state, the flag FSF is set and a flag FSP representing the 'SPORT' state is reset *(834e), and a timer T3 is reset* (834f). Those are details of step 834 and the process step returns to step 800 in FIG. 24A.

After executing steps 800–814, step 826 is selected at step 816, since $F1=1$ this time. It is judged whether a timer T3 exceeds a delay time Tr for returning the rear suspension characteristic (826). The timer T3 is counted at step 840 in the intermittent interrupt routine process steps of FIG. 24B. When the timer T3 exceeds Tr (826), it is judged whether the timer T2 exceeds a time interval ts. The timer T2 is counted at step 840 in the intermittent interrupt routine process steps of FIG. 24B. When the timer T2 elapses the time interval ts, the timer T2 is reset (828). Then it is judged whether the largest front vehicle height change VHh−VHl during the time interval ts is less than a corresponding reference value h2 for returning control (829). If the result is YES, the flag F1 is reset (830) and the maximum front vehicle height VHh and the minimum front vehicle height VHl are replaced by the current front vehicle height VH(S)n (832). And at step 834, the rear suspension characteristic alteration actuators are driven, whose details are explained with FIG. 24D as follows.

It is judged whether the flag F1 is set (834a) and, since this time $F1=0$, then it is judged whether a flag FSP is set (834b). Since this time $FSP=0$, the rear suspension characteristic is altered to the 'SPORT' state, the flag FSP is set and the flag FSF is reset (834c). Then a timer T3 for counting a delay time until returning the rear suspension characteristic is reset [(8345)] *(834f)*. Those are details of step 834 and the process steps returns to step 800 of FIG. 24A.

The routines as described above are processed repeatedly.

Figure 27A:
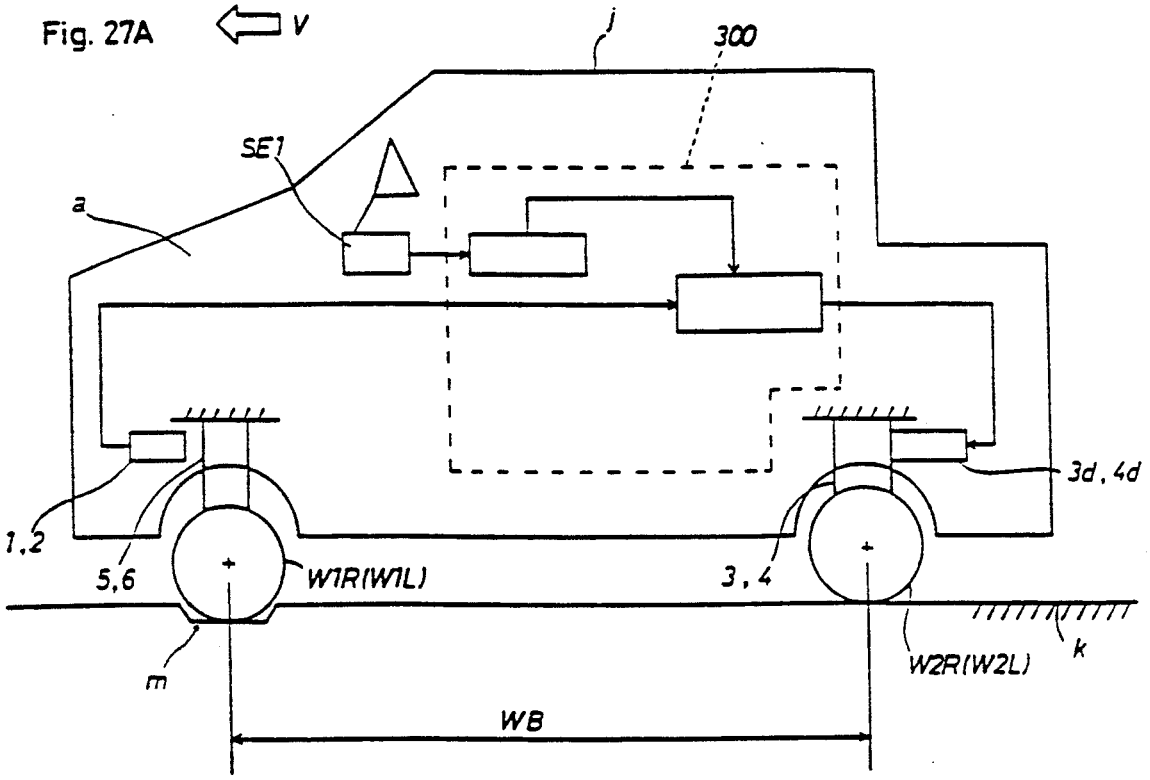
FIG. 27A shows a schematic figure of a vehicle passing a dip of a road surface in the fourth embodiment.
Figure 27B:
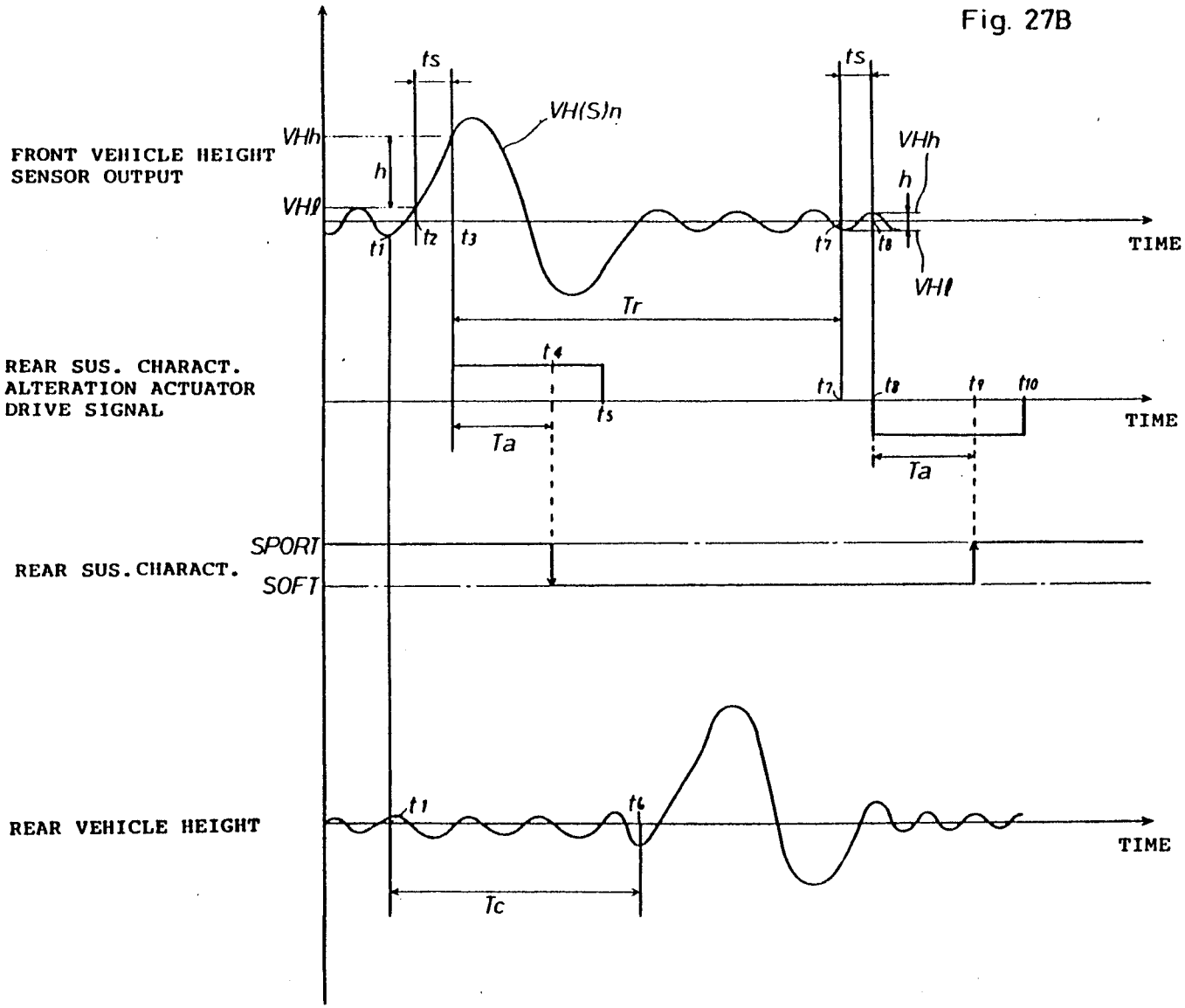
FIG. 27B shows timing charts corresponding to FIG. 27A.

An example of control timings performed by the fourth embodiment is then explained with FIGS. 27A and 27B. FIG. 27A shows an automobile j whose front wheel W1R or W1L is passing a dip m of a road surface k with a speed V. FIG. 27B shows time charts of the output of the front vehicle height sensor 1 or 2, the drive signal for the rear suspension characteristic alteration actuators 3d and 4d, the rear suspension characteristic and the rear vehicle height.

The front wheel W1R or W1L begins to move down into the dip m at a time point t1, Since *then,* the output VH(S)n of the front vehicle height sensor 1 or 2 becomes large. From the time point t1, the front vehicle height is sampled every time interval t as shown in FIG. 25, and the maximum front vehicle height VHh and the minimum front vehicle height VHl during the time points t2 and t3. The difference VHh−VHl is the largest front vehicle height change during the time interval ts. The reference values h1 and h2 are determined as in FIG. 26 according to the vehicle speed.

At the time point t3, the ECU 300 judges that the largest front vehicle height change h exceeds a corresponding reference value h1. At this time point, the ECU 300 drives the rear suspension alteration actuators 3d and 4d to alter the rear suspension characteristic to a 'SOFT' state, i.e. the main air chambers 3b and 4b are connected with the auxiliary air chambers 3c and 4c, respectively.

The alteration operation is finished at a time point t4, a time interval Ta later than t3. The driving signal from the ECU 300 is sent to the actuators 3d and 4d until a time point t5, through the alteration operation per se is finished before at the time point t4. Between the time point t1 and a time point t6, which is a time interval Tc later than the time point t1, the rear wheels W2R, W2L begin to move down into the dip m. Here the time interval Tc is that for the front and rear wheels to pass the dip.

So the time point t4 should be before the time point t6.

At a time point t7, which is a time interval Tr after the time point t3, the rear wheels W2R, W2L have passed the dip m.

At a time point t8, which is a time interval ts later than the time point t7, the ECU 300 judges that the largest front vehicle height change VHh−VHl is less than a corresponding reference value h2. At this time point, the ECU 300 drives the rear suspension alteration actuators 3d and 4d to alter the rear suspension characteristic from the 'SOFT' state to the 'SPORT' state, i.e. the main air chambers 3b and 4b are disconnected with the auxiliary air chambers 3c and 4c, respectively.

The alteration operation is finished at a time point t9, a time interval Ta later than t8. The driving signal from the ECU 300 is sent to the actuators 3d and 4d until a time point t10, through the alteration operation per se is finished before at the time point t9.

As described above, the fourth embodiment is so arranged that shocks are prevented at the rear part of the automobile and ride comfort thereof is kept good in passing sporadic bumps or dips. And after passing them, the suspension characteristic is returned to fit to a normal road surface to maintain the controllability and stability. In the above embodiment, the rear suspension characteristic is altered to 'SOFT' and 'SPORT' states according to the judgment results, the alteration steps may be more by so arranging the air suspensions or shock absorbers or combining the various characteristics of every component.

As the reference values for comparing the largest front vehicle height changes is altered depending on the vehicle speed in the fourth embodiment, the rear suspension characteristic is altered adequately at any driving speed. And because the reference values are increased according to the vehicle speed, the number of occurences of the rear suspension characteristic alteration decreases as the vehicle speed increases, which leads to a merit of prolonged duration of the actuators. The two reference values are set to be different for preventing the hunting of the rear suspension alteration control.

Figures 28A, 28B:
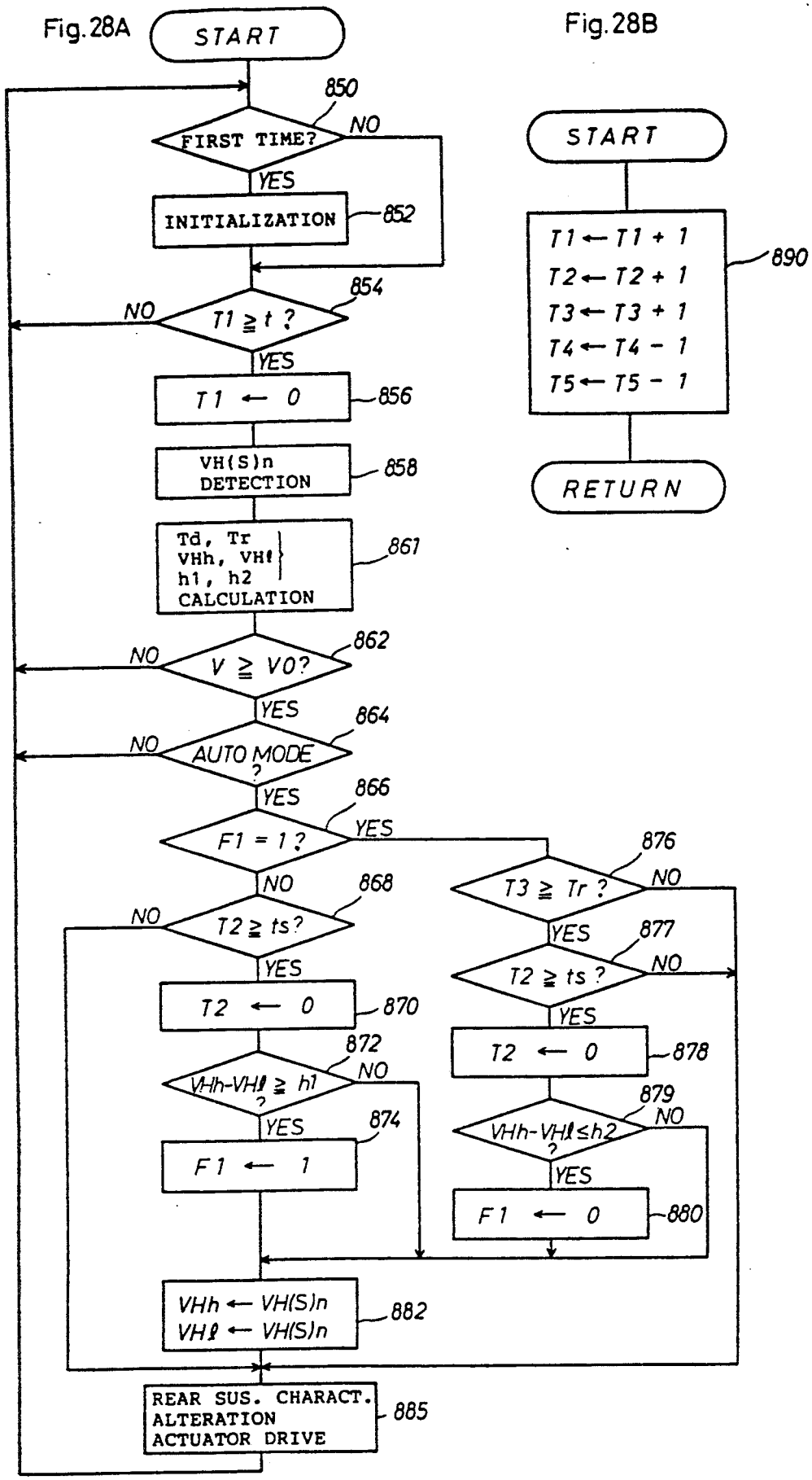
FIGS. 28A, 28B, 28C and 28D show flowcharts of process steps executed by the ECU in the fifth embodiment.
Figure 28C:
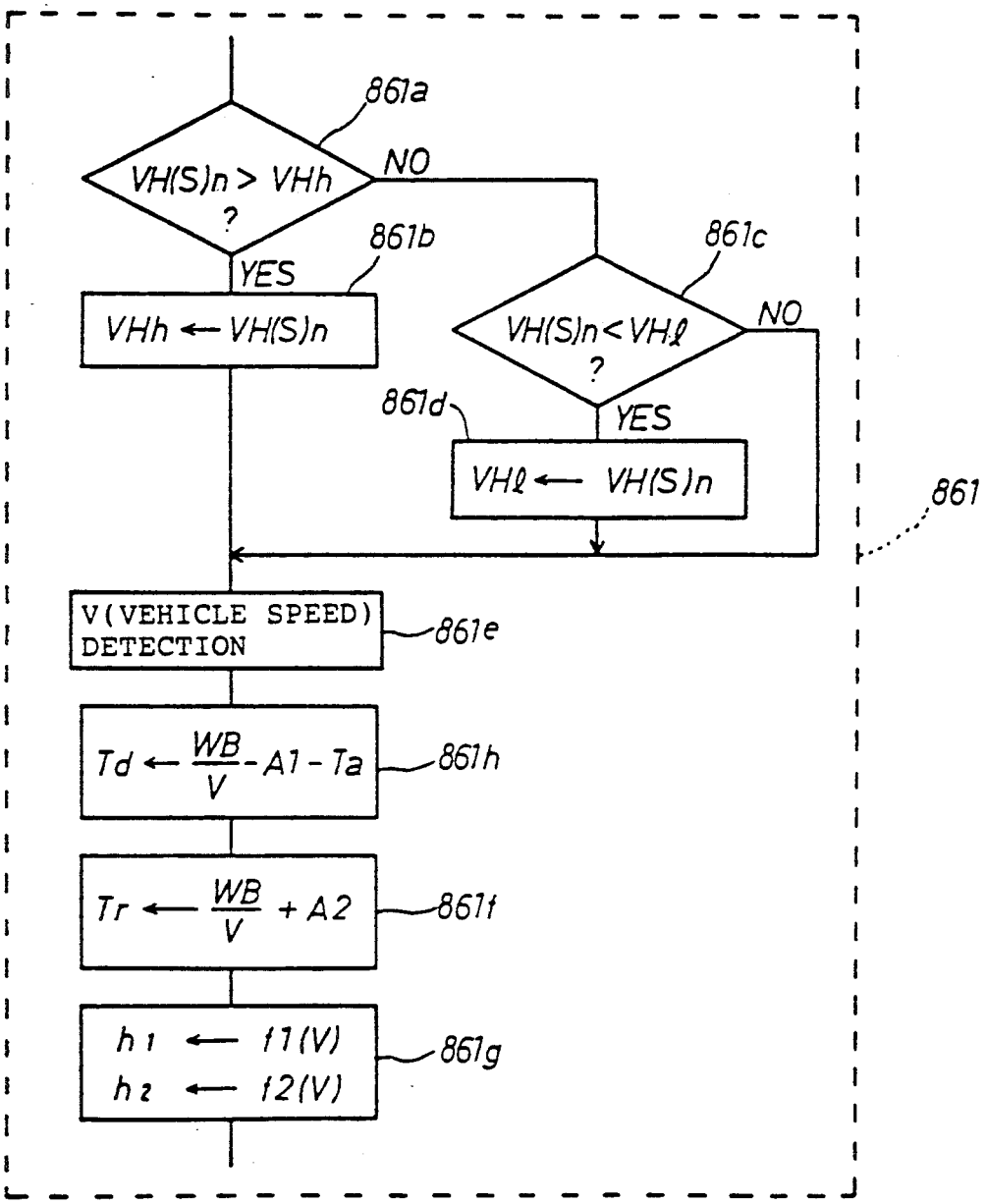
Figure 28D:
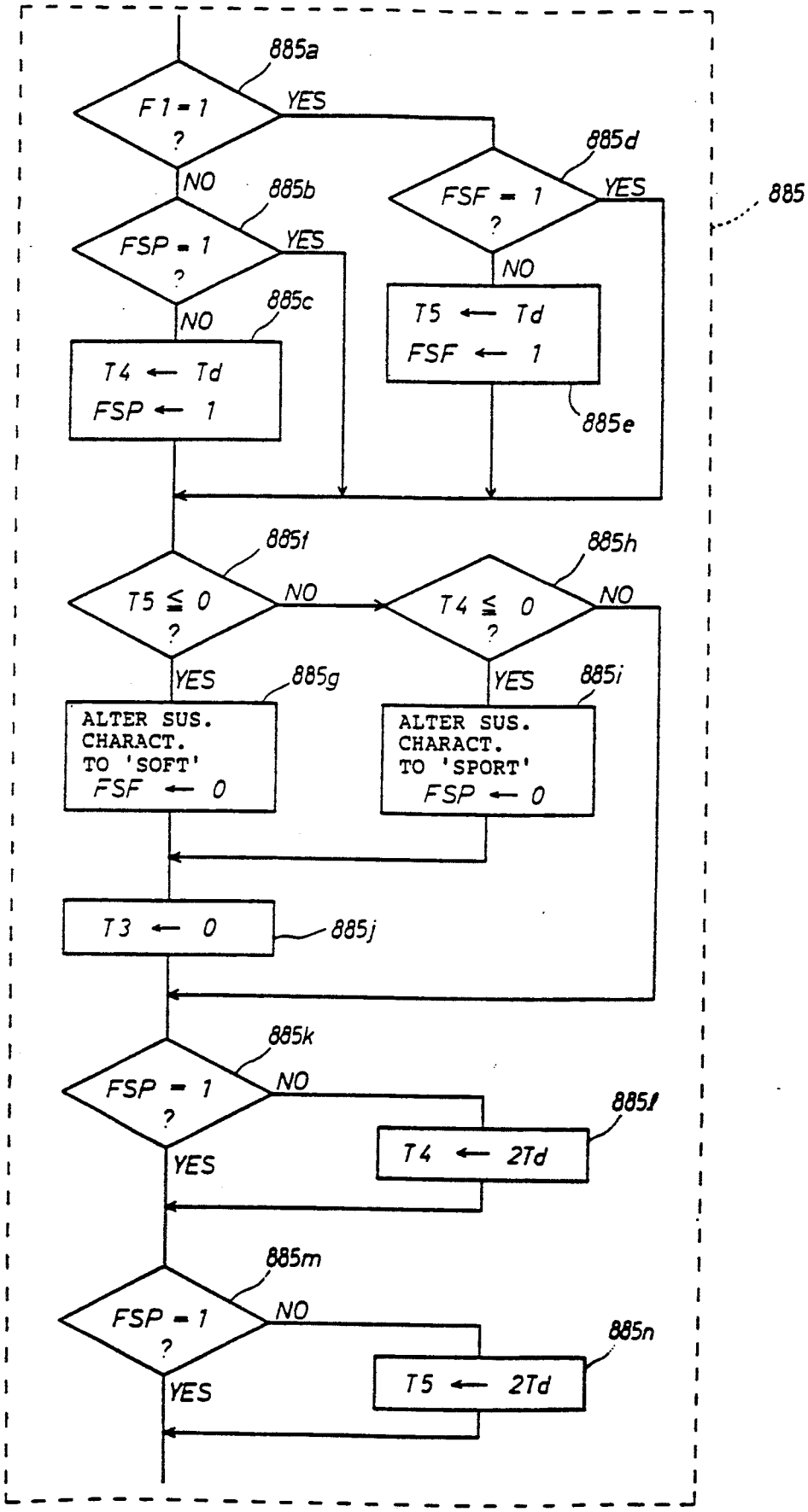
Figure 29A:
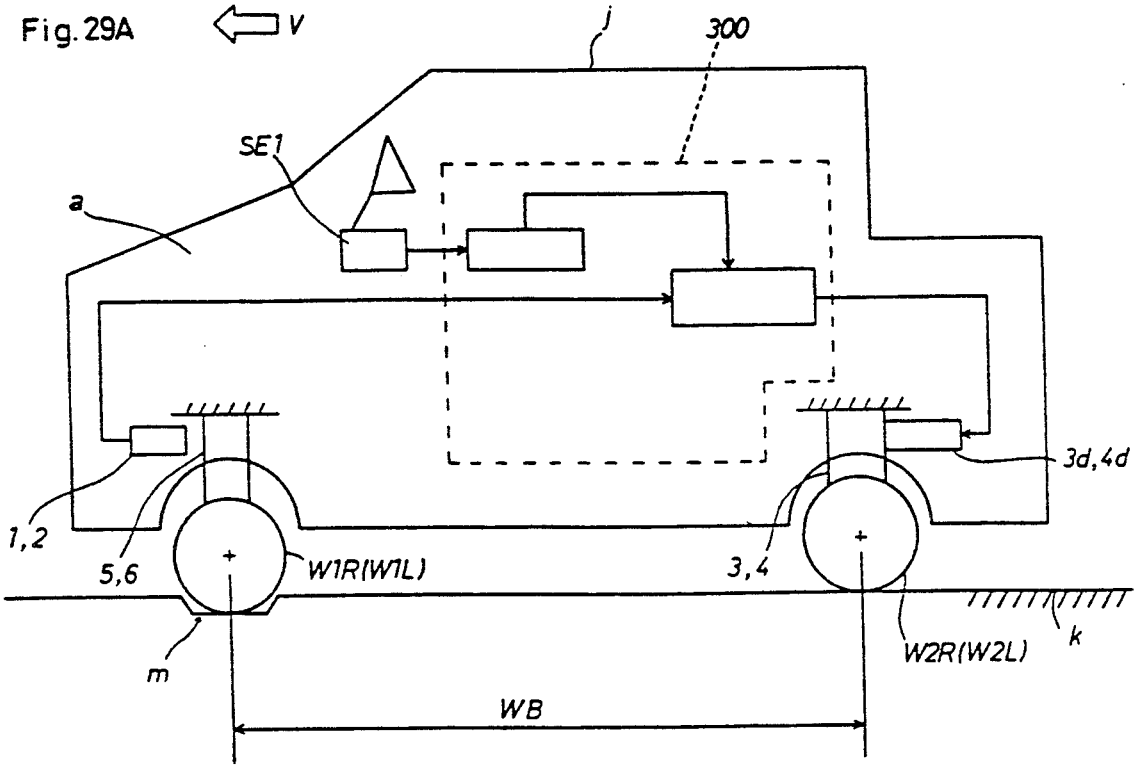
FIG. 29A shows a schematic figure of a vehicle passing a dip of a road surface in the fifth embodiment.
Figure 29B:
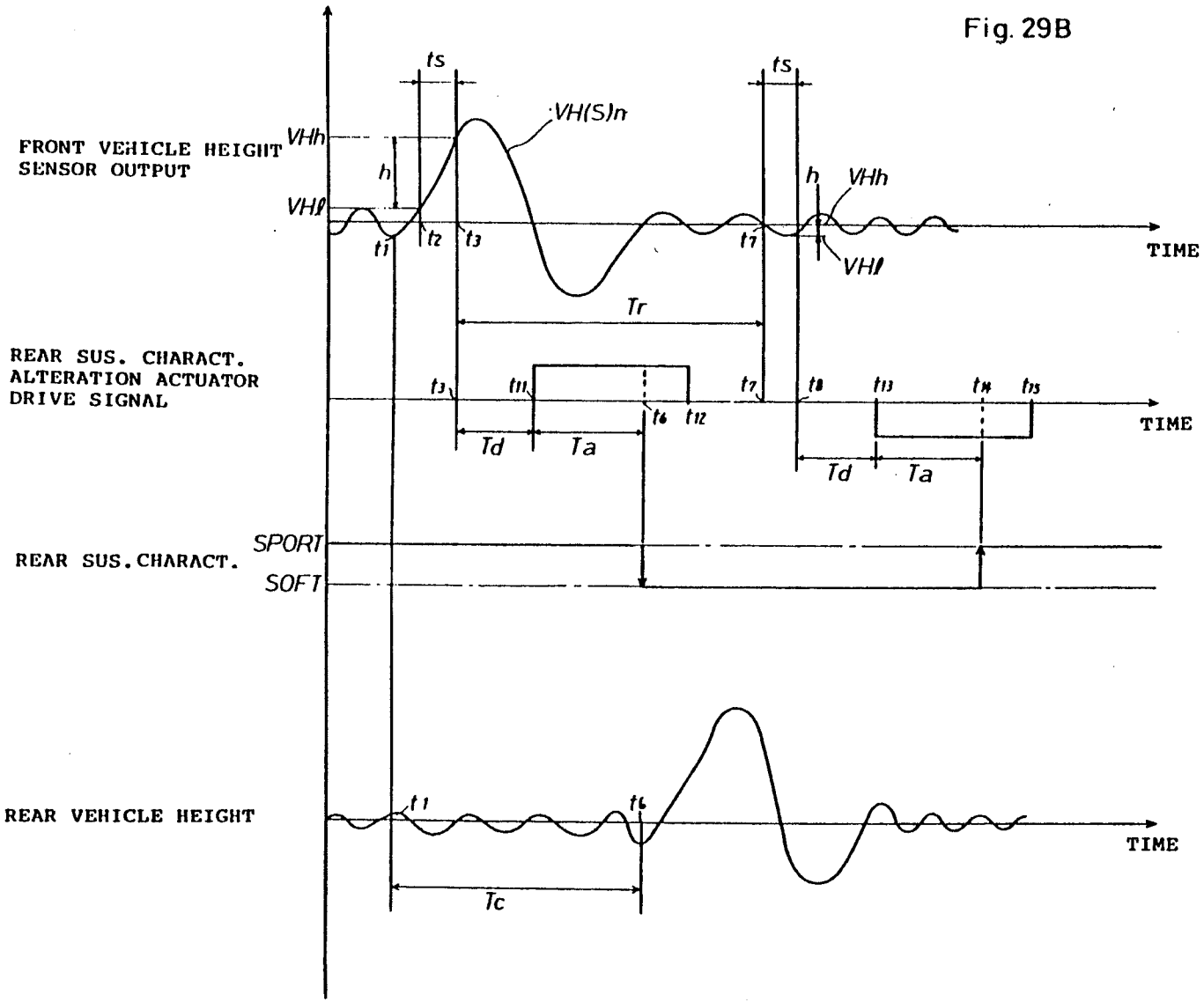
FIG. 29B shows timing charts corresponding to FIG. 29A.
Figure 30:
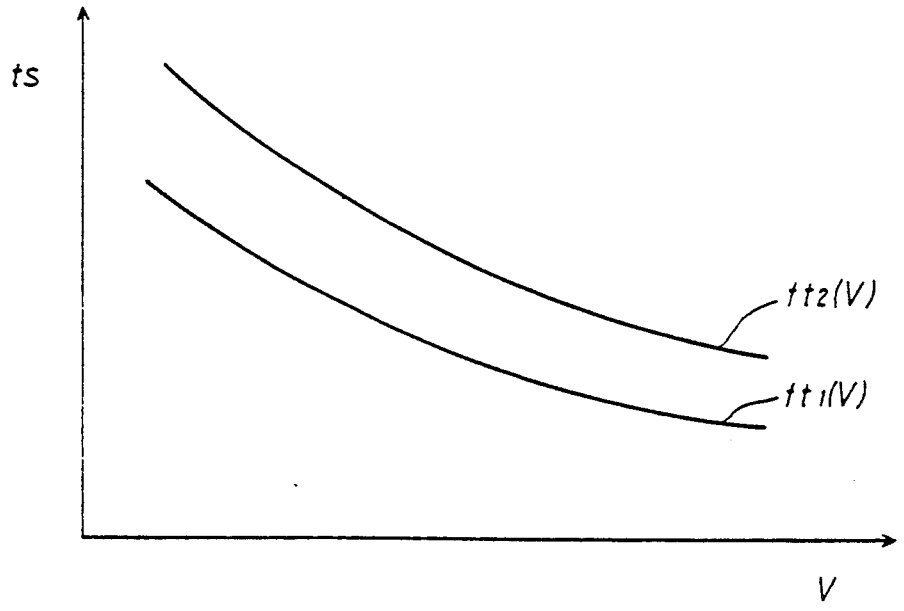
FIG. 30 shows a relationship between the vehicle height change judgment time ts and the vehicle speed V.

The fifth embodiment of the present invention is then explained with flow charts of FIGS. 28A, 28B, 28C, 28D and 28E, schematic illustration of FIG. 29A and timing charts of FIG. 29B. The construction of the apparatus of this embodiment is the same as that of the first embodiment, as FIGS. 3-8. The flow charts of this embodiment is so made to correspond to that of fourth embodiments, as FIGS. 24A-24D, with the step member 50 larger than the corresponding counter part, and the denotation of the time points by this embodiment are made to be the same as those of the fourth embodiment when those denote similar time points.

The main difference between the fourth and the fifth embodiments lies in the timing to alter the rear suspension characteristic. While in the fourth embodiment the alteration control is performed as soon as the front vehicle height change exceeds the corresponding reference value, it is performed just before the rear wheels pass the bump or dip in this embodiment. For that purpose, a delay time Td, which is a time interval between the detection of the bump or dip by the front vehicle height sensors and the beginning of the rear suspension characteristic alteration control, is introduced in the fifth embodiment.

Figure 24A:
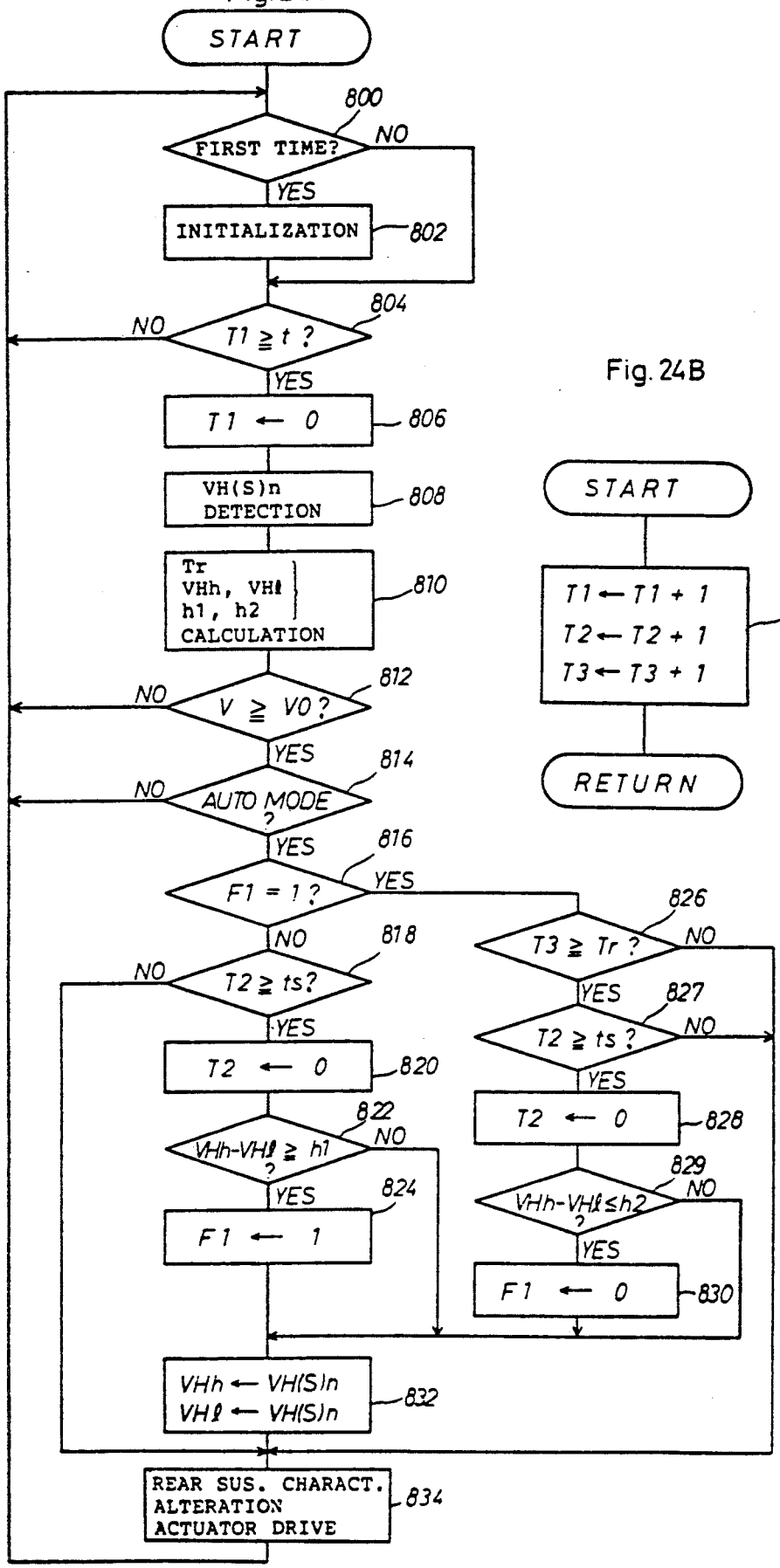
FIGS. 24A, 24B, 24C and 24D [shows] *show* flowcharts of process steps executed by the ECU in the fourth embodiment.
Figure 24B:
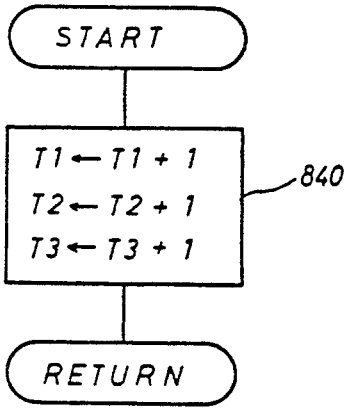
Figure 24C:
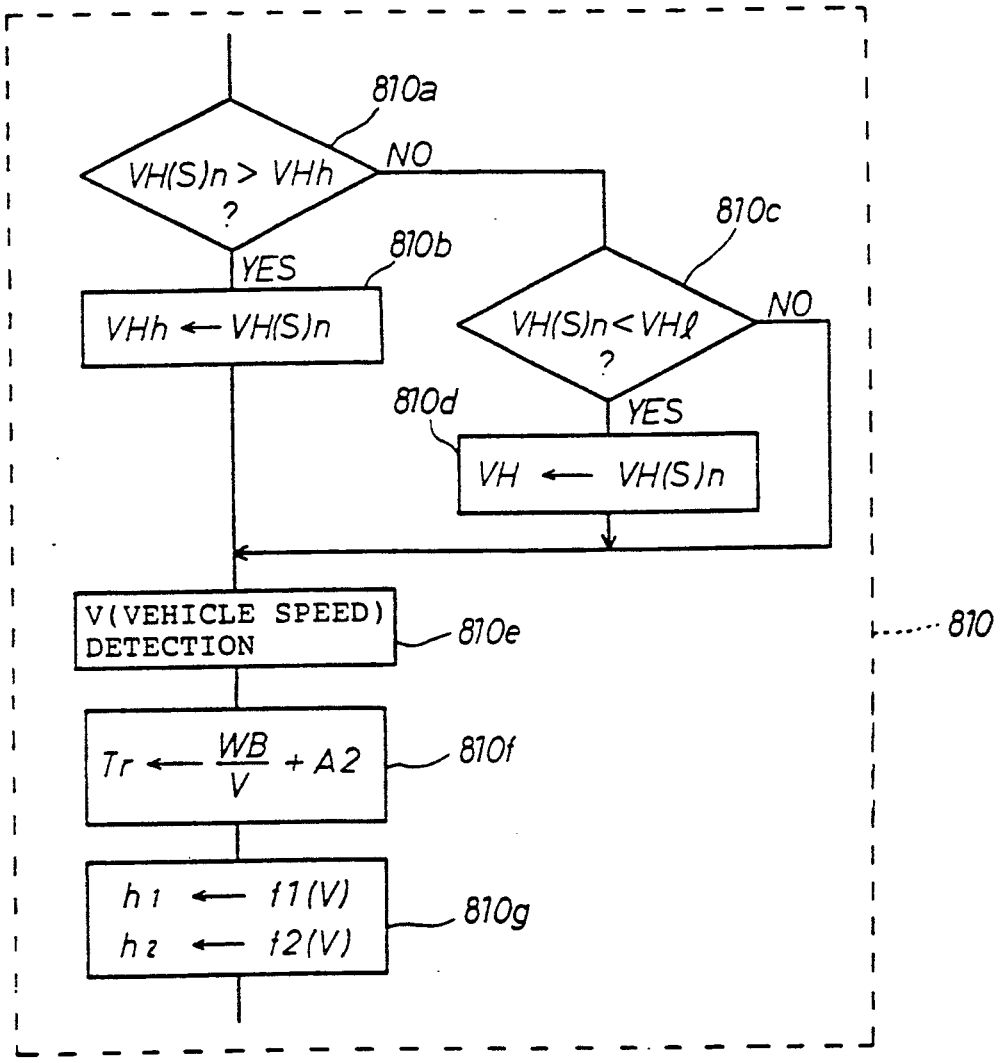
Figure 24D:
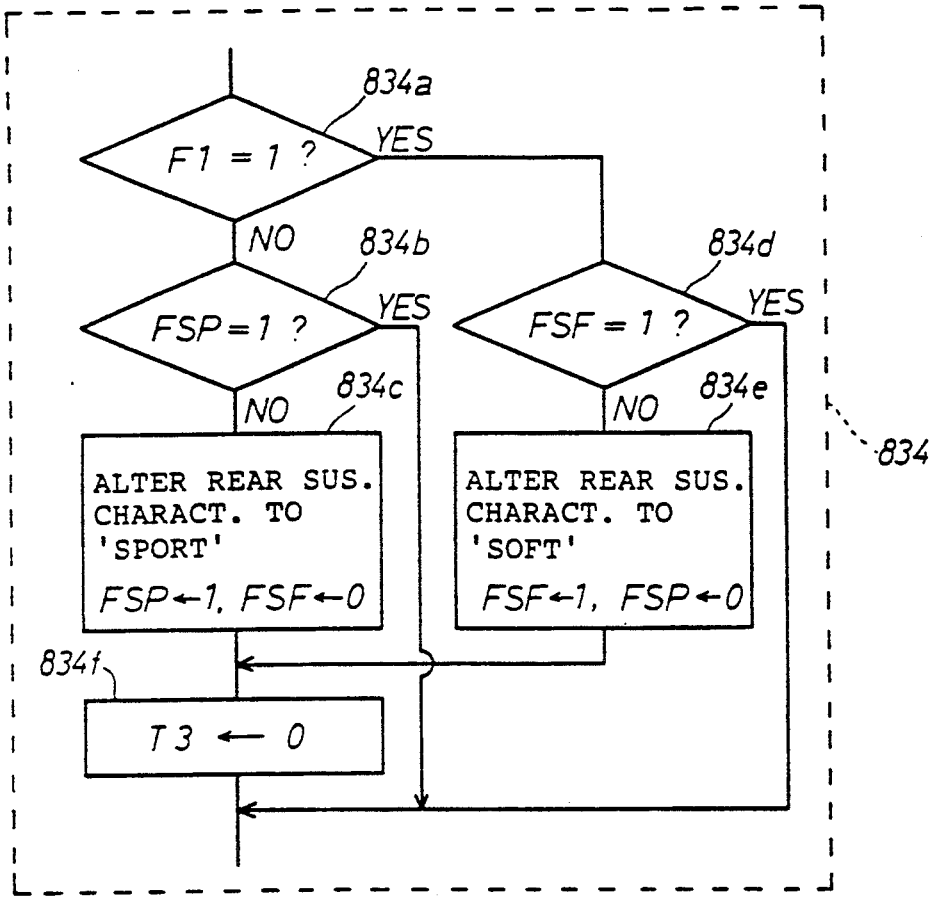

The steps 850-858 in the flow chart of FIG. 28A are the same as the counterparts steps 800-808 in FIG. 24A of the fourth embodiment. At step 861, a delay time Tr, the maximum front vehicle height VHh and the minimum front vehicle height VHl during the time interval ts, the reference value h1 for beginning the control and the other reference value h2 for terminating the control are calculated as the fourth embodiment. Besides those, the delay time Td is calculated in this step. [For that purpose, a delay time Td, which is a time interval between the detection of the bump or dip by the front vehicle height sensors and the beginning of the rear suspension characteristic alteration control, is introduced in the second embodiment.

The steps 300-308 in the flow chart of FIG. 14A is the same as the counterparts in FIG. 10A of the first embodiment. At step 311, a delay time Tk, the maximum front vehicle height VHh of the first judgment condition, the minimum front vehicle height VHl of the first judgment condition, the maximum front vehicle height of the second judgment condition VHH and the minimum front vehicle height of the second judgment condition VHL are calculated as the first embodiment as well as the delay time Td.] Details of the step 861 are shown in FIG. 28C, where steps 861a-861g, are the same as steps 810a-810g of FIG. 24C. At step 861h, the delay time Td is calculated as $$Td = WB/V - A1 - Ta,$$

where WB is a wheelbase, V is a vehicle speed, A1 is a compensatory term and Ta is a duration time of driving signal to the actuators to alter the rear suspension characteristic.

Steps 862-882 of FIG. 28A are the same as steps 812-832 of FIG. 24A. Details of step 885, where the rear suspension characteristic is altered after a delay time Td, are hereinafter described with FIG. 28D.

It is judged whether the flag F1 is set (885a) and, since this time F1=1, it is judged whether a flag FSF is set (885d). The flag FSF indicates that the rear suspension characteristic is in the 'SOFT' state.

Since this time FSF=0, then at step 885e the delay time Td is put into a timer T5 and the flag FSF is set, where T5 is a timer which is counted down by an intermittent interrupt routine step 890 of FIG. 28B. Since T5 is non-negative and T4 is also non-negative, the process steps proceed through 885f, 885h and 885k, since FSP=0 at step 885k, 2×Td is put into the timer T4. then since FSF=1 (885m), the process steps of step 885 are finished and process steps being from 850 of FIG. 28A again. Though in these process steps the timers t4 and T5 are counted down (890), the timer t4 is renewed by a value 2×Td every time, preventing it from being negative. The timer T5, on the other hand, is not renewed by these routines, so it becomes negative after the time interval Td. Then as step 885 of FIG. 28A, steps 885a, 885d and 885f of FIG. [28d] *28D* are processed. Since the timer T5 is negative, step 885g is processed. The rear suspension characteristic is altered to the 'SOFT' state and the flag FSF is reset. Those are the process steps to actually alter the rear suspension characteristic a delay time Td after the judgment for performing that. Then a timer T3 for returning the rear suspension characteristic is reset (885j), the process steps begin from 850 of FIG. 28A again. The following process steps which go through steps 854, 566, 880, 882 and 885 are the same as the case of the fourth embodiment.

When the process steps come to step 885 with F1=0, the process steps proceed through 885a, 885b and 885c, of FIG. 28D, and at step 885c the delay time Td is put into the timer T4 and the flag FSP is set.

As described before, the process steps proceed through 885f, 885h, 885k, 885m and 885n. At step 885n, the value 2×Td is put into the timer T5 and the process steps return to 850 of FIG. 28A. The timers T4 and T5 are counted down at step 890 of FIG. 28B by every cycle of routine. This time T5 is renewed but T4 decreases every time and become negative after the time interval Td. The process steps at step 885 this time is as follows. The process steps proceed through 885a, 885b, 885f and 885h of FIG. 28D, and at step [885h] *885i* the rear suspension characteristic is altered to the 'SPORT' state and the flag FSP is reset. As described before, the process steps proceed through 885j, 885k, 885l, 885m and 885n and then return to step 850 of FIG. 28A.

An example of control timings performed by the fifth embodiment is then explained with FIGS. 29A and 29B. FIG. 29A shows an automobile j whose front wheel W1R or W1L is passing a dip m of a road surface k with a speed V, just as FIG. 27A. FIG. 29B shows similar time charts as those of FIG. 27B.

The front wheel W1R or W1L begins to move down into the dip m at a time point t1. Since then the output VH(S)n of the front vehicle height sensor 1 or 2 becomes large. At a time point t3, which is a time interval ts later than the time point t2, the ECU 300 judges that the largest front vehicle height change exceeds a corresponding reference value h1. Then at a time point t11, which is the time interval Td later than the time point t3, the ECU 300 drives the rear suspension alteration actuators 3d and 4d to alter the rear suspension characteristic to a 'SOFT' state. The alteration operation is finished at a time point t6, a time interval Ta later than t11. The time point T6 coincides with the time point at which the rear wheels of the vehicle come to the dip m.

The driving signal from the ECU 300 is sent to the actuators 3d and 4d until a time point t12. At at time point t8 which is a time interval ts after a time point t7 the ECU 300 judges that the largest front vehicle height change is less than a corresponding reference value h2. The time point t7 is determined to be a time interval Tr later than the time point t3, as in the fourth embodiment. At a time point t13 which is the time interval Td later than the time point t8, the ECU 300 drives the rear suspension alteration actuators 3d and 4d to alter the rear suspension characteristic from the 'SOFT' state to the 'SPORT' state. The alteration operation is finished at a time point t14 which is the time interval Ta later than the time point t13. The driving signal from the ECU 300 is sent to the actuators 3d and 4d until a time point t15.

The fifth embodiment of the present invention is so arranged as described above that is has a following advantage besides that derived from the fourth embodiment. The alteration of the rear suspension characteristic is restricted only to necessary instances to keep both the controllability and stability and ride comfort good as much as possible by introducing the delay time for performing the rear suspension characteristic alteration control after the front wheel passes a bump or a dip.

In the fourth and the fifth embodiments, the time interval for sampling vehicle data, i.e. the largest front vehicle height change, is fixed but the reference values are increased according to the increase in the vehicle speed. The same effect is derived from by shortening the sampling time interval, while the reference values are fixed.

Figure 31A:
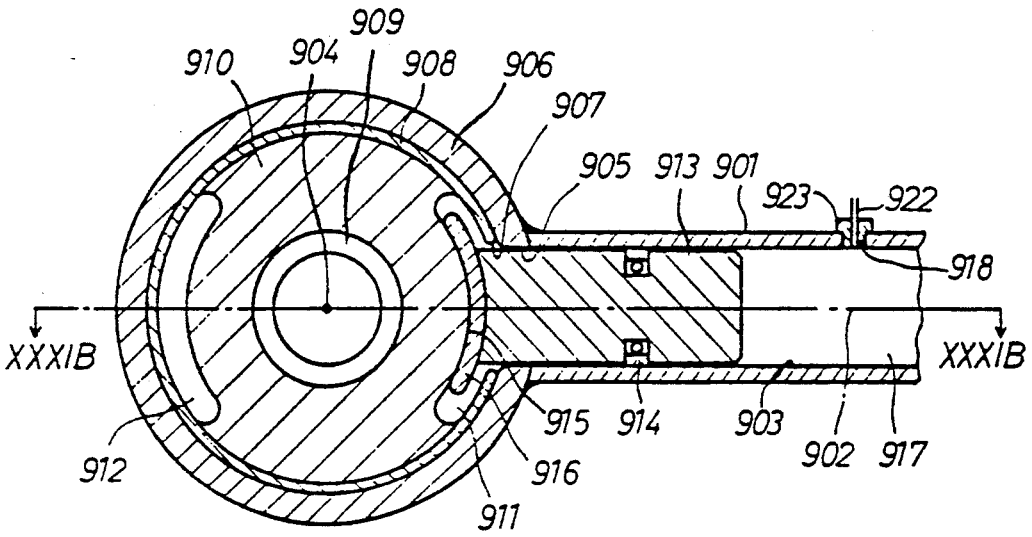
FIGS. 31A and 31B [shows] *show* sectional views of a variable-stiffness bush used in a suspension characteristic alteration means.
Figure 31B:
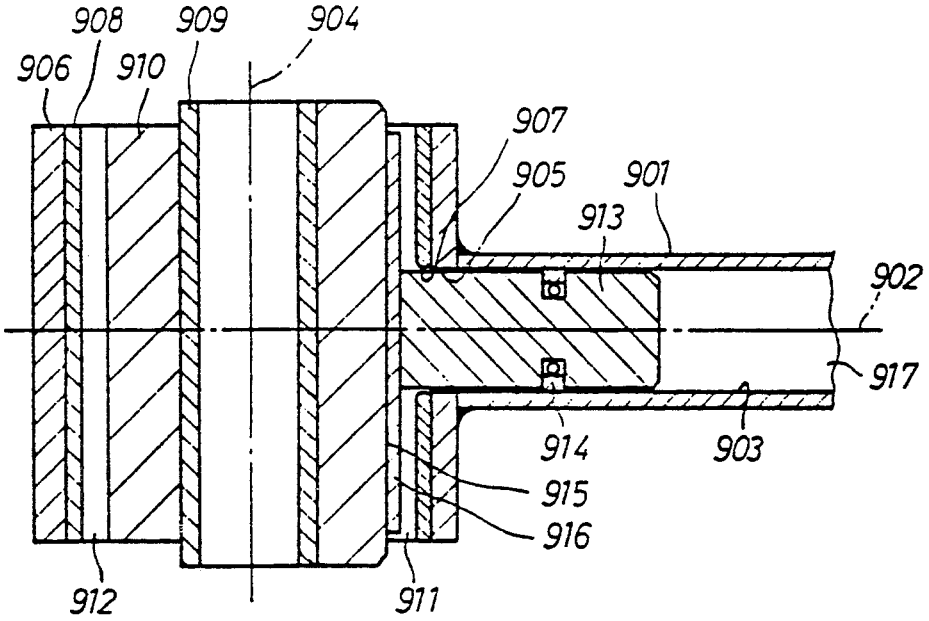
Figure 32A:
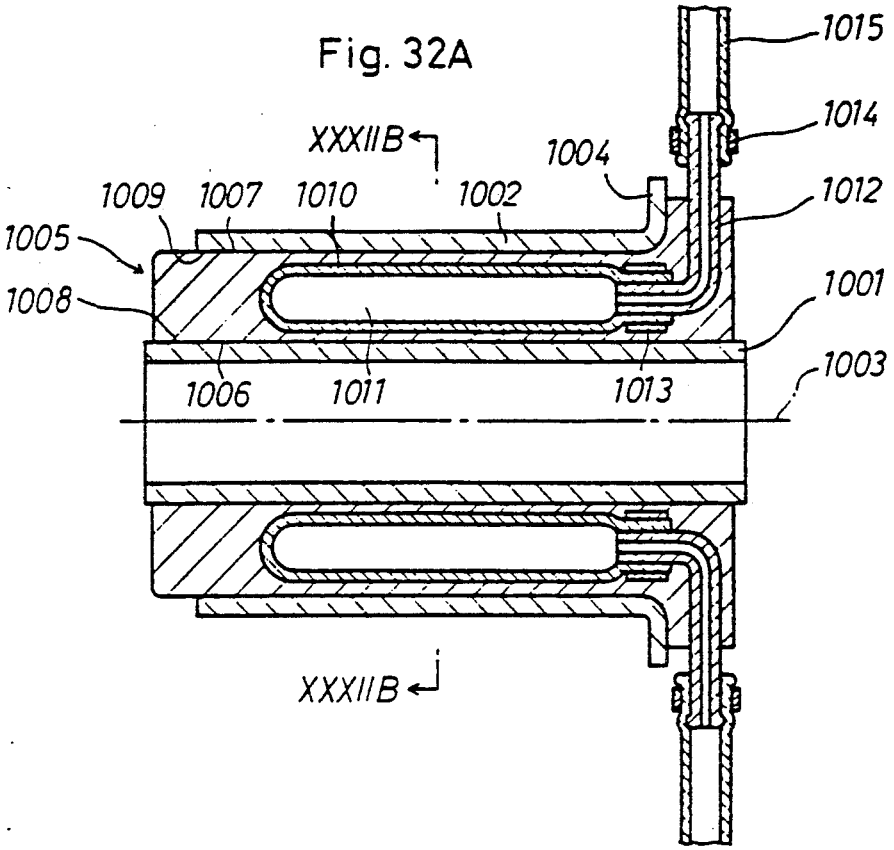
FIGS. 32A and 32B show sectional views of another variable-stiffness bush.
Figure 32B:
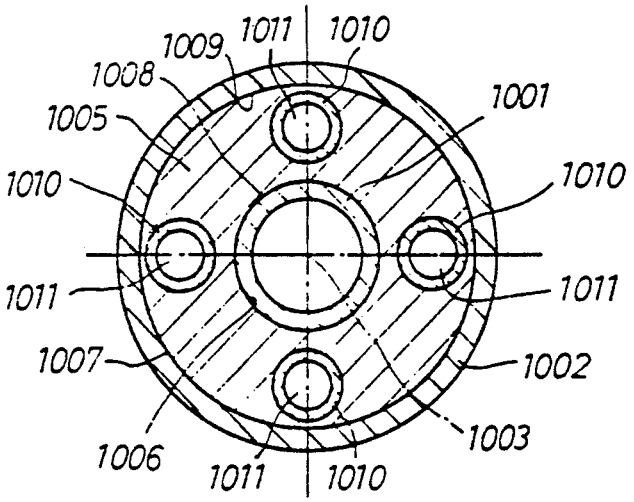
Figure 33A:
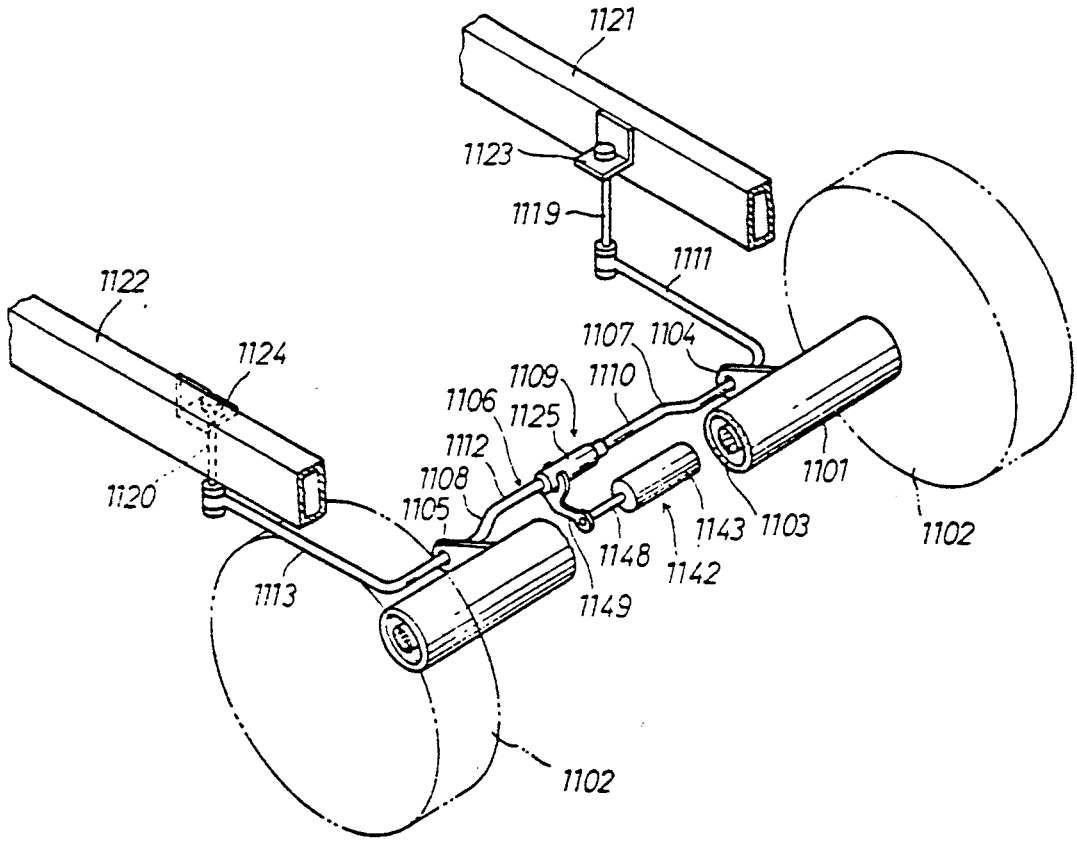
FIGS. 33A, 33B, 33C, 33D, 33E, 33F and 33G show constructions of a variable-stiffness stabilizer.
Figure 33B:
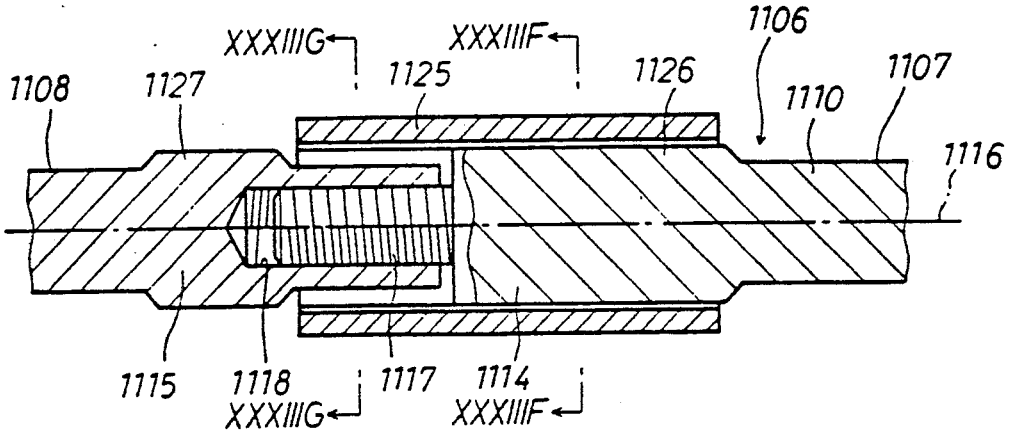
Figure 33C:
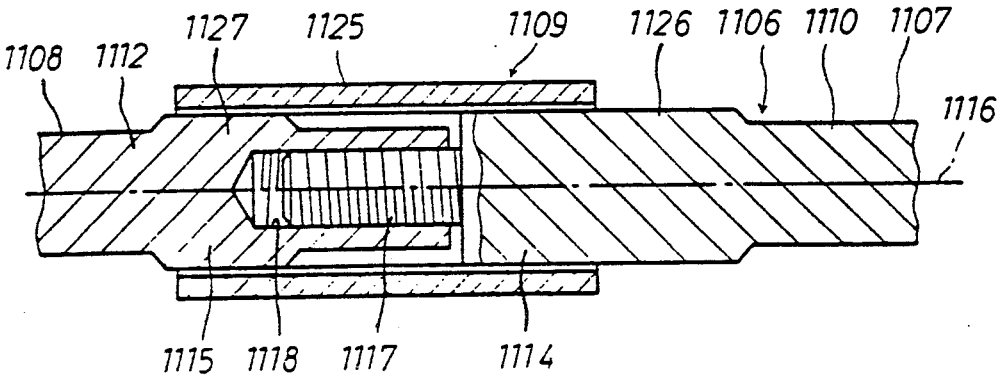
Figure 33D:
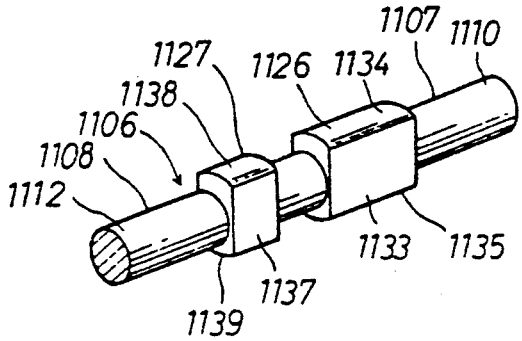
Figure 33E:
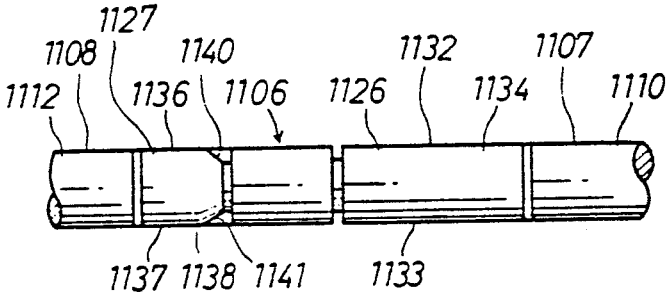
Figure 33F:
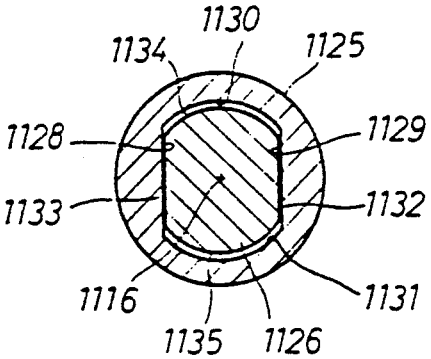
Figure 33G:
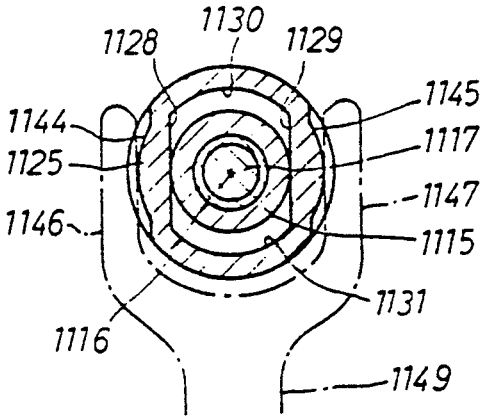

Examples of other rear suspension characteristic alteration means not for any air suspension or shock absorber are described below. The first example is a bush for a joint of a suspension bar such as the upper and lower control arms of a suspension, as shown in FIGS. 31A and 31B. The bush is provided with a mechanism for changing the stiffness of the bush to alter the characteristic of a suspension. The changing of the stiffness means that of the spring constant or damping force of the bush.

FIG. 31A shows a longitudinal sectional view of the joint of the suspension bar. FIG. 31B shows a sectional view along a line XXXIB—XXXIB shown in FIG. 31A. A control arm 901 extends along an axis 904 perpendicular to the axis 902 is welded around the hole 905 at one end of the control arm 901. An outer cylinder 908 having a hole 907 is press-fitted in the sleeve 906. An inner cylinder 909 is provided in the outer cylinder 908 concentrically thereto. The bush 910 made of vibration-proof rubber is interposed between the outer cylinder 908 and the inner cylinder 909. The bush 910 and the outer cylinder 908 define openings 911 and 912 which are located in the face of each other along the axis 902 and extend as arcs around the axis 904, so that the stiffness in the direction of the axis 902 is set at a relatively low value.

The hole 903 of the control arm 901 constitutes a cylinder which supports piston 913 movably back and forth along the axis 902. A sealing member 914 is tightly packed in between the piston 913 and the inside surface of the hole 903. A contact plate 916 is secured at one end of the piston 913. The contact plate [1916] *916* curves about the axis 904 and extends along the axis so that the plate is brought into contact with the inside surface 915 of the opening 911.

The same construction as shown in FIGS. 31A and 31B is provided at the other end of the control arm 901. A cylinder chamber 917 is defined between the piston 913 and another piston not shown in the drawings and fitted with the other end of the control arm 901. The cylinder chamber 917 connects with the exterior through a tapped hole 918 provided in the control arm 901. A nipple 923 secured on one end 922 of a conduit connected to an oil pressure source not shown in the drawings is secured in the tapped hole 918 to apply oil pressure to the cylinder chamber 917. When the oil pressure in the cylinder chamber 917 is relatively low, the force pushing the piston 913 leftward as to the drawings is so weak that the piston is held in such a position shown in the drawings that the contact plate 916 is brought into light contact with the inner surface 915 of the bush 910. As a result, the stiffness of the bush 910 in the direction of the axis [903] *902* is relatively low.

When the oil pressure in the cylinder chamber 917 is relatively high, the piston 913 is driven leftward as to the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is heightened.

If the suspension bar is provided between the body and rear wheel of a vehicle, the characteristic of the suspension for the rear wheel can be altered by regulating the oil pressure in the cylinder chamber 917 through the action of an actuator such as a pressure control valve. When the oil pressure is heightened by an instruction from an ECU 300, the stiffness of the bush 910 is enhanced to increase the damping force and spring constant of the suspension to improve the controllabil-

United States Patent Office

PTO - BOYERS, PA Duty Station

MISSING PAGE TEMPORARY NOTICE

PATENT # RE. 33626 FOR ISSUE DATE 7-2-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

Col.s 37, 38

D/A at Boyers
7/30/92

Data Conversion Operation

Figure 34A:
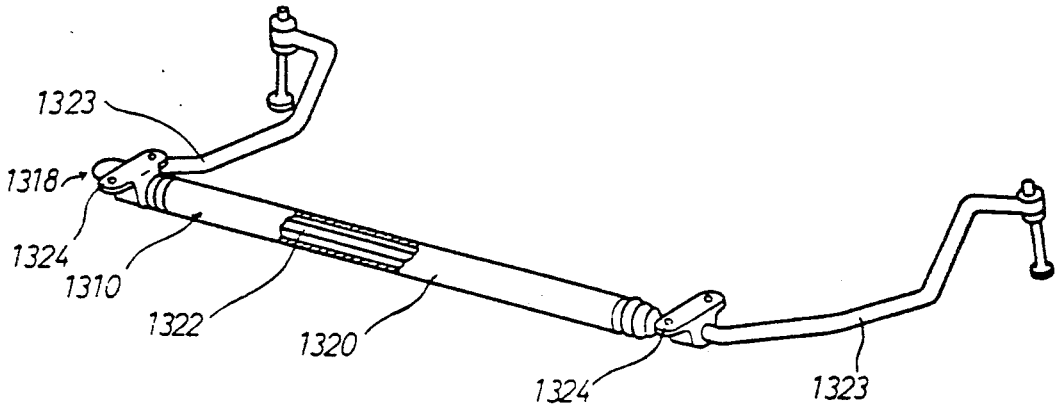
FIGS. 34A and 34B show constructions of another variable-stiffness stabilizer.
Figure 34B:
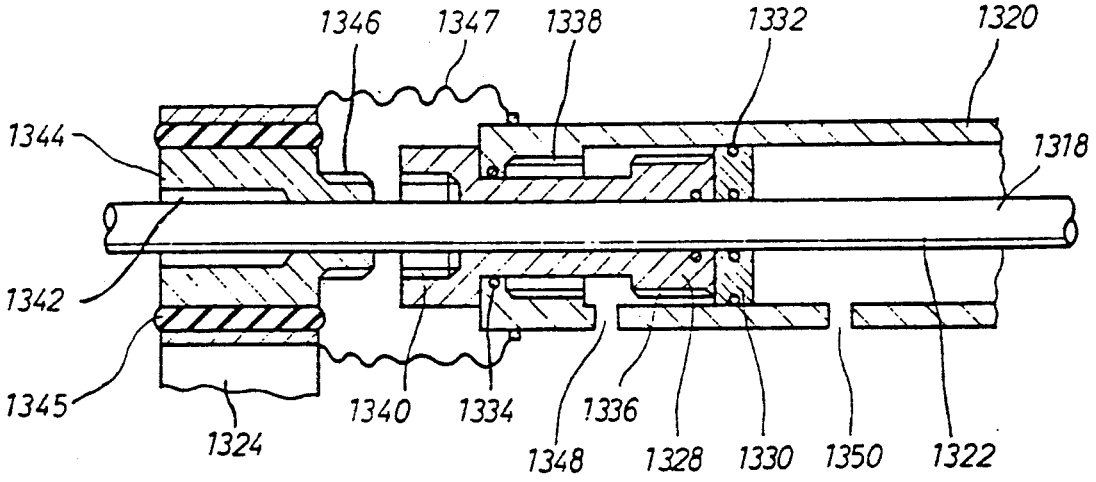

Boyers, Pa second stabilizer bar, as shown in FIG. 34B. The second stabilizer bar [1232] *1320* is disposed inside the pair of fitting metals 1324 so that the first stabilizer bar 1318 can be connected to and disconnected from the second stabilizer. A piston 1330 on which a spool 1328 is secured is slidably disposed inside one end of the second stabilizer bar 1320 in such a manner that the piston is liquid-tightly sealed by a sealing member 1332. The spool 1328 is liquid-tightly sealed by a sealing member 1334, and projects out of the second stabilizer bar 1320. The spool 1328 has splines 1336 near the pistons 1330, while the second stabilizer bar 1320 has, at one end, splines 1338 which can be engaged with the splines 1336. The spool 1328 has other splines 1340 inside the outwardly projecting end of the spool. A coupler 1344 is connected to the main portion 1322 of the first stabilizer bar 1318 by splines 1342. Splines 1346, which can be engaged with the splines 1340, are provided on the coupler 1344 at the end opposed to the spool 1328. The coupler 1344 is connected to a mounting metal 1324 through a rubber bush 1345, as shown in FIG. 34B, so that the main portion 1322 of the first stabilizer bar 1318 is twisted by deforming the *rubber bush 1345. The* coupler 1344 is fitted in such a position that the splines 1340 are engaged with the splines 1346 when the spool 1328 is moved leftward as to the drawings and the splines 1336 are engaged with the splines 1338. A bellowslike boot 1347 for protecting the splines 1340 and 1346 from dust is provided between the coupler 1344 and the second stabilizer bar 1320. Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 through an actuator such as a pressure control valve, the piston 1330 is moved leftward as to the drawings, together with the spool 1328, the splines 1336 are engaged with the splines 1338, and the splines 1340 are engaged with the splines 1346. As a result, the first and the second stabilizer bars 1318 and 1320 are coupled to each other so that the stiffness of the stabilizer bar assembly is heightened. When the pressure fluid is led to the other port 1348, the piston 1330 is moved rightward and the splines are disengaged from each other. As a result, the stiffness of the stabilizer bar assembly is constituted by only that of the first stabilizer bar 1318.

Figure 35A:
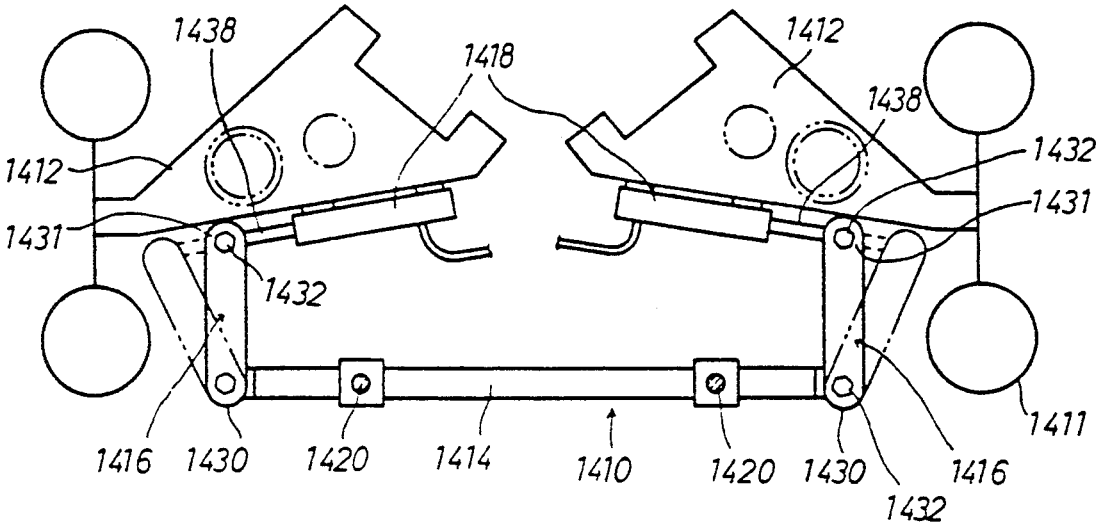
FIGS. 35A, 35B and 35C show constructions of still another variable-stiffness stabilizer.
Figure 35B:
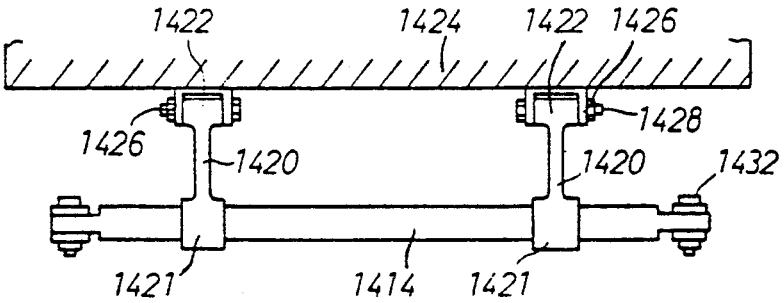
Figure 35C:
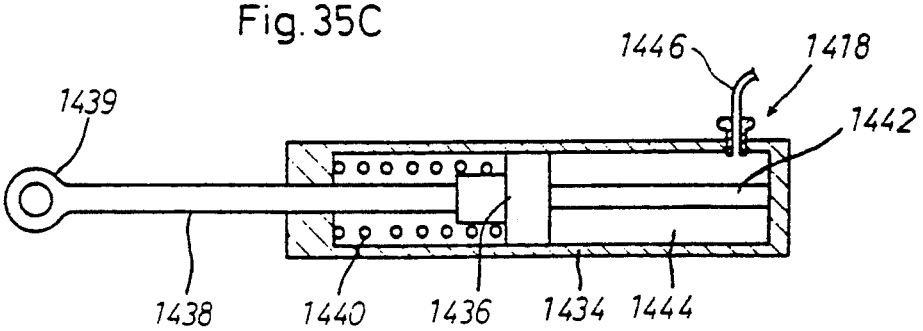

FIGS. 35A, 35B and 35C show still another stabilizer as the fifth example. FIG. 35A shows a plan view of the outline of the stabilizer 1410. Wheels 1411 and suspension arms 1412 are also shown in FIG. 35A. A main part 1414, a pair of arms 1412 are also shown in FIG. 35A. A main part 1414, a pair of arms 1416 and elongation means 1418 are provided. The main part 1414 like a round bar is laid through the bearing portions 1421 of a pair of links 1420 disposed at a distance from each other in the direction of the width of the body 1424 of a vehicle, and is supported by the bearing portions 1421 so that the main part 1414 can be twisted around its axis. The other bearing portions 1422 of the links 1420 at the upper ends are rotatably supported by pins 1428 extending through brackets 1426 welded on the vehicle body 1424. As a result, the main part 1414 is disposed along the width of the vehicle body, and can be twisted relative to the vehicle body. The pair of arms 1416 are made of flat bars. The first ends 1430 of the arms 1416 are coupled to the ends of the main part 1414 by bolts and nuts 1432 so that the arms can be turned about vertical axes. The second ends 1431 of the arms 1416 are located at a distance from the first ends 1430 in the front-to-rear direction of the vehicle body 1424. The front-to-rear direction includes an oblique longitudinal direction. the second ends 1431 of the arms 1416 are displaced in the direction of the width of the vehicle body 1424 by the elongation means 1418 made of power cylinders. Each of the power cylinders includes a cylinder 1434, a piston 1436 liquid-tightly and slidably fitted in the cylinder 1434, a piston rod 1438 coupled at one end to the piston [1416] *1436* and projecting at the other end out of the cylinder 1434, and a included spring 1440 for displacing the piston 1436 in such a direction as to retract the piston rod 1438. A stopper 1442 secured on the piston 1436 prevents the piston from being displaced more than a predetermined quantity. The cylinder 1434 is secured on the suspension arm 1412 in such a manner that the piston rod 1438 is located more outside than the cylinder 1434 in the direction of the width of the vehicle body. The second end 1431 of the arm 1416 is coupled to the outwardly projecting end of the piston rod 1438 by a bolt and nut 1432 so that the arm 1416 can be turned about the vertical axis. One end of a flexible hose 1446 is connected to the liquid chamber 1444 of the cylinder 1434 opposite the side on which the included spring 1440 is located. The other end of the flexible hose 1446 is connected to a pressure generator (not shown in the drawings) through an actuator such as pressure control valve. Unless pressure is applied to the liquid chambers 1444 of the power cylinders according to the state of the actuator corresponding to an instruction from an ECU 300, the second end 1431 of the arms 1416 are located in inner positions as shown in FIG. 35A, so that the wheel rate of the stabilizer is low. When the actuator is operated to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as shown by imaginary lines, i.e. double dotted lines, in FIG. 35A, to increase the arm ratio of the stabilizer to heighten its stiffness against the rolling of the vehicle.

Figure 36A:
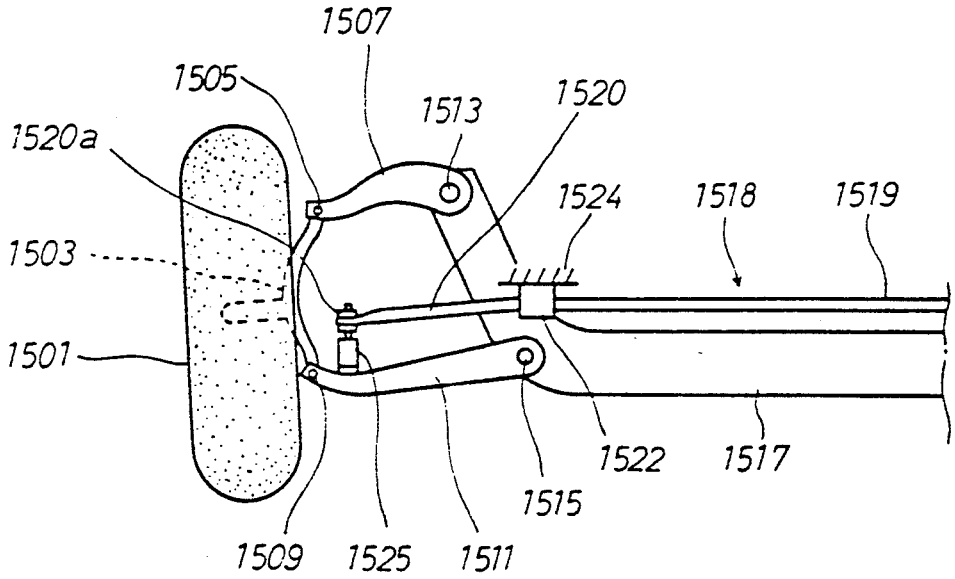
FIGS. 36A and 36B show constructions of a unit for coupling a variable-stiffness stabilizer and a lower control arm to each other.
Figure 36B:
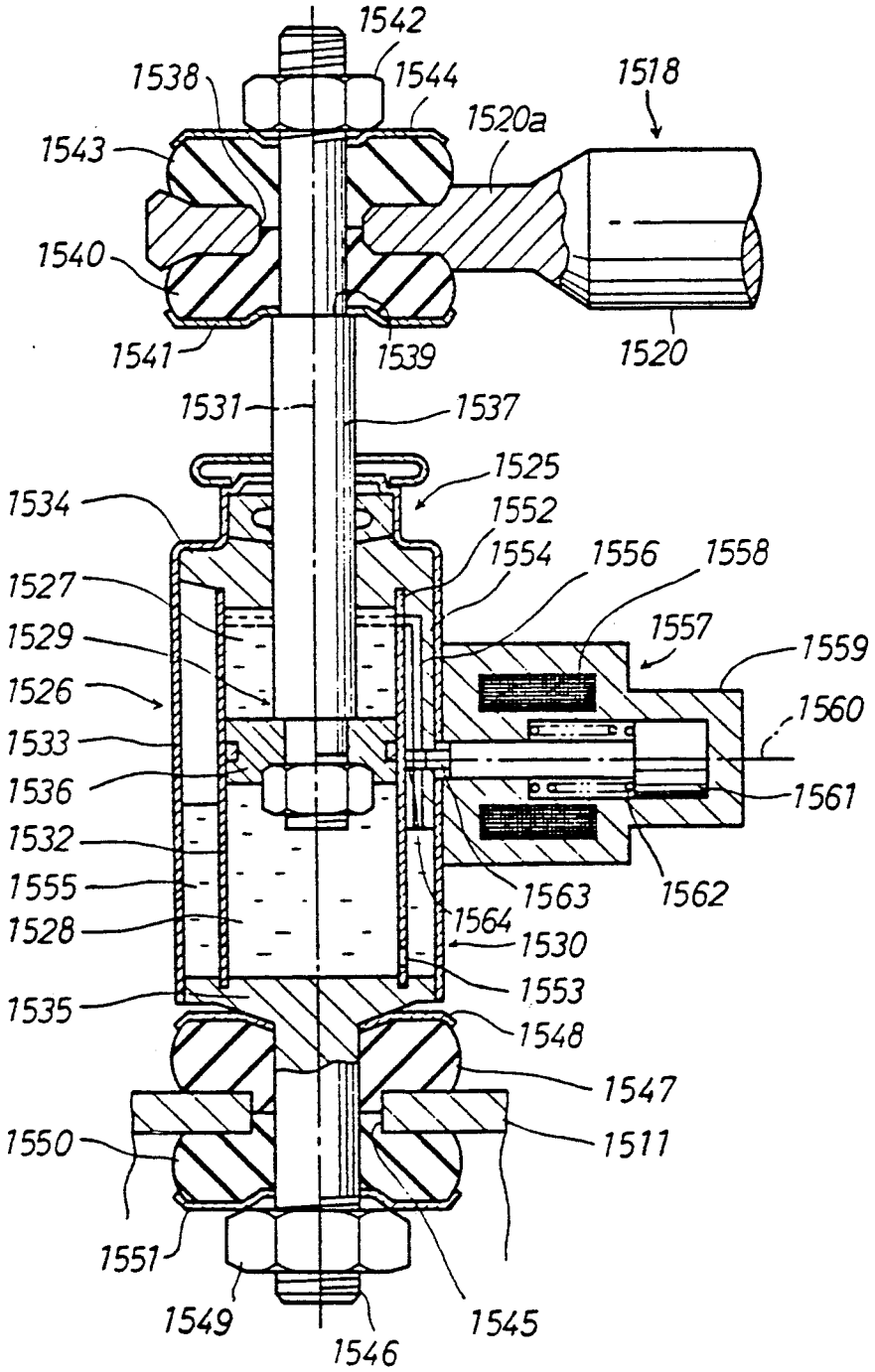

FIGS. 36A and 36B show a construction of a coupling unit for a stabilizer and a lower control arm, as the sixth example. FIG. 36A shows a partial front view of a wishbone-type suspension including the coupling unit for the stabilizer for a vehicle. FIG. 36B shows an enlarged sectional view of the coupling unit shown in FIG. 36A. A wheel 1501 is rotatably supported by a knukcle 1503. The knuckle 1503 is pivotally coupled at the upper end to one end of an upper control arm 1507 by a pivot 1505, and pivotally coupled at the other end to one end of the lower control arm 1511 by a pivot 1509. The upper control arm 1507 and the lower control arm 1511 are pivotally coupled to the cross member 1517 of the vehicle by pivots 1513 and 1515. The stabilizer 1518, which is shaped as U, is disposed along the width of the vehicle. The stabilizer 1518 is coupled at its central rod 1519 to the body 1524 of the vehicle by brackets 1522 with rubber bushes not shown in the drawings, so that the stabilizer can be turned about its axis. The tip 1520a of the arm 1520 of the stabilizer 1518 is coupled to a point near one end of the lower control arm 1511 by the coupling unit 1525. The coupling unit 1525 includes a piston-cylinder assembly 1526 composed of a piston 1529 and a cylinder 1530 which define two cylinder chambers 1527 and 1528. The cylinder 1530 includes an inner cylinder 1532 which supports the piston 1529 movably back and forth along an axis 1531, and outer cylinder 1533 disposed substantially concentrically to the inner cylinder 1532, and end caps 1534 and 1535 which close both the ends of the inner cylinder and the outer cylinder. The piston 1529 includes a main portion 1536, and a piston 1537 which bears the main portion 1536 at one end of the piston rod and extends along the axis [1131] *1531* through the end cap [2534] *1534* and the hole [2538] *1538* of the tip of the arm 1520 of the stabilizer 1518. A rubber bush 1540 and a retainer 1541 for holding the bush are interposed between the shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped. The inner cylinder 1532 is provided with through holes 1552 and 1553 near the end caps 1534 and 1535. The end cap 1534 is integrally provided with a projection 1554 extending along the axis 1531 between the inner cylinder 1532 and the outer cylinder 1533 and located in tight contact with the inner and the outer cylinders. The projection 1554 has an internal passage 1556 which is coincident at one end with the through hole 1552 and is opened at the other end into an annular space 1555 between the inner cylinder 1532 and the outer cylinder 1533. As a result, the through hole 1552, the internal passage 1556, the annular space 1555 and the other through hole 1553 constitute a passage means for connecting both the cylinder chambers 1527 and 1528 to each other. A portion of the annular space 1555 is filled with air. Portions of the cylinder chambers 1527 and 1528, the internal passage 1556 and the annular 1555 are filled with oil. The change in the volume of the piston rod 1537 in the cylinder 1530, which is caused by the displacement of the piston 1529 relative to the cylinder, is compensated by the compression or expansion of the air filled in the portion of the annular space 1555. The communication of the internal passage 1556 is selectively controlled by normally-opened solenoid valve 1557. The solenoid valve 1557 includes a housing 1559 containing a solenoid 1558 and secured at one end on the outer cylinder 1533, a core 1561 supported in the housing 1559 movably back and forth along an axis 1560, and a compressed helical spring 1562 for urging the core 1561 rightward as to FIG. 36B. A valve element 1563 is integrally provided at one end of the core 1561 so that the valve element is selectively fitted into a hole 1564 extending in the projection 1554 across the internal passage 1556. When no electricity is applied to the solenoid 1558 according to an instruction from an ECU 300, the core 1561 is urged rightward as to the drawing, by the compressed helical spring 1562, to open the valve 1557 to allow the communication of the internal passage 1556. When electricity is applied to the solenoid 1558 according to an instruction from the ECU 300, the core 1561 is driven leftward as to the drawings, against the force of the compressed helical spring 1562, to fit the valve element 1563 into the hole 1564 to shut the internal passage 1556. At that time, the cylinder chambers 1527 and 1528 are disconnected from each other, and the oil in the cylinder chambers is kept from flowing to the opposite cylinder chambers, so that the piston 1529 is hindered from moving relative to the cylinder 1530 along the axis 1531. As a result, the stabilizer 1518 is put in such a state that it can fulfill its function to suppress the rolling of the vehicle to improve the controllability and the stability of the vehicle as its wheel on one side moves up on a bump of a road surface for the vehicle and down into a hollow of a road surface. When no electricity is applied to the solenoid 1558, the solenoid valve 1557 is maintained in an open position shown in FIG. 36B, so that the oil in both the cylinder chambers 1527 and 1528 can freely flow to the opposite cylinder chambers through an internal passage 1556 and so forth. As a result, the piston 1529 can freely move relative to the cylinder 1530 so that the tips of both the right and left arms 1520 can freely move relative to the corresponding lower control arms 1511. For that reason, the stabilizer does not fulfill its function, so that the shock at each rear wheel of the vehicle is reduced to keep the feel of a smooth ride of the vehicle.

What is claimed is:

1. A rear suspension controller for a vehicle having a suspension between a body and a rear wheel of the vehicle comprising:

front vehicle height detection means (e) for detecting a distance between a front wheel and the body of the vehicle and for generating a front vehicle height signal;

a height data calculation means (f) for generating a plurality of height data from the front vehicle height signal;

a judgment means (g) for comparing each of the height data with a reference value that is predetermined corresponding to each height datum and for generating a judgment result signal depending on the results of the comparisons; and a rear suspension characteristic alteration means (h) for altering the characteristic of the rear suspensions in receiving the judgment result signal.

2. A rear suspension controller as claimed in claim 1, wherein the rear suspension controller further includes a vehicle speed detectiong means (M1) for detecting the speed of the vehicle to generate a vehicle speed signal, and a reference alteration means (M7) for altering the reference values depending on the vehicle speed signal.

3. A rear suspension controller as claimed in claim 2, wherein the height data [consists of] *comprises* an amplitude of the displacement and any one of displacement of the vehicle height signal (VH(S)n) from the average, a speed of the displacement and an acceleration of the displacement.

4. A rear suspension controller as claimed in claim 2, wherein a plurality of reference values (h1, h2, H1, H2) are predetermined in reference to each height datum (VHh−VH1, VHH−VHL), the judgment means generates a plurality of judgment result signals depending on the results of the comparison between the height data and the respective reference values and the rear suspension characteristic alteration means alters the characteristic of the rear suspensions in a plurality of states (SOFT, SPORT, HARD) in response to the judgment result signals.

5. A rear suspension controller as claimed in claim 2, wherein the rear suspension characteristic alteration means alters the characteristic of the rear suspensions a delay time (Td) after receiving the judgment result signal, the delay time (Td) being calculated depending on the vehicle speed signal (V).

6. A rear suspension controller as claimed in claim 1, wherein the height data [consists of] *comprises* an amplitude of the displacement and any one of the displacement of the averaged vehicle height signal (VH(S)n) from the average, a speed of the displacement and an acceleration of the displacement.

7. A rear suspension controller as claimed in claim 1, wherein a plurality of reference values (h1, h2, H1, H2) are predetermined corresponding to each height datum (VHh−VHl, VHH−VHL), the judgment means generates a plurality of judgment result signals depending on the results of the comparison between the height data and the respective reference values and the rear suspension characteristic alteration means alters the characteristic of the rear suspension in a plurality of states (SOFT, SPORT, HARD) in response to the judgment result signals.

8. A rear suspension controller as claimed in claim 1, wherein the rear suspension controller includes a vehicle speed detection means (250) which detects the speed of the vehicle to generate a vehicle speed (V) and the rear suspension characteristic alteration means alters the characteristic of the rear suspensions a delay time Td after receiving the judgment result signal, the delay time Td being calculated depending on the vehicle speed signal (V).

*9. A rear suspension controller for a vehicle having a suspension between a body and a rear wheel of the vehicle, comprising:*

*a front vehicle height detection means for detecting a distance between a front wheel and the body of the vehicle and for generating a front vehicle height signal;*

*a judgment means for comparing the height signal with a reference value and for generating a judgment result signal depending on the results of the comparison;*

*a rear suspension characteristic alteration means for altering the characteristic of the rear suspensions in receiving the judgment result signal;*

*a vehicle speed detection means for detecting the speed of the vehicle to generate a vehicle speed signal; and*

*a reference alteration means for altering the reference value depending on the vehicle speed signal.*

*10. A rear suspension controller as claimed in claim 9, wherein the rear suspension characteristic alteration means alters the characteristic of the rear suspensions a delay time after receiving the judgment result signal, the delay time being calculated depending on the vehicle speed signal.*

* * * * *